US007912559B2

(12) United States Patent
McCoy et al.

(10) Patent No.: US 7,912,559 B2
(45) Date of Patent: Mar. 22, 2011

(54) SOFTWARE ARCHITECTURE SYSTEM AND METHOD FOR OPERATING AN APPLIANCE IN MULTIPLE OPERATING MODES

(75) Inventors: Richard A. McCoy, Stevensville, MI (US); Matthew P. Ebrom, Holland, MI (US); Mark E. Glotzbach, Granger, IN (US); Andrew D. Whipple, Saint Jospeh, MI (US); Patrick J. Glotzbach, Saint Joseph, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 0 days.

(21) Appl. No.: 12/569,257

(22) Filed: Sep. 29, 2009

(65) Prior Publication Data

US 2010/0087932 A1  Apr. 8, 2010

Related U.S. Application Data

(63) Continuation of application No. 11/571,454, filed on Dec. 29, 2006, now Pat. No. 7,813,831, which is a continuation of application No. PCT/US2006/022420, filed on Jun. 8, 2006.

(60) Provisional application No. 60/595,148, filed on Jun. 9, 2005.

(51) Int. Cl.
*G05B 11/01* (2006.01)
*H04L 12/56* (2006.01)
*G06F 9/00* (2006.01)
*G06F 15/16* (2006.01)
*G06F 15/177* (2006.01)

(52) U.S. Cl. .......... 700/19; 370/401; 709/220; 710/267; 726/14

(58) Field of Classification Search ................... 700/19; 370/401; 709/220, 200; 710/267; 717/124; 726/14
See application file for complete search history.

(56) References Cited

U.S. PATENT DOCUMENTS

| 6,868,298 B2 * | 3/2005 | Baweja et al. ............... 700/100 |
| 2002/0035621 A1 * | 3/2002 | Zintel et al. .................. 709/220 |

OTHER PUBLICATIONS

Galeev-M.,"Home Networking with Zigbee", 2005, IEEE, 4 pages.*

* cited by examiner

*Primary Examiner* — Albert Decady
*Assistant Examiner* — Thomas Stevens
(74) *Attorney, Agent, or Firm* — Robert A. Bacon; McGarry Bair PC

(57) ABSTRACT

In one embodiment, a system for controlling a plurality of devices having at least two operating modes comprises a first software operating layer configured to control the operation of at least one of the devices in a first operational mode and a second software operating layer configured to control the operation of at least one of the devices in a second operational mode. In another embodiment, a control system for controlling a plurality of devices connected by a communications network comprises a user interface configured to receive the selection of a cycle of operation; a first system element isolated from the network and configured to implement the selected cycle of operation to define a first control state; and a second system element exposed to the network and configured to implement the selected cycle of operation to define a second control state.

24 Claims, 48 Drawing Sheets

| Frag | MFP | MID | FID | |
|---|---|---|---|---|
| | Cmd /Fb | OpCode | | - Fragmented Message Bit Definition |
| | | | | - Standard Message Bit Definition |
| 1 | Cmd | OpCode | | - First fragment contains OpCode and Cmd/Fb bit |
| 1 | 1 | 0 | 0 | - Second fragment begins MID and FID counters |
| 1 | 1 | 0 | 1 | - Only the FID counter increments inside the message |
| 1 | 1 | 0 | 2 | - FID increments again to ensure no fragments are lost |
| 1 | 0 | 0 | 3 | - MFP = 0 indicates fragmentation is complete |
| 1 | Fb | OpCode | | - Next fragmented message begins with OpCode |
| 1 | 1 | 1 | 0 | - Now the MID increments for this new message group |
| 1 | 1 | 1 | 1 | - FID counter incremented |
| 1 | 0 | 1 | 2 | - Fragmented message complete |
| 0 | Fb | OpCode | | - A standard feedback message is sent here so Frag = 0 |
| 1 | Cmd | OpCode | | - Next fragmented message begins with Frag = 1 |
| 1 | 0 | 2 | 0 | - The FID always starts at 0 and counts up to 7 |
| 1 | Cmd | OpCode | | - Next fragmented message begins |
| 1 | 1 | 3 | 0 | - The maximum value for the MID is 3 |
| 1 | 0 | 3 | 1 | - Message complete |
| 0 | Cmd | OpCode | | - A standard message is sent. This is a command message |
| 1 | Fb | OpCode | | - Next fragmented message begins |
| 1 | 1 | 0 | 0 | - The MID rolls over from 3 to 0 for this message group |
| 1 | 0 | 0 | 1 | - MFP = 0 - message complete |

SOFTWARE ARCHITECTURE SYSTEM AND METHOD FOR OPERATING AN APPLIANCE IN MULTIPLE OPERATING MODES

CROSS-REFERENCE TO RELATED APPLICATIONS

This application is a continuation of U.S. patent application Ser. No. 11/571,454, filed Dec. 29, 2006, which is continuation of International Application No. PCT/US06/22420, filed Jun. 8, 2006, which claims the benefit of U.S. Patent Application No. 60/595,148, filed Jun. 9, 2005, whose disclosure is incorporated by reference.

BACKGROUND OF THE INVENTION

1. Field of the Invention

The invention relates to a software architecture system and method for operating an appliance in multiple operating modes.

2. Description of the Related Art

Household appliances are typically comprised of one or more components which cause the electromechanical, electrothermal, and electrochemical operations of the appliance. For example, an oven may include an appliance management component, having a printed circuit board (PCB) with memory thereon, as well as a user interface component, such as a control panel or keypad for a user to issue commands to the oven appliance. The basic appliance models typically are difficult to design, develop, test, diagnose, control, and debug due to the diversity of componentry and the associated diversity of implementation choices. This diversity is an impediment to creating interoperable, reusable, value added componentry.

It has become known in recent years to interlink the components of an appliance by an internal communications network capable of sending and receiving control messages for controlling the interaction between the internal components of an appliance, as opposed to the use of a plurality of discrete circuits, with each discrete circuit responsible for an individual communication between related components and implemented by hard-wiring ribbon cables or other connectors or harnesses between the components. This internal network affords some degree of universality in connecting the components internal to the appliance, however, each component typically needs to be enabled with software within its microprocessor and the adjacent hardware circuitry to achieve network participation. One example of this internal network used within a household appliance is the WIDE network protocol, created by Whirlpool, Inc., the assignee of this document.

SUMMARY OF THE INVENTION

A system according to one embodiment of the invention for controlling a plurality of devices having at least two operating modes and connected by a communications network to form a network of cooperating nodes comprises a first software operating layer configured to control the operation of at least one of the devices in a first operational mode in response to messages sent on the network, and a second software operating layer configured to control the operation of at least one of the devices in a second operational mode in response to messages sent on the network. The second operating layer provides a different level of intervention between the messages and the operation of the devices than the first operating layer.

A control system according to another embodiment of the invention for controlling a plurality of devices connected by a communications network to define a machine operable to perform a series of steps in a cycle of operation comprises a user interface configured to receive input from a user for the selection of a cycle of operation from multiple cycles of operation; a first system element isolated from the network and configured to control the machine to implement the selected cycle of operation to define a first control state; and a second system element exposed to the network and configured to control the machine over the network to implement the selected cycle of operation to define a second control state.

BRIEF DESCRIPTION OF THE DRAWINGS

FIG. 25 illustrates a sequence of packets representing a series of fragmented messages transmitted in the form shown in FIG. 2, which are by the receiving SA and reformed into the original cohesive data sets created by the sender of the packets.

DESCRIPTION OF EMBODIMENTS OF THE INVENTION

A brief overview of the invention should be helpful before examining the multiple aspects of the invention. The invention relates to a software architecture ("SA") that is implemented on and communicates over an internal communications network on an appliance, which connects the various physical components of the appliance.

Some of the physical components have a corresponding controller (main controller, motor controller, user interface, etc.), which may be a simple microprocessor mounted on a printed circuit board. Other components have no controller. Typically the components that have controllers (and if there are more than one are typically also network enabled) cooperate through network messaging or other forms of data transmission to directly or indirectly, through other components, control the operation of all of the components and their contained or attached devices to implement an operation or cycle for the appliance.

The SA can, but does not have to, reside on each of the components with a controller. Those components with the SA or a variant of the SA compliant with the SA (compliance determined by the ability to send, receive, and process packets) form a node on the network that can communicate with the other nodes.

The SA performs multiple functions: identifying each of the components corresponding to a node to the network; identifying the capabilities or functions of the identified components to the network; identifying the status of the components to the network; providing well defined command interfaces for each component; providing communication between internal and external software components that are not part of the SA; and providing communication between components non-SA software components on different physical components. In this way, the SA functions to inform all of the nodes on the network of the presence, capabilities, and status of the other nodes.

The SA comprises multiple modules, each of which has different functionality. Various combinations of the modules or all of the modules can reside on each of the components. One module having the basic or core functionality for the invention resides on all of the components. In one anticipated configuration, all of the modules reside at least on the main controller, which establishes the main controller to function as a primary or controller SA, with the other nodes functioning in a client relationship to the controller SA. In such a configuration, all of the nodes would communicate through the Controller SA.

The SA is sufficiently robust that it can permit configurations without a Controller SA or with multiple Controller SA. Regardless of the configuration, any component with a residing SA can function as a client with respect to the other components.

The internal communications can be connected to one or more external components directly or through an external network. The external components would also have one, some, or all of the SA modules in resident.

Figure 1:
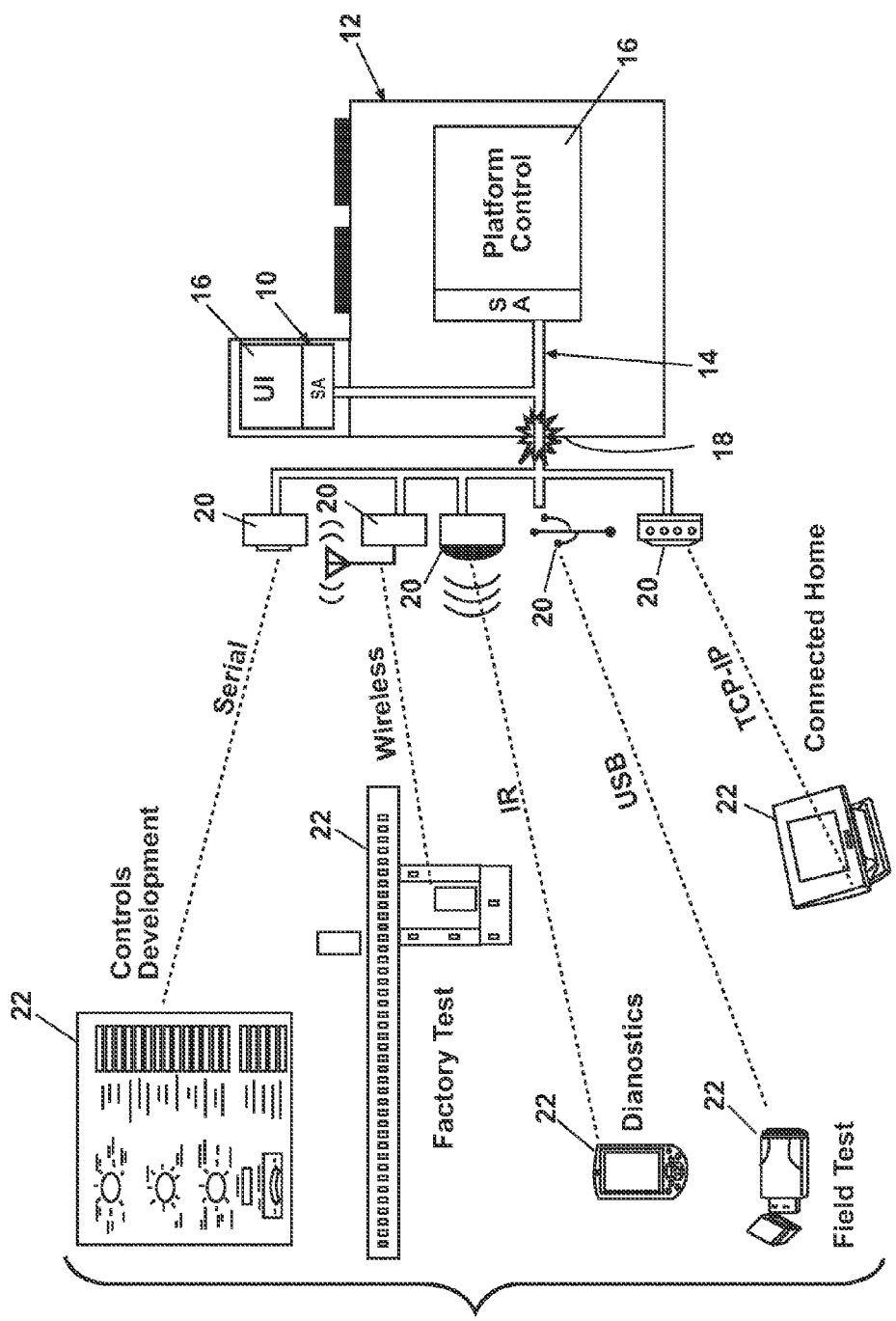
FIG. 1 is a schematic illustration showing a household appliance having an internal communication network interconnecting a plurality of components, wherein each component has a software architecture embedded therein according to the invention, the household appliance also having an external communications connection showing various network interface cards (NICs) establishing communication with various embodiments of external clients.

Beginning with FIG. 1, the specifics of the invention will now be described. FIG. 1 is a schematic illustrating one environment of a software architecture 10, (embodying the systems and methods described herein and those which would be apparent to one skilled in the art) in the form of a household appliance 12 having an internal communication network 14 interconnecting a plurality of components 16, wherein the software architecture 10 resides on at least one component 16 to enable the component 16, and preferably each additional component 16 has the software architecture 10 in resident, or an alternate able to be interoperable with. The household appliance 12 also has an internal/external communications connection 18 shown interconnected to various network interface devices 20 for communication with various embodiments of an external client 22.

The external clients will typically comprise computing hardware and software and networking hardware and software able to interact with the software architecture 10. This may be achieved by including all or a portion of the software architecture 10 within the embodiment of the external client or an alternative to the software architecture 10 which is able to communicate and fully or partially interact with the software architecture 10. A number of alternate components (C dll, Visual Basic Driver, Java Driver, and Active X driver) able to fully interact with the software architecture 10 have been implemented.

In connection with the text of this patent application and in review of the drawings accompanying the text of this application, it will be understood that the abbreviation "SA" refers to "software architecture" as described by reference numeral 10 in this application.

Further, the term "client" is used to refer a component on which all or a portion of the SA resides and which fully or partially enables the functionality of the component. The component can be either an internal or external component. While client will primarily be used to describe a component enabled by the SA, client is also used to describe a component that is enabled by an alternate software that is able to successfully exchange messages on internal communication network 14 and communicate with the SA. Generally, the term client is used when referring to the software aspects and not the hardware aspects of the node.

The components 16 can comprise one or more devices. Thus, the term "device" as used in the application can refer to a component or to a device. The devices can be any electronic, electrothermal, and electromechanical elements which collectively form the component or which are attached to a component with a controller via electrical circuitry (e.g., wiring harness), a physical part which can execute logic, and a physical part which has memory.

As described herein, the appliance 12 can be any of the well-known variety of appliances which would be well known to one skilled in the art. For example, the appliance 12 can be a washer, a dryer, a microwave, a dishwasher, a refrigerator, a refrigerator/freezer combination, a stand-alone freezer, a warming drawer, a refrigerated drawer, an oven, a combination cooktop and oven, a cooktop, and the like. While the described environment of the invention is that of an appliance, the invention has applicability to any type of machine having networked components.

As described herein, the internal communication network 14 can be any well-known interconnecting conduit, wiring and/or harness, or wireless system suitable for interconnecting the various internal components 16 of a household appliance 12. As described in the background section of this application, the WIDE network is a suitable internal communication network 14 to provide the internal communications necessary to support the software architecture 10 according to the invention. It will be apparent to one skilled in the art that the software architecture 10 can run on any suitable internal network, and that the illustrative example provided herein (i.e. the WIDE network) is simply one example of a suitable internal communication network 14.

As previously stated, component 16 is any processor-based component or sub-component of a household appliance 12. Examples of components 16 suitable for receiving and installation of the software architecture 10 according to the invention include, but are not limited to, motor control microprocessors, microprocessor enabled key pad controllers, LCD user interface controllers, and other device controls typically included within a household appliance 12.

The internal/external interface connector or slot 18 is suitable for connecting a plurality of types of devices 20, which are able to communicate on the internal communication network 14 and at least one other network such as RS-232 serial, various forms of wireless (Zigbee, Wi-Fi, etc), USB, or wired Ethernet, etc. The functionality of the device 20 may be strictly limited to protocol and physical layer conversion, or my be expanded to support value added services in addition to its base protocol bridging function.

Examples of external clients 22 to which the software architecture 10 permits a household appliance 12 to be connected include, but are not limited to, a personal computer-based control development, a factory testing application, a diagnostic application, a field test application, and an interface to a connected home environment. This connection to the external environment, whether adjacent to or remote from the appliance 12, enables value-added applications to communicate with the appliance 12. Some examples are:

Automated factory test
Energy Management applications
Engineering development tools
Appliance Service and Diagnostic Tool
Electronic Controls Manufacturing Functional Verification Testing
Consumer Applications . . . etc.

The system level architecture (mechanical, electrical, and software elements participating to achieve a useful purpose of the household appliance) includes the software architecture 10 and software elements apart from the software architecture 10. The collection of software elements, including but not limited to the software architecture 10, within the microprocessor of a component of the system architecture is herein referred to as a software operating environment 16A. The software architecture 10 is comprised of three components: a core implementation, an application protocol definition, one or more application program interfaces (referred to herein as "API" or "APIs" in the plural).

Core Implementation

Figure 3:
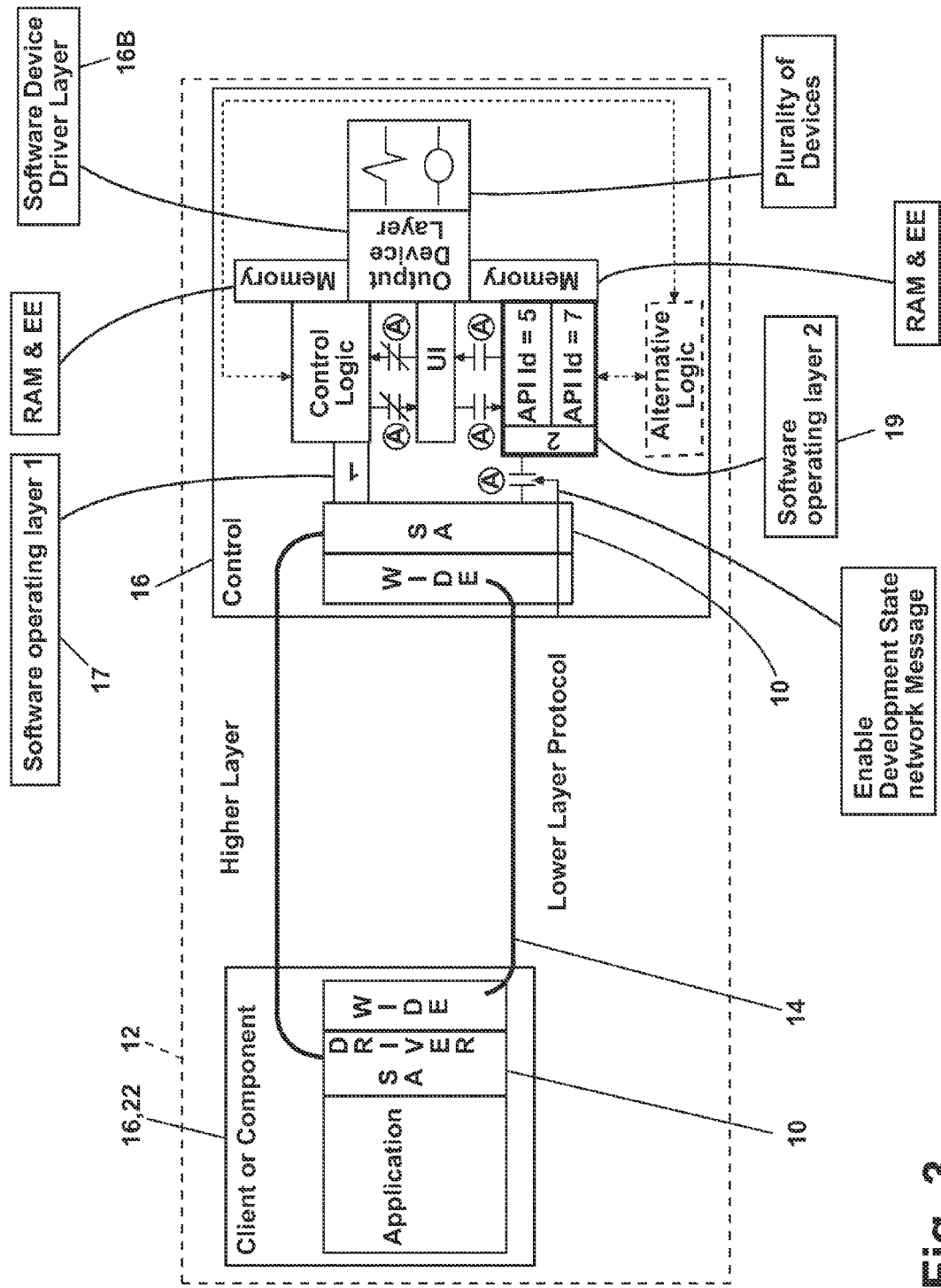
FIG. 3 is a schematic illustration of the internal communications network of FIG. 1 showing the internal communications network functioning as a physical support for the SA residing on two components (a Lower Layer, which represents the network physical layer and is not directly associated with the SA, and a Higher Layer, which represents support for packet structure and is directly an element of the SA). with the SA used by the components to communicate through information exchange and to interact with other software operating layers residing on the components to achieve the results in accordance with the information exchanged between components according to the invention.
Figure 11:
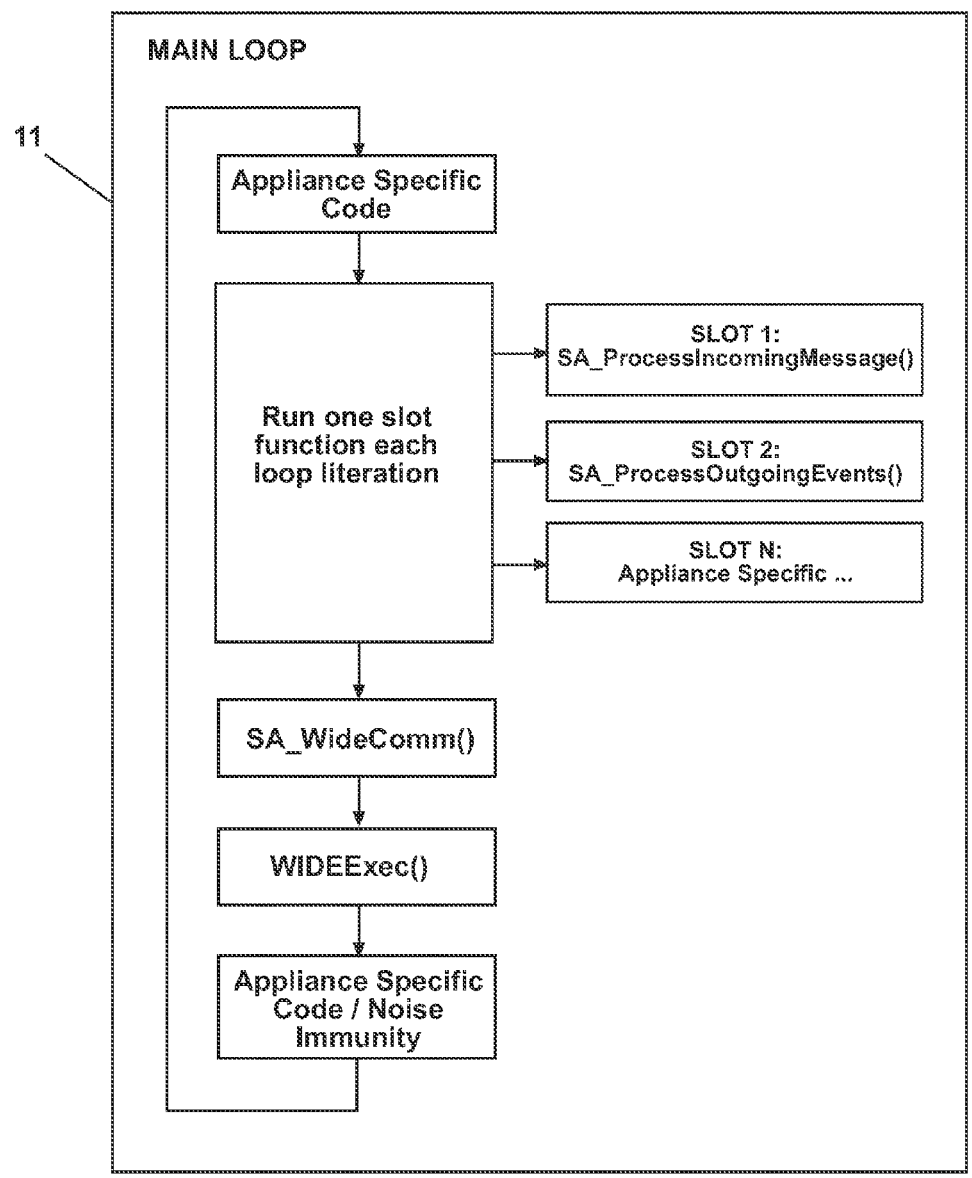
FIG. 11 is a schematic illustration showing the invocation of the controller SA by the supervisory scheduler (MAIN) residing on the main controller, which also invokes a subroutine call to expose functions of client SA's on the network.
Figure 12:
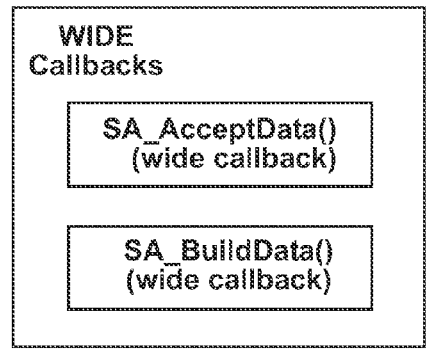
FIG. 12 is a schematic illustration showing the interface between the internal appliance application logic and the software architecture shown in FIG. 11 including a callback section.

The core implementation of the software architecture 10 is a collection of software modules (examples found in FIG. 3 are SACore, SADiscovery, SADAQ, SAPortMemory, SAPollVariable) executing in an appliance control microprocessor. As shown in FIG. 11, the core implementation is preferably executed in the MAIN loop of the appliance control microprocessor which will be apparent to one skilled in the art. The core provides a common application messaging layer over the internal communication network 14 and is based on a flexible design enabling the development of cross-platform connectivity applications. As part of the core implementation, a core API will exist which will be uniformly implemented on each appliance. Moreover, where uniform implementation is not practical, a discovery mechanism may be used, allowing adaptation by the client to the non-uniformity.

Application Protocol Definition

A protocol is a standard procedure for regulating data transmission between nodes in a network. Messages are sent across the internal communication network in one or more packets of data, which are then assembled to form a communicated message. There are two applicable areas of definition relative to the software architecture 10.

Figure 4:
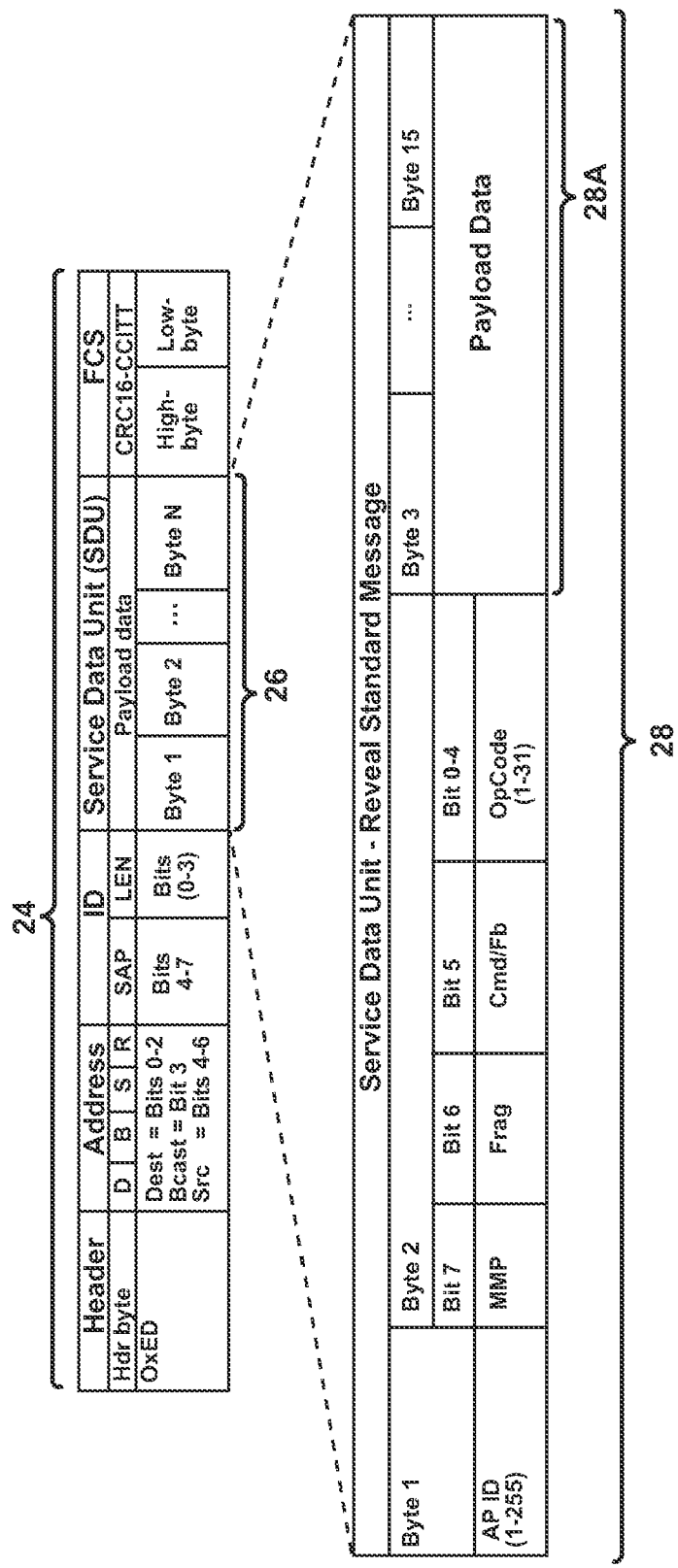
FIG. 4 is a schematic illustration of a packet structure for the internal communications network of the household appliance shown in FIG. 1 having a payload portion comprising an application packet structure for the software architecture according to the invention.
Figure 24:
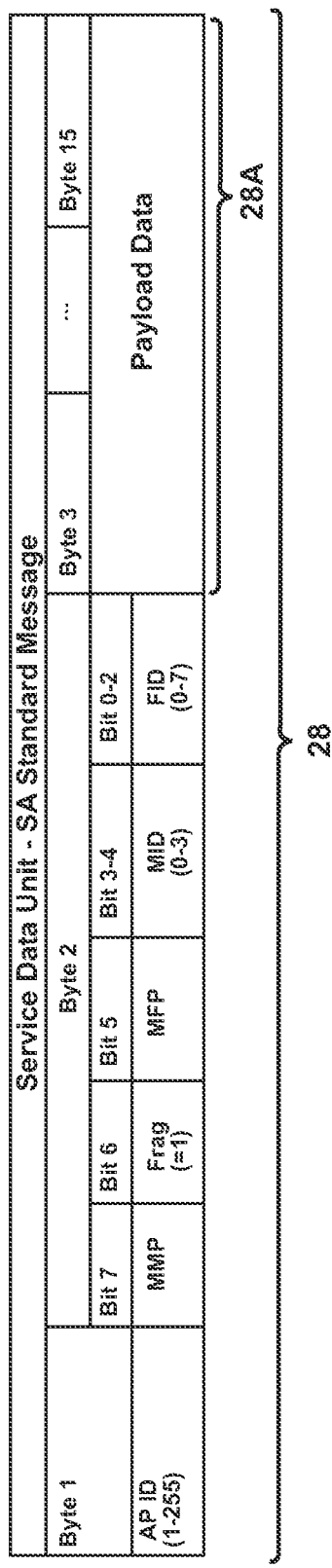
FIG. 24 is a schematic illustration of a fragmentation packet structure for the internal communications network of the household appliance shown in FIG. 1 having protocol for handling fragmented packet integrity, which replaces the protocol illustrated in FIG. 4 when a message must be broken into multiple messages.

1. Packet Definition: is the pre-defined meaning for each byte within a collection of bytes which make the packet, or bits or bit ranges within one of those bytes therein. FIG. 4 and FIG. 24 and their accompanied description represent the Packet Definition of the software architecture 10.

2. Message Order and Messaging Rules: The definition of a Protocol is generally expanded beyond the packet definition (1) above to include rules governing the expected ordered collections of messages necessary to accomplish certain useful transactions. Examples of Ordered Messages with Message Rules (transactions) are shown in FIGS. 6, 9, 27, 29, and 31.

Application Programming Interfaces

An API is a communication and messaging contract, which specifies how one network node communicates with another. This is accomplished by defining the available function calls, the arguments to each function call, the data type of each argument, and in some cases, the valid values of each argument.

In many cases, APIs are specific to an application or appliance 12, and therefore are not considered as part of the software architecture 10 collection of Core (standard set of) APIs; rather, the software architecture 10 core enables and exposes multiple API's to the client 16, 22, and possibly 20.

System-Level Architecture

The software architecture 10 was designed to achieve several objectives over time.

1. Business productivity within the constraints of existing control architecture.
2. Business productivity though enablement and realization of new control architecture.
3. Support and better enable core business functions of Innovation, Manufacturability, Quality, and Serviceability.
4. Enable new growth opportunities by enabling production appliances with the software architecture 10 which with the addition of the connector 18 creates the 'connectable' appliance. This approach minimizes the risk and cost of connectivity by externalizing the cost of networking electronics.

To realize the full potential of this architecture, a simple connector can be available on the appliance 12 so that a network card can be plugged into the appliance. See FIGS. 1 and 18-22 for examples of suitable external NICs 20 connected to the appliance 12. As the appliance 12 already has an internal, low cost network 14 for its internal purpose, additional wiring to connect the internal communication network 14 with the external NIC 20 via an internal/external interface 18 is minimal and can be accomplished in a known manner, such as by a three-wire serial cable, an external connector, and a mounting fixture.

The software architecture 10 can preferably reside on all components 16 of the household appliance control system. However, where cost or other constraints are prohibitive, the software architecture 10 can reside on a sub-set of the components 16 within the control system of the household appliance.

Example benefits of this "connectable" architecture include, but are not limited to: external NICs 20 can be added after market, reducing base cost of the appliance 12. NICs 20 can be developed supporting multiple network technologies, applications and NICs 20 can be cross-platform and generic due to the standard interface presented by the software architecture 10, an internal low-cost network (such as the WIDE network example) is used as a standard, API framework and discovery allows many value added commands, the software architecture 10 uses bounded events to preserve state and make efficient use of bandwidth, and the software architecture 10 is designed to be configured at runtime allowing program developers a more flexible architecture that can reduce time to market.

Figure 2:
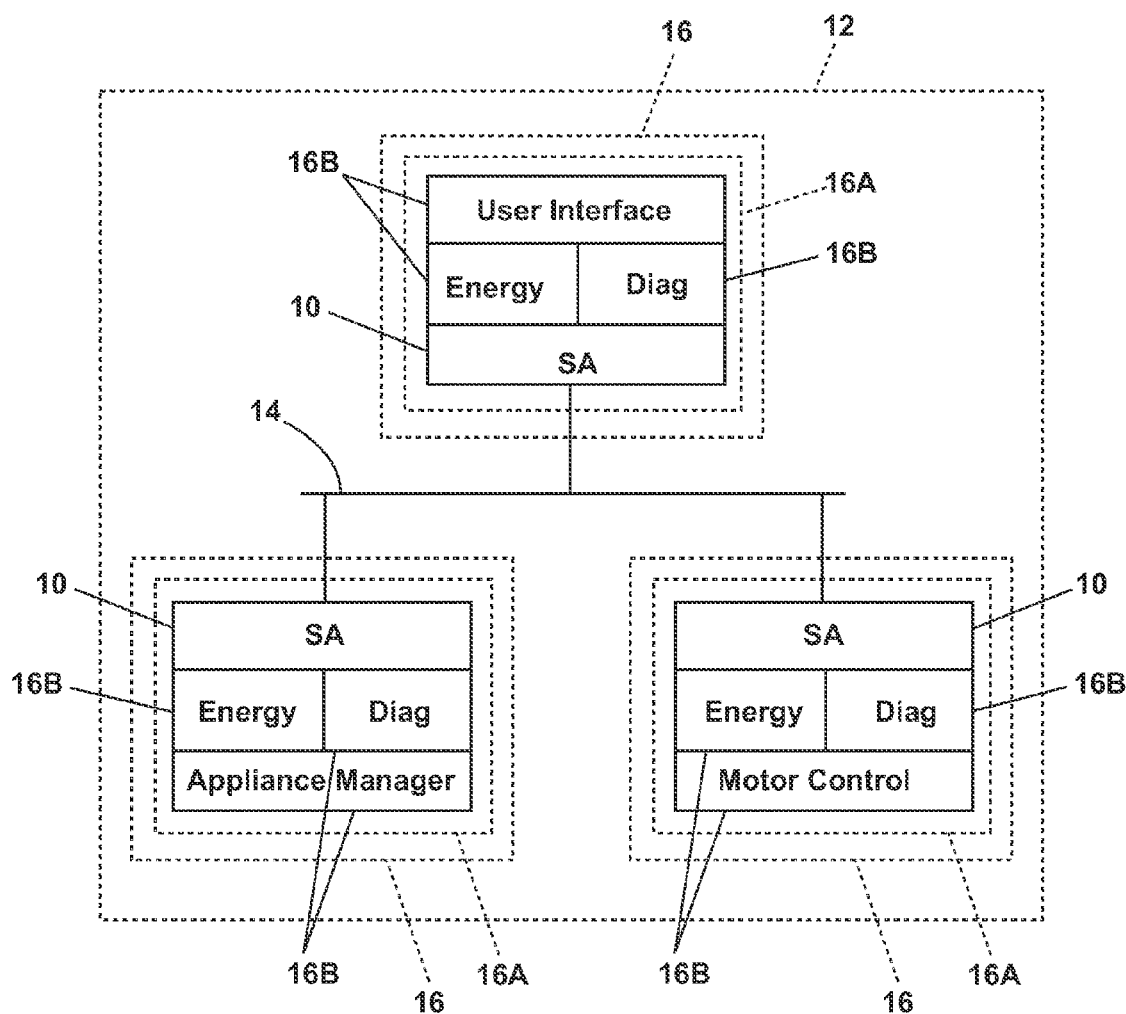
FIG. 2 is a schematic illustration of the internal communications network of FIG. 1 showing the software architecture (SA) according to the invention interposed between the internal communications network and various software components of physical components internal to the household appliance.

FIG. 2 is a schematic illustration of the internal communications network 14 of FIG. 1 showing the software architecture 10 according to the invention interposed between the internal communications network 14 and various software components 16B within the software operating environment 16A internal to the components 16 making up the control system for the household appliance 12. The components 16 in FIG. 2 represent typical components found in appliances 12, such as an appliance manager (main board or motherboard) and another component such as motor control and a control panel or keypad interface, generally referred to as a user interface. The "Energy" and "Diag" indicia in FIG. 2 are examples of typical non-core functions performed by the software architecture, such as energy and power management ("Energy") and troubleshooting or diagnosis ("Diag"). Not explicitly shown in FIG. 2, are core functions (API 1-7 and 10) performed by the software architecture and represented by the indicia 10.

In addition, the software architecture 10 can be extended to many other types of system architectures where data exchange over peer-to-peer communication is desired. These include multi-node systems where multiple PCBs such as a motor control, appliance control, and smart sensor boards communicate within the appliance 12 using the software architecture 10. The software architecture 10 discovery protocol illustrated in FIG. 6 (and described later herein) can be used to enable a component 16 whose presences causes other components 16 to adapt their control functions to create new behavior or performance or expose new capability to the consumer. The component architecture of FIG. 2 (structural model) along with the discovery behavior of FIG. 6 along with the component identification scheme of API ID, Type, Version (see API ID=3) are a basis for the invention embodied in 10 to enable the appliance with a new dynamic and intelligent system architecture.

FIG. 3 is a schematic illustration of the internal communications network 14 of FIG. 1 showing typical appliance control components 16 exchanging messages via the internal communications network 14 of the household appliance 12 comprised of a lower layer protocol, WIDE being an example thereof, which accounts for OSI layers of PHY, LINK, and partial Network layer functionality and a higher layer protocol supported by the software architecture 10 (which accounts for OSI layers of Application, Transport, and partial Network layer functionality) according to the invention. The lower layer protocol functions as both a physical and link layer between the higher layer associated with the software architecture 10 and the components in the appliance. In this way, the software architecture 10 uses the lower layer protocol to communicate with a first software operating layer 17 that implements the control logic of the controller 16 relative to client 22, as well as using a second software layer 19 to bypass the control logic and directly control the devices associated with the control 16. The devices in FIG. 3 are the physical elements that represent the functionality of the control component 16. FIG. 3 illustrates the control architecture 10 from a software/protocol stack perspective.

In addition, FIG. 3 provides a schematic illustration of two modes of operation enabled by the software architecture 10 which control the access to and the level of intervention between the network messages exposed by the software architecture 10 and the internal RAM and EE and other forms of non-volatile memory of 16A (see FIG. 2) as well as the Output Device Layer, which is a low level software operating layer 16B residing within 16A and providing direct control of the devices electrically connect to the component. The Output Device Layer 16B having direct control of the devices do so by having direct access to the micro-processor port address memory, which, in turn, maps to the physical pins of the micro-processor which, in turn, are connected through various electronic apparatus to the electro-mechanical devices.

Software Operating Layer 1 of FIG. 3 represents appliance specific software components 16B which interface the network messages received by software architecture 10 to the Application Control Logic resulting in the Application Control Logic to take some action. When the appliance is in a Development State (switch labeled A in FIG. 3), an additional Software Operating Layer 2 (comprised of API 5 (low level API) and API 7 (the memory/Port API) and their implementations and Alternate Logic) enable the network messages of API 5 and API 7 to change the state of the physical memory of 16A and the devices. In this way, the devices and memory can be controlled independently of the application software, which typically controls the devices and memory in accordance with an operational cycle of Software Operating Layer 1. This direct control permits the each function of the devices to be independently controlled, which is very beneficial in development or diagnostic processes.

Figure 7:
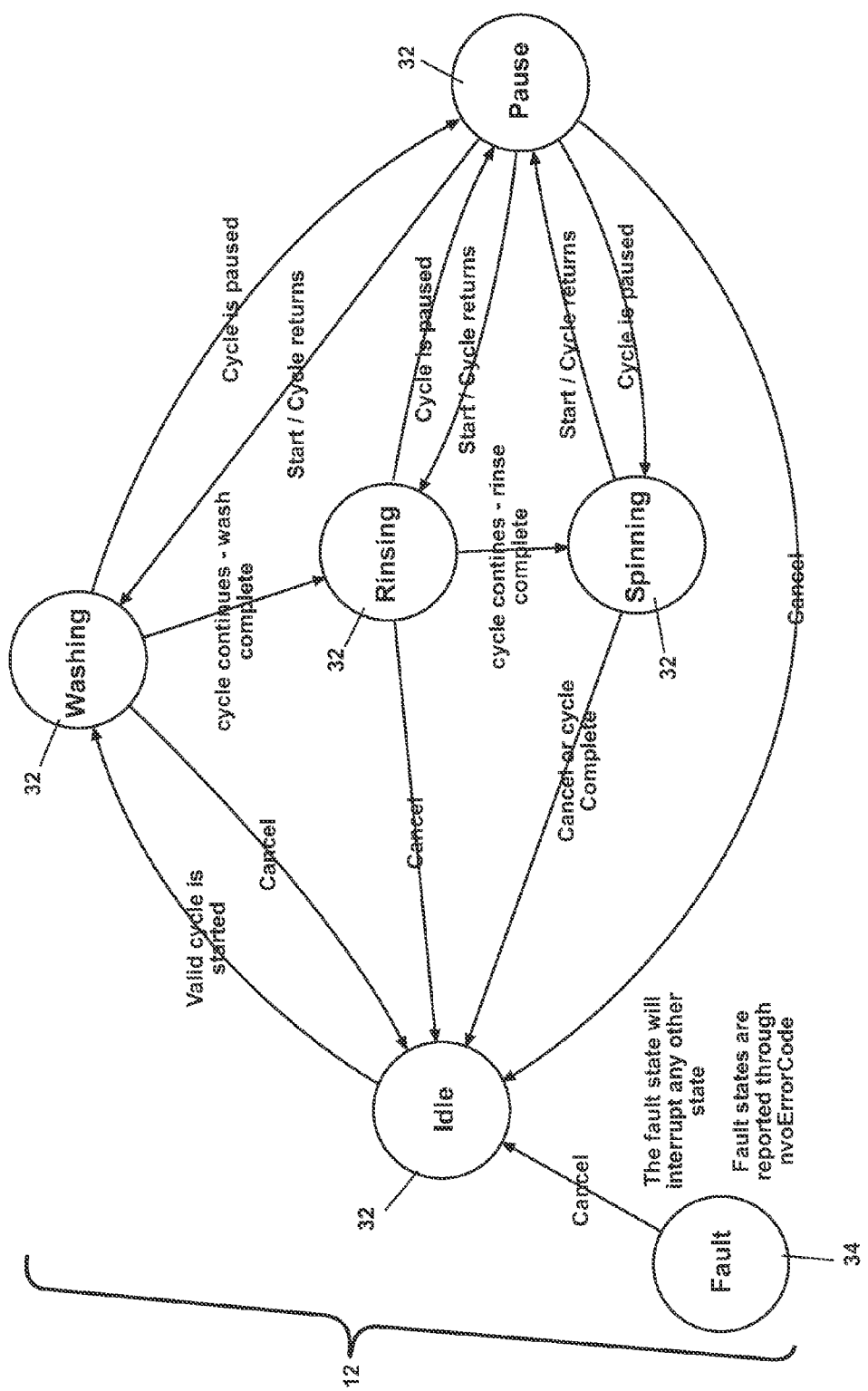
FIG. 7 is a schematic illustration of various exemplary states of a software operating environment typically operating within the Control Logic element as shown in FIG. 3 within a component of a household appliance, which is illustrated as a washer.

Software Operating Layer 2 is enabled to effect state change by a special network message exposed by software architecture 10 and also additional logic which is customized for the various states of the appliance (example shown in FIG. 7). During development state, it is preferred that when the user interacts with the appliance via the user interface of FIG. 3, software operating layer 1 will not receive the associated user interface inputs. Instead, software operating layer 2 will receive the inputs from the user interface. Subsequently, software operating layer 2 may interact with the Alternate Logic of FIG. 3. The Alternate Logic may in turn make function calls onto the Control Logic of Software Operating Layer 1, change values in memory, or change the state of the attached plurality of devices. However, during development state Software Operating Layer 1 is not able to effect the state of the user interface (LEDs, lamps, buzzers, text and graphic displays, etc). Development State renders the Control Logic of Software Operating Layer 1 ineffective unless invoked from Software Operating Layer 2. During Development State, the implementation logic of API 5 and 7 and the Alternate Logic are in complete control of the Appliance 12 and its associated componentry.

Development State reverts back to the Idle State (of FIG. 7) when a special network message is received. In addition, it is contemplated, that at least one pre-determined key press of a sequence of key presses may also result in a transition from Development to Idle state.

Software Operating Layer 1 operates independently of the enablement of Operating Layer 2. The purpose of the development state is to allow and enable operational cycles that were not previously contemplated. The advantage to this approach is that implementations and configurations of the appliance, some of which are illustrated in FIG. 1, do not require new software modifications to any component 16 of the appliance because the appliance has the capability through the software architecture 10 to support any implementation or configuration contemplated.

There are many uses for this capability. They include but are not limited to:
1. ability to add new functional componentry to an appliance enabled with software architecture 10 achieving new behavioral characteristics and cycles of operation without modification to the pre-existing functional componentry. Examples of this are:
   a. adding steam control to a washer, dryer, oven, and microwave
   b. adding energy and other resource management componentry to an appliance
   c. adding networking componentry enabling connections to external networks in addition to the internal network 14.
   d. adding a card reader to a commercial appliance in order to create a pay for use usage model.

e. adding a memory device which comprises additional cycles of operation available for selection and invocation by a client node or application or a user interacting with a user interface.
2. performing diagnostic tests, which can be accomplished by actuating each output sequentially to verify the expected results (examples: heater on—observed temperature increase, fill valve on—observe water level rise, ice crush motor—observe rotation of crushing apparatus)
3. performing automated factory tests
4. performing automated performance testing and DOE executions
5. performing automated lifecycle testing
6. performing component 16 unit testing and automated regression testing
7. performing automated ECM testing
8. performing other forms of ad hoc debugging and testing
9. enabling an alternate client device (example: PC) to control the Appliance 12 allowing the universe of selectable cycles of operation to be developed and tested using alternate software operating environments 16A to that which is typically required on the final production embedded computing componentry 16 which offer more productive programming environments resulting in a reduced time to market for new appliance models.

FIG. 4 is a schematic illustration of a packet structure 24 for the internal communications network 14 of the household appliance 12 shown in FIG. 1 having a payload portion 26 comprising an application packet structure 28 for the software architecture 10 according to the invention. Packet structure 28 represents a well formed message which the software architecture 10 can create and send to other components 16 and 22 (having an occurrence of the software architecture 10 or a variant of the software architecture 10 which has been designed to be operable with packet structure 28) for the purpose of a meaningful exchange of data. Packet structure 28 occupies the position 26 within Packet structure 24, but packet structure 28 could occupy an alternate position in a variant of packet structure 24. 28A represents a packet structure within 28 which is defined according to the values of API Id and Op Code of packet structure 28.

In a network protocol, a packet (sometimes called a message) is a collection of bytes which are transmitted sequentially, representing all or part of a complete message. Generally, it is composed of a header, which includes routing information, a body (also referred to as "payload") which is data, and a footer which sometimes contains a checksum (i.e., a CRC sum) or a terminator, such as an "end" flag. The payload is a collection of bytes contained in a packet. The payload is the data being transmitted between the application layers of two nodes 16. The function of the network and the protocol is to get the payloads from one node to the other. Sometimes one protocol is sent as the payload of another, and in this way, protocols can be nested or stacked. Variables are named memory locations, which have associated values. One or more variables can comprise the payload. A transaction is a series of messages or packets that represent a complete data exchange between a plurality of nodes.

The relationship between a packet and a payload can have an impact on the efficient use of available bandwidth. The tradeoff to be considered is the amount of overhead needed to get the payloads from one node to another in the context of application layer requirements.

The protocol packet structure 24 as a first header byte which is identified by example as 0xED, followed by an address byte having four portions. The first portion of the address byte comprises a destination portion (D) of bits 0, 1, 2. The second portion of the address byte comprises a broadcast portion (B) of bit 3. The third portion of the address byte comprises a source portion (S) of bits 4, 5, 6. The fourth portion of the address byte comprises a reserved portion (R) of bit seven. The address byte is followed by an identification byte comprised of a service data unit length (SDU-L) comprised of bits 0-3 and a SAP identifier comprised of bits 4-7. SAP identifier defines the structure of the enclosed Payload 26. A SAP of 4 indicates that the enclosed SDU 26 is defined by the packet structure 28 associated with the software architecture 10. The identification byte is followed by a service data unit which is generally referred to as the "payload" of the protocol packet structure 24 and is identified generally by reference 26. The payload 26 is followed by a standard validation byte, such as a high-byte, low-byte combination or generally referred to by those skilled in the art as CRC16-CCITT.

The application packet structure 28 is formed from the payload portion 26 of the protocol packet structure 24. It is within this application packet structure 28 that the communications protocol and data exchange permitted by the software architecture 10 is carried out. The first byte of the application packet structure 28 contains an identifier (API ID), an integer from 1-255, of the particular API carried by the particular instance of the application packet structure 28. The second byte up the application packet structure 28 contains in operation code (abbreviated herein as "op code") as an integer from 1-31 in bit 0-4, followed by a command or feedback (Cmd/Fb) flag of bit 5, a fragmentation (Frag) flag of bit 6, and a more messages pending (MMP) flag in bit 7. Bytes 3-15 of the application packet structure 28 comprise the payload (i.e., message data) of the particular instance of the application packet structure 28.

Essentially, the software architecture 10 uses two bytes of the payload 26 of the network packet structure 24 of the internal communication network 14 for additional protocol. The API ID is a unique identifier for a collection of Op Codes which are organized into functional units. 0xFF (255) and 0x0(1) are preferably reserved. An Op Code is a unique ID within an API which defines and identifies a single command or feedback message. Each API has an associated Type (2 bytes) and Version (2 bytes) allowing for a large library of identifiable, functionally related groups of messages (op codes) to be created over time.

Preferably, x1F (31) is a reserved value for Op Code. The Cmd/Fb flag indicates whether the message is a classified as a command or a feedback. A command is some message that requests an action to be taken, where a feedback is some message that simply contains information (acknowledgement, event data, etc. . . . ). Preferably, the Cmd/Fb flag is 0 for commands and 1 for feedbacks.

The Frag flag specifies whether the received message is being broken into multiple messages (fragments) by the sender because of the size limitations of the lower layer protocol's SDU 26. The first fragment of the message will take on the structure of FIG. 4. All subsequent fragments of the message will take on the structure of FIG. 24. The Frag flag is preferably set until the fragmented message is completed.

Figure 9:
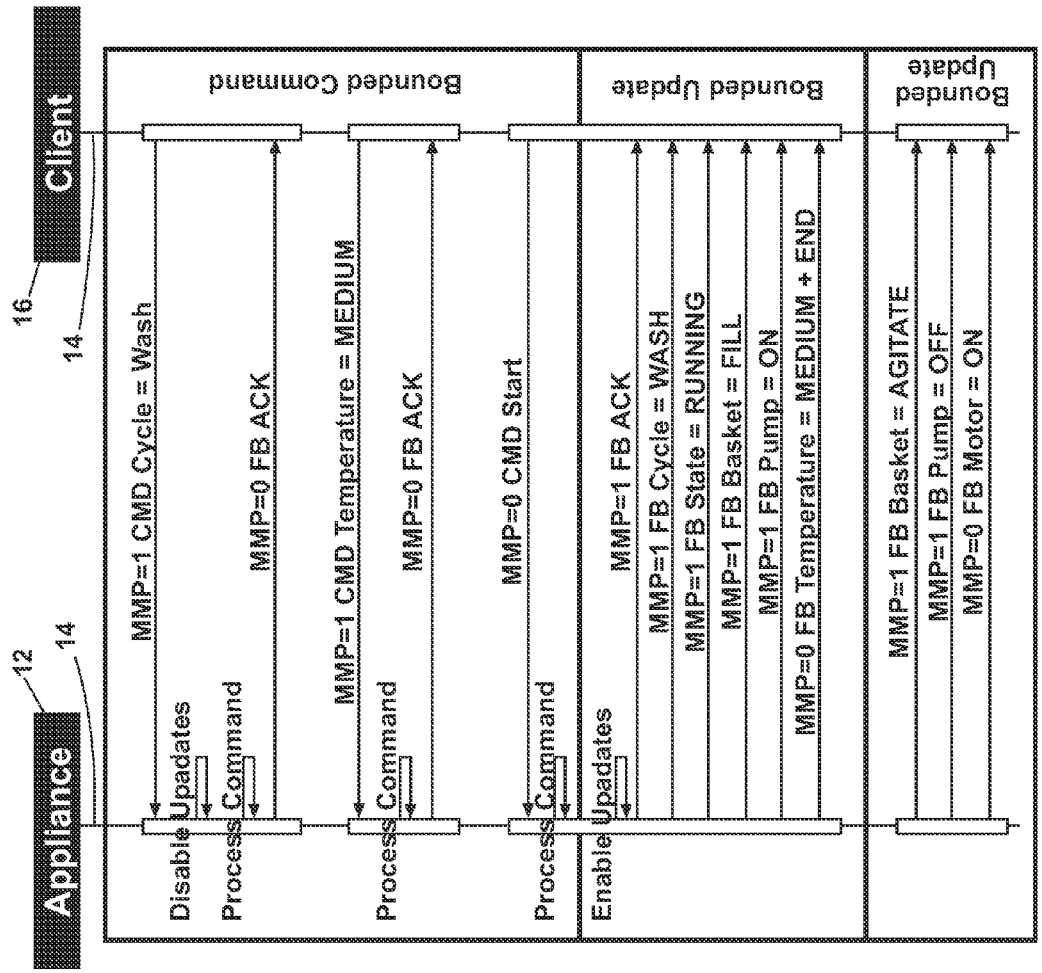
FIG. 9 is a schematic illustrating the usage of binding to link multiple data exchanges to form a single command and/or update between a client SA and the controller SA.

The MMP flag indicates that events are sent as individual messages but are bounded together by protocol so that the client can group events together as a complete snapshot for one scan of the micro-controller. The MMP flag is preferably set until the last message for a snapshot is sent out. FIG. 9 and the accompanying discussion provides more detail on bounded messages.

The MMP flag provides the software architecture 10 the capability to express the state of an appliance 12 as a function of independently meaningful feedback variables bounded together in snapshots.

When the internal state of an appliance 12 changes, multiple events may be sent which, in total, describe the new state of the appliance 12. The number of events required to describe a state change is appliance 12 state specific. Therefore, special protocol delimiters are used to allow an implementation specific number of feedback variables to be associated with a particular appliance state change. Because these events are independently meaningful, this approach is preferable in that all permutations of event (data) aggregations can be created through the use of MMP. This results in efficient use of the identification namespace (API Id and Op Code) because no new identifiers are required when the client requires a new combination of data to be sent. In summary, MMP and the associated rules thereof, allow dynamic and virtual data aggregation eliminating the need for special application case specific solutions. In FIG. 9, the net effect of the MMP flag is shown.

The MMP flag also provides the capability for the embedded implementation to suppress the invalid transient condition. As the appliance state transitions, it is possible for a set of related variables to change several times very rapidly. When appliance state is expressed in terms of independent feedback variables sent as separate events (feedback messages) without a binding mechanism, ambiguous or invalid transient states are likely to occur. Moreover, if the client is executing business logic during the invalid transient state, logic errors may result in incorrect control or user display actions. Refer to the section hence, labeled State Integrity, for an example of how asynchronous data collection is an inferior approach to data collected synchronously within each scan of the microprocessor and transmitted within the snapshot enabled by MMP. In addition, message binding can be used to group independent command invocations so that they may be processed in batch.

The application protocol 28 also governs incoming messages. In general, networks allow asynchronous processes to communicate, creating the potential for one network node to exceed the processing capacity of the other by sending too many requests within a short time window. To prevent message overruns, a protocol is used, according to the invention, which allows the sender to wait for an acknowledgement before sending a second message.

This feature permits the software architecture 10 to use an enumeration for this acknowledgement based on the execution state 8 of the software architecture 10. In this way, necessary information describing message success or failure is communicated with fewer messages. The command sender will receive an enumerated acknowledgement for each command sent. The most common is a positive ACK, which means that the node is ready to receive its next command. All other enumerations are a form of failure. Failure is characterized by the remaining 254 possible values of the Acknowledgment byte. Of this range of 254 values, some are standardized and some are reserved for application specific failure codes.

Frag and MMP allow the user of the software architecture 10 flexibility in designing the application messaging strategy. If a developer chooses to use very large messages, Frag can be used so that messages larger than the payload 28A (i.e., 13 bytes within the exemplary application packet structure 28 shown herein) can be sent by sending the original large data set as multiple smaller data sets within multiple packets of structure 28.

By the same token, if a developer chose to use smaller messages (which are often the case) but wanted to group those messages together, MMP can be used. For example, if 10 messages of 3 bytes each needed to be send as a group so that the client application could know that the messages were related to the same scan of the micro-controller, then the first 9 messages would have MMP set and the last message of the group would have MMP=0.

The following presents a summary of defined APIs for the software architecture 10 and then each one of these commands and feedback messages is described in detail. The advantage of this approach is that it allows the developer to choose the modules within the software architecture 10 that are appropriate for the current stage of development (i.e., unit test, engineering testing, production, etc). Furthermore, compiling out certain modules allows developers to use portions of the software architecture 10 in those cases were RAM/ROM resources would otherwise be prohibitive. The APIs are described with their currently-selected application program interface identifier (API ID), however, any identifier can be employed without departing from the scope of this invention. The associated functions made capable by the particular API are enumerated beneath each API. Bulleted functions ("•") are feedback messages which are sent from the software architecture 10 to the client (such as an internal client 16 or an external client 22) and non-bulleted functions are commands which are sent from client (16, 22) to the software architecture 10.

One note on a convention used in this application. The word "extends" refers to the ability of one API to build on the functionality of a baser-level API. The extends keyword means: When API x 'EXTENDS' API y, then API x=API x+API y. This notation simplifies the task of record keeping and API documentation. In other words, API x also includes those functions specified in API y. If API x and API y each specify a function with the same Op Code, the implementation of API x implementation can take precedence.

The following table describes the Core API (API ID=1):

Message Acknowledgment
Publish Heartbeat
Set Heartbeat Period
New Heartbeat Period
Read Memory
Publish Memory Data
Read EE
Publish EE Data
Send Event(s)
Publish Event The following table describes the basic data acquisition API (Basic DAQ, API ID=2, Type=1):

Create Numeric Event
Create Byte Event
Clear Event(s)
Publish Events Cleared
Reset SA
Publish SA Reset
Set External On
Publish External On
Set External Off
Publish External Off The following table describes the extended data acquisition API (Extended DAQ, API ID=2, Type=2):

The extended DAQ is inclusive of the Basic DAQ at runtime.

Get Event Data
Publish Numeric Event Data
Publish Byte Event Data
Create Remote Numeric Event
Create Remote Byte Event
Get Remote Variable Data
Publish Remote Variable Data The following table describes the Discovery API (API ID=3):

| |
|---|
| Find Nodes |
| Publish Node |
| Get APIs |
| Publish APIs |
| Get API Info |
| Publish API Info |
| Get Instance Info |
| Publish Instance Info |

The following table describes the Core Debug API (API ID=4):

| |
|---|
| Publish Saturation |
| Register for Saturation Message |

The following table describes the Low Level API (API ID=5):

| |
|---|
| Set Development State |
| Publish State |
| TBD (Appliance Specific) |

The following table describes the Core Key Press API (API ID=6):

| |
|---|
| Press Key (key index) |
| Publish Key Press (key index) |

The following table describes the Core Memory/Port API (API ID=7):

| |
|---|
| Write Memory |
| Write EE |

The Energy Management API is API ID=8. As does the other APIs, the Energy API is made of a collection of Op Codes, each representing a useful function relating to energy management, and having an associated collection of bytes which are the appropriate parameters to achieve the function.

The following table describes the Poll Variable API (API ID=10):

| |
|---|
| Read Poll Variable |
| Publish Poll Variable |

The Core API (API ID=1 herein) is the smallest subset of the software architecture 10 functionality that can be deployed. However, it is contemplated that other embodiments compliant with packet structure 28 may be developed. It makes provisions to design the two hard coded data acquisition schemes referenced in FIG. 5.

Figure 5:
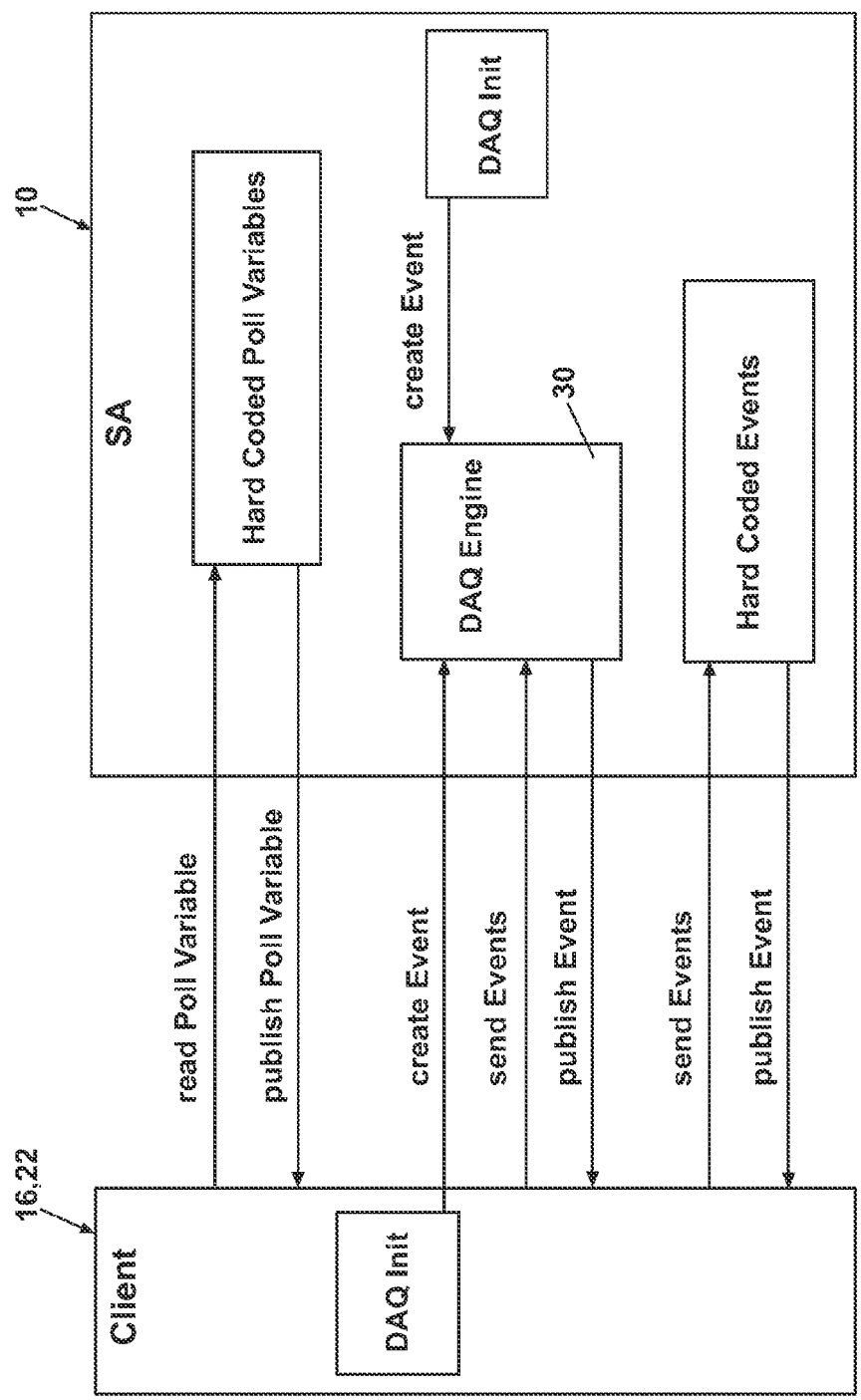
FIG. 5 is a schematic illustration of communication between a SA residing on a controller, controller SA, of the appliance and an SA residing on a component to create a client relationship, client SA, relative to the SA on the controller where various variables and events are transmitted between the controller SA and the client SA.

In the Core API, a protocol mechanism, send Events of FIG. 5, allows the client (16, 22) to request the event source to send all or send a specified set of events. In this way, a type of polling is possible within the framework of the eventing architecture without separate message definitions or implementation structures and logic. Moreover, this mechanism enables robust system startup conditions. For example: if all network nodes send all events simultaneously at system power up, misoperation within the software of a client 16 or 22 where the software components therein would not be able to accurately process the plurality of messages generated as a result of a power-up condition are more likely.

The DAQ API (API ID=2) presents a dynamic mechanism query for a component 16 enabled by the software architecture 10. This feature allows the client 16/22 to configure an embedded software engine (an array of structures whose elements are instanced and stored in a dynamic memory heap [see DynamicMemoryHeap of FIG. 33 containing a collection of NVOEvent structures]) which associates a section of microprocessor memory with an event operator (described in a table below) and arguments. Pointers into memory, values of the memory, event operators and operator arguments are stored in the memory heap's array of structures [FIG. 33 Heap[ ] containing NVOEvent structures]. As shown in FIG. 5, the DAQ engine can be configured in 2 ways:
  1. Application software apart from the software architecture 10 which resides in the same microprocessor can configure the DAQ 30 as is shown by the arrow in FIG. 5 from the DAQ Init( ) software component.
  2. Secondly, external clients may use the DAQ API (described herein) to configure the DAQ from the network 14.

The rational for each method of DAQ configuration is discussed 3 paragraphs hence.

Figure 36:
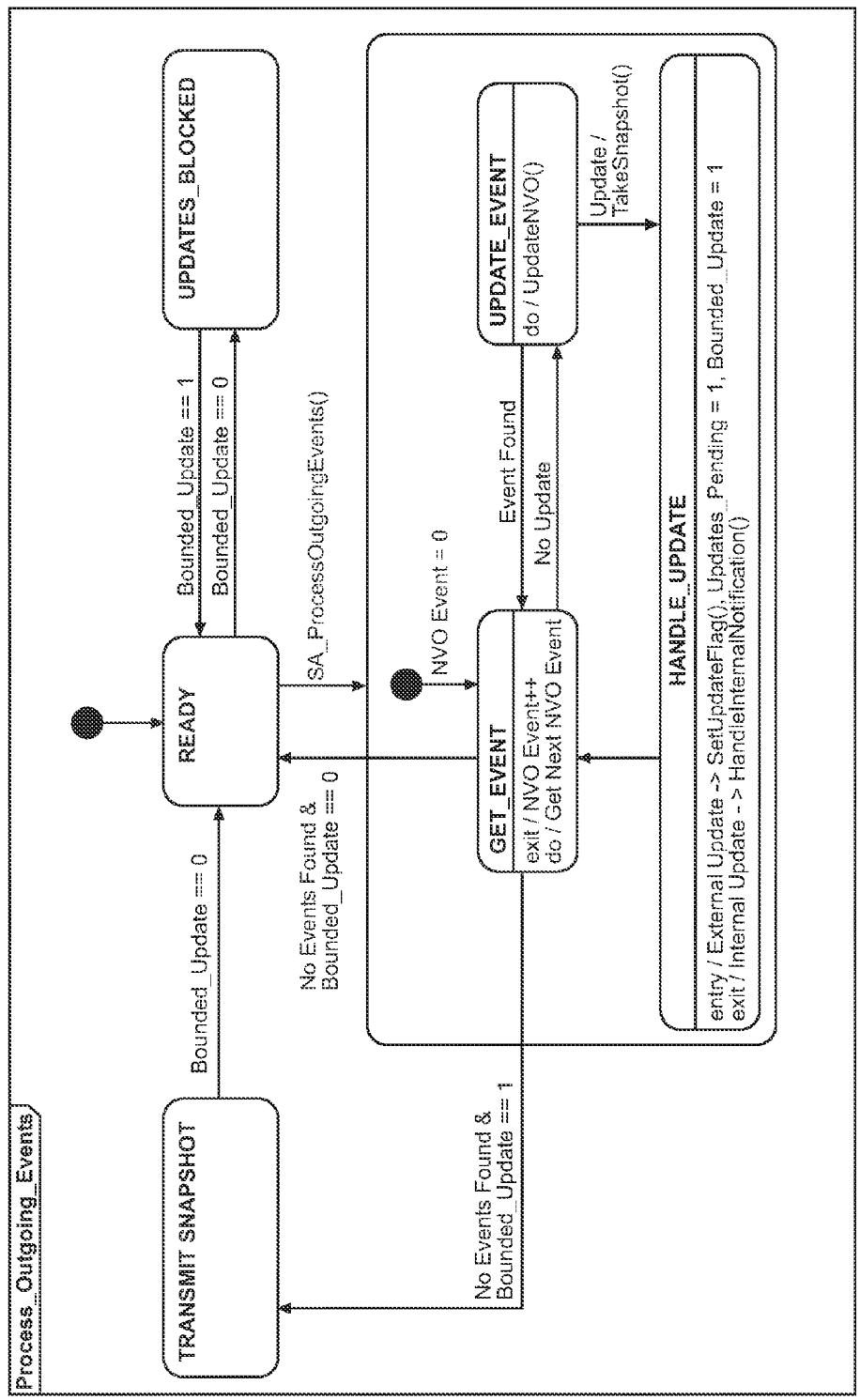
FIG. 36 shows a collection of inter-related UML state diagrams illustrating 4 primary states (READY, TRANSMIT SNAPSHOT, UPDATES_BLOCKED, and PROCESS_DAQ_EVENTS).

As shown in the Process DAQ Events State Diagram of FIG. 36, when the DAQ engine is executed, it iterates over each event structure, checking the associated memory locations against the event operator and arguments. When the event conditions evaluate to a TRUE, message buffers are constructed within the internal memory reflecting the data associated with the event condition. When the iteration is complete, notification messages are generated and preferably broadcast to the network. Alternatively, notification messages can be directed to a specific component 16 if additional memory is allocated to store the network identifier of the component which initially requested or configured the event.

A developer can use several event operators. Examples include: on change, greater than, less than, equal to, deadband, bitmask, etc. Several Op Codes of the DAQ API are provided to control the memory heap at runtime such as: clear Events, add Events, External notification on/off, get Events, get Event Data, etc.

In total, the software architecture 10 supports four schemes for data collection (all of which are shown in FIG. 5). Two of the four schemes, describe briefly above, are reliant on the DAQ. The other two schemes, also briefly described above, are hardcoded. Each scheme can co-exist within the software architecture 10. Each scheme provides certain optimizations at the expense of other resources.
  1. In a client-configured data acquisition scheme, dynamic events are created. This method can be used if the microprocessor has enough RAM/ROM capacity and is most commonly used when the client is a PC application. Using the DAQ API, a developer can re-use code, require less engineering time, leverages a proven re-useable eventing module, is flexible (e.g., can be configured at runtime), and there can be an optimization of network bandwidth. However, this method can require more RAM/ROM than hard coded methods and an embedded client might not have access to needed data files at runtime.

In the client-configured data acquisition scheme, the DAQ engine 30 must be provided a memory location in order to watch for an event. With a variable map, this is practical when the client is a PC application as in FIG. 26A. However, when the client is, for example, another control board that implements the software architecture 10, access to a variable map is impractical. Thus, this invention provides functionality for an embedded variable map located in the memory of a node implementing the software architecture 10. This variable map links an API and Op Code to a variable address as in FIG. 26B. Thus, in order to register for an event on said node, the client needs only know the API and Op Code for that variable, not the specific memory address.

Using the embedded variable map in the client-configured data acquisition scheme, the situation may arise where a particular client is restricted from creation of an event because the associated API and Op Code pair has already been registered by another node. In such a situation, this invention provides that node the ability to request information about the embedded variable map. Included in this information is the variable's memory address. With this information, the client node can the register for an event of the same variable using the variable's address and a different API and Op Code pair than previously attempted (see FIG. 27).

2. An alternative to the client configured DAQ, is a self configured DAQ. In this case, the internal logic uses the DAQ engine to create NVOEvent structures in the DynamicMemoryHeap of FIG. 33. This can be a useful scheme when the events to be realized are fixed and are known at the time of design and there are enough RAM and ROM resources to reuse the difference engine (the logic contained within the DAQ 30) of the DAQ 30. Therefore this method has similar benefits as the client-configured dynamic event scheme, and moreover, will require more RAM/ROM than hard coded methods (described below).

3. In a hard-coded eventing module, a developer can optimize network bandwidth, optimize use of RAM/ROM and can conform to the DAQ API. However, this scheme requires a custom-coded solution to generate the events and does not rely on the software and logic of the DAQ 30 as shown in FIG. 36).

4. Using the hard-coded polling method provided by the Core API, a developer can optimize use of RAM/ROM by creating custom-coded solution. Polling will generally waste network bandwidth, but is sometimes used due to its simplicity.

FIG. 5 illustrates one example of each type of potential data acquisition method. An installation of the software architecture 10 can support one, some, or all of the 4 methods. Each of the installation 10 and the client 16 may have a DAQ API initialized thereon. The software architecture 10 may have one or more hard-coded polling variables, one or more hard-coded events, and/or a DAQ engine 30 as described. Various variables and events are transmitted between the main software architecture installation and the client. For example, various hard-coded polling variables are exchanged between the software architecture 10 and the client 16 by the read Poll Variable and publish Poll Variable methods. Various hard-coded events are exchanged between the software architecture 10 and the client 16 by the send Event and publish Event methods. A create Event method is called by the DAQ Init engine which is sent to the DAQ Engine 30 which, in turn exchanges a generated event with the client 16 by the send Event and publish Event methods. The DAQ engine 30 in the software architecture 10 can also create an event received via a create Event method received from the client 16.

Figure 5A:
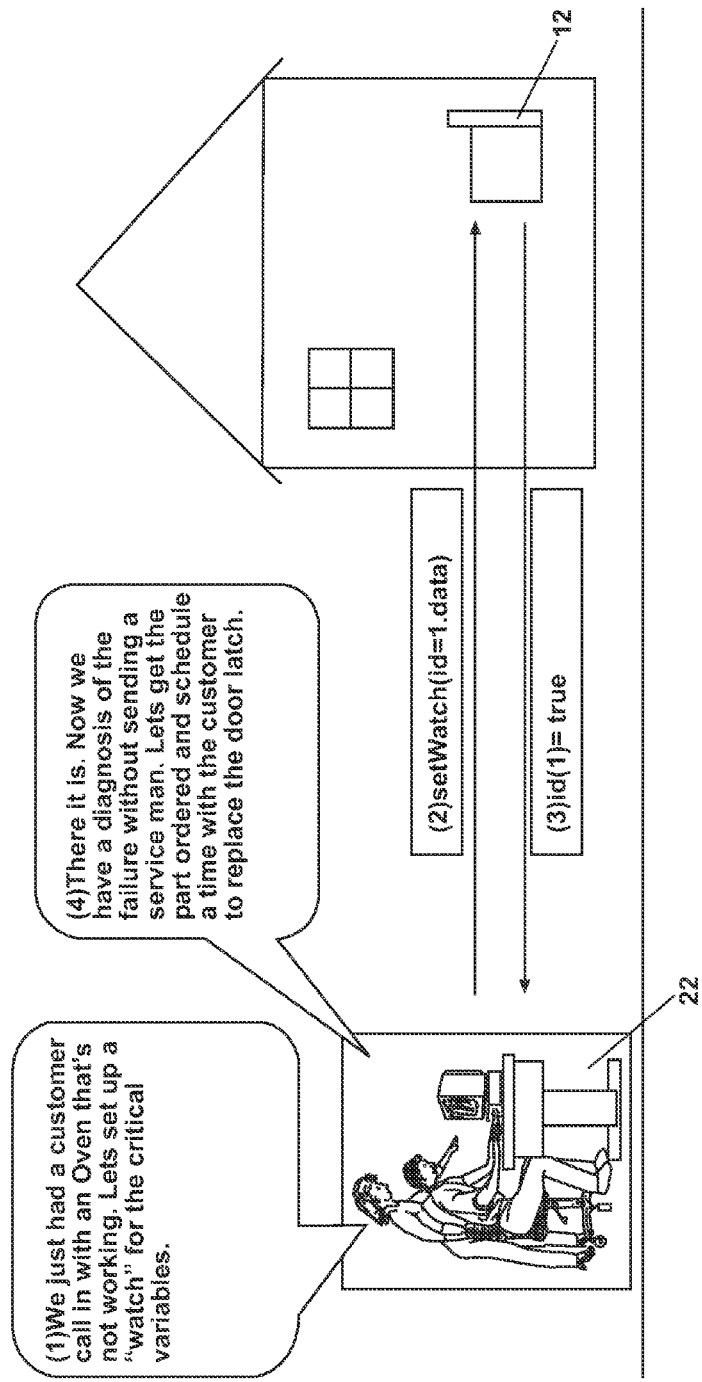
FIG. 5A is a schematic illustration similar to FIG. 5 and illustrating the client as an external client at a remote location in the form of a customer call support center to illustrate an exchange of data used to perform remote diagnosis of the appliance.

FIG. 5A is a schematic illustration showing communication between a household appliance 12 having the software architecture 10 installed therein according to the invention and shown in FIG. 1 and a client 16 at a remote location, such as a customer call support center as shown in FIG. 5A. The appliance 12 has an interface 18 to its internal network 14 and a network interface 20 which allows it to communicate with the external client 22. The schematic of FIG. 5A shows the customer service center setting up a variable watch using the DAQ Engine 5 create Event function and diagnosing a trouble with the household appliance 12 without needing to send out a service truck to the residence.

The software architecture 10 can be customized to allow for the needs of different implementation platforms. RAM and ROM space and time complexity can be managed, as well as access to memory locations, and timeouts. All of these are located in a predetermined parameters file. It will be understood that the parameters can be renamed, changed, retyped, added or deleted without departing from the scope of this invention.

The Discovery API (API ID=3) enables the concept of "Plug 'n Play" architecture. The Discovery API implies that a physical network node or client 16 can contain n functions, each encapsulated by a known API with a unique ID, Type, and Version. These APIs are portable (meaning they represent functionality and are independent of the microprocessor, software language, and network topology) and re-useable on other components where the functionality therein is applicable. The Discovery protocol (described in API 3 of FIG. 6) allows the client to learn the associations between the components 16 and the groups of functionality (APIs) which they contain.

Figure 6:
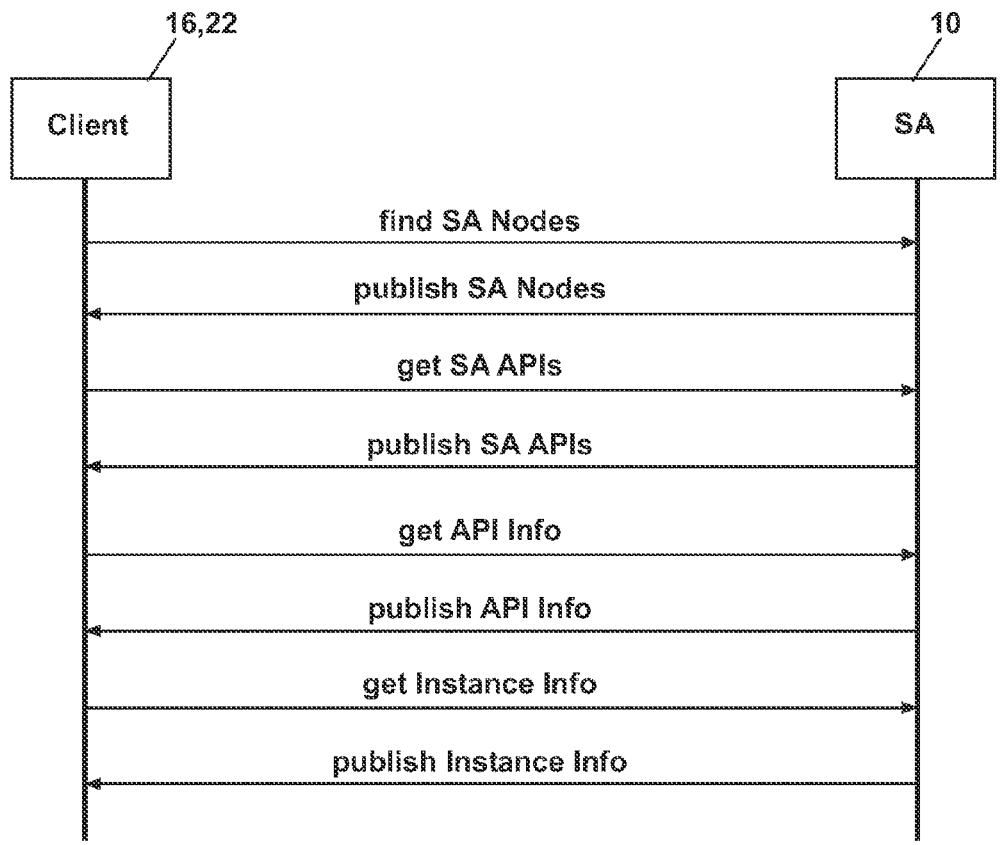
FIG. 6 is a schematic illustration similar to that shown in FIG. 5 illustrating a discovery technique contained in the software architecture of FIG. 1 according to the invention.

FIG. 6 illustrates a typical Discovery API sequence. Having no structures in memory representing the other software architecture 10 enabled components, a client 16, 22 transmits a command to locate components 16 within the appliance which are enabled with the software architecture (by issuing a "find Nodes" command). Enabled components respond that they are, indeed, enabled (by issuing a broadcasted "publish Nodes" command). Then, the client 16 transmits a command to identify which APIs are located on each enabled node (by issuing a "find APIs" command). Each enabled node responds with a bounded message containing its API IDs (by replying with a "publish APIs" message). Then, the client 16, 22 issues a command to identify information about each of the APIs found on each enabled node (by issuing a "get API Info" command). Each enabled node responds with a bounded message (whose purpose and structure are described in FIG. 9) containing information about the API contained therein (by replying with a "publish API Info" message). This message can include type, version, and the number of occurrences (or instances) of a particular API Id. In cases where the number of instances of a particular API within a single component 16 exceeds one (meaning there are multiple of the same APIs installed on a component 16, such as in the case of a multiple-cavity oven which might use multiple oven control APIs), the client 16 issues a command to get information on each instance of an API (by issuing a "get Instance Info" command). The software architecture 10 responds with the requested information (by the "publish Instance Info" message). Multiples of the same instance are auto-numbered with a pseudo-API ID by the software architecture.

In addition when a component 16, enabled by the software architecture 10 and having resident the sub-component of the software architecture 10 Discovery which is API Id=3, initializes it will automatically send out a message announcing itself (API Id=3, Op Code=2 publishSANode( )).

Also, if the user of the software architecture so chooses, the Discovery sequence of FIG. 6 may be altered by omitting messages 1 and 2 (op codes 1 & 2 respectively). The approach is valid in that the client may initiate discovery by issuing an Op code=3 message, getSAAPI(collection) which will result in responses from all components enabled by the software architecture 10 thus obviating the need for messages 1 and 2 in most cases.

It is also contemplated that an abbreviated messaging sequence could achieve the same results as the aforementioned discovery sequence. In an abbreviated discovery sequence, each node issues a message after power-up containing within one message the totality of information which was described in the aforementioned discovery sequence. Each node receiving this message would reply back with the same information about itself giving the node which just powered up the discoverable information from all the nodes that were already powered up.

This Discovery API protocol mechanism allows a client 16 to locate a logical entity at runtime without prior compile time programming. Moreover, this mechanism allows the client 16 to determine if expected components are resident or missing.

From this knowledge, the client can configure itself and/or present the user with the appropriate inferred functionality.

The Low Level API (API ID=5) exposes via the network 14, capability allowing the client to control (actuate) the output devices which are electrically connected to the containing component 16 and to provide read and/or write access to the numeric value which represents the current state and potentially the state history of the electrically connected input device. Typical examples of outputs are valves, relays, triacs, solenoids, LEDs, lamps, buzzers, and so on. Typical examples of inputs are push buttons, switches, sensors (e.g., pressure, temperature, and over-temperature), and so on. In the preferred embodiment, the Low Level API as well as the Memory—Port API are available only in the 'Development State' of FIG. 3 of the software architecture 10 of the appliance 12. 'Development State' can only be entered from the appliance 12 'Idle State' of the exemplary Appliance state diagram of FIG. 7. Also in the preferred embodiment, if any user interface actions are initiated via a keypad, LCD, or other user interface device of the appliance 12 during 'Development State', the appliance 12 can revert back to the 'Idle State' of FIG. 7 and setting each output back to its un-actuated state. The messages for initiating 'development state' can be found in the message definition specification for the Low Level API. (See API 5, Op Code 2). This network message is defined to allow the appliance 12 to enter the development state. In development state, a special API is enabled and exposed to the network 14 which allows the client 16 to control the electronic outputs of the appliance 12 directly. In development state, production oriented business rules such as validation are by-passed giving the client 16 complete control of the electronic sub-system.

The Low Level API can be used to implement non-standard operation of the appliance in that the appliance can be operated in a manner other than in accordance with one of the predetermined operating cycles implemented by the appliance software operations layer, which typically resides on the main controller. In this way, the Low Level API can be thought of as enabling additional cycles of operation. Some examples of additional cycles of operation include: a demonstration cycle; a development cycle; an error detection cycle; a diagnostic cycle; a cycle that reduces the time of at least one timed step of one of the predetermined cycles of operation; a cycle that bypasses at least one operational step of one of the predetermined cycles of operation; a cycle that substitutes a timed step for a step that responds to an event of one of the predetermined cycles of operation; and a cycle that exposes the low level API to the network The Key Press API (API 6) allows the client 16 to press virtual keys. This provides an equal method by which to exercise and test the software without mechanical or human actuation of the physical key pad.

One note on a convention used in this application. The word "extends" refers to the ability of one API to build on the functionality of a baser-level API. The extends keyword means: When API x 'EXTENDS' API y, then API x=API x+API y. This notation simplifies the task of record keeping and API documentation. In other words, API x also includes those functions specified in API y. If API x and API y each specify a function with the same Op Code, the implementation of API x implementation can take precedence.

Exemplary application packets for the payload portion of the packet structure for the internal communications network of the household appliance follow. The application packets are grouped according to API.

Core API: API ID=1 (Type 3, Version 1). The following application packet represents a directed message from the software architecture 10 to a client for publishing acknowledgement (Publish Acknowledgement). This message is sent by the software architecture 10 to the sender of a previous message. It contains an enumerated value representing the results of the previous command processed by the software architecture 10. Generally, the receipt of the acknowledgment indicates that the sender can initiate the next message.

| API ID | Op Code | Byte 3 | Byte 4 | Byte 5 |
|---|---|---|---|---|
| 1 | 1: publish Acknowledgement | Reason code | API | OpCode |

Note that the API and op code of the previously received command (the one that is being acknowledged) is contained within byte 4 and 5 of the payload. This provides the receiver of the acknowledgment (the component 16 which sent the original command) certainty as to which previously transmitted command is being acknowledged. (The previously transmitted command having the unique identifier of API Id and Op Code.) It should be noted that in the drawings and descriptions, the ACK is generally assumed and is not continuously repeated or documented Enumeration values for the reason code of the above application packet are shown in the table below.

| Enumeration Value for Reason Code | Reason Code Name | Programming Notes |
|---|---|---|
| 0 | READY* | The command was successfully executed and the SA is ready to accept another command. |
| 1 | BUSY* | The SA module is currently busy executing a command. Usually just an internal state. |
| 2 | REJECTED* | The command sent to the SA was rejected, because there was another command still in process. |
| 3 | ACK_EVENT | The command was not executed because the SA is currently waiting for an acknowledgement. |
| 4 | UNSUPPORTED | The command was unsupported for some reason and did not execute. (Ready for next command) |
| 5 | UNSUP_OP_CODE | The command was unsupported and did not execute due to an invalid op code. (Ready for next command) |
| 6 | UNSUP_UNAVAILABLE | The command was unsupported and did not execute because it is currently unavailable in this state. (Ready) |

-continued

| Enumeration Value for Reason Code | Reason Code Name | Programming Notes |
|---|---|---|
| 7 | UNSUP_INVALID_PARAM | The command was unsupported and did not execute due to an invalid or out of bounds parameter. (Ready) |
| 8 | UNSUP_OUT_OF_MEMORY | The command was unsupported and did not execute because the dynamic heap is out of memory. (Ready) |
| 9 | UNSUP_DOOR_OPEN | The command was unsupported and did not execute because the appliance door was open. (Ready) |
| 10 | UNSUP_BOUND_CMD_INCOMPLETE | The bounded command was not fully received before a specified timeout, so it was not fully executed. (Ready) |
| 11 | UNSUP_CANNOT_PAUSE_NOW | Unable to pause due to state of appliance process. |
| 200-255 | Application Specific | Application Developers may use these return values in their applications. It is up to the Developer to document the Application Specific reason codes. |

*0-3 are reserved for use by the software architecture 10

The following application packet represents a broadcast message from the software architecture 10 to a client (16 or 22) for publishing heartbeat (Publish Heartbeat). This message is periodically sent by the software architecture 10. This allows nodes, which have registered for events, to maintain confidence in the event sources. In other words, heartbeat insures connection integrity. Alternatively, the client (16 or 22) may determine that each or some event(s) sent by the software architecture 10 should receive an acknowledgement sent by the client back to the software architecture 10 before the software architecture 10 deems the transaction associated with the generation and transmission of the event to be complete. If a particular event has been created with the 'acknowledgment' classifier according to the message specification of API 2, Op Code=1, 2, 12, or 13, the software architecture 10 will define the end of the transaction associated with the generation and transmission of the event to be complete when an acknowledgment message is received according to the message specified by API Id 1 and Op Code 1.

Publish Heartbeat will not be sent until after the software architecture 10 receives a command. This can be used to prevent a Traffic Storm condition during power-up. (Traffic Storm refers to a misoperation within the software of a client 16 or 22 where the software components therein would not be able to accurately process the plurality of messages generated as a result of a power-up condition.) Publish Heartbeat will be suspended after a Reset SA message, which is described below with respect to the Core DAQ API and Op Code 8, is received, but will resume after the next subsequent command. This is a feedback message.

| API ID | Op Code | Byte 3-Byte F |
|---|---|---|
| 1 | 2: heartbeat | |

The following application packet represents a directed message from a client to the software architecture 10 for setting heartbeat period (Set Heartbeat Period), which is setting a frequency at which the heartbeat message is sent by the software architecture 10. Exemplary frequencies range from 0 seconds (off) to 3600 seconds (1 hr).

| API ID | Op Code | Byte 3 | Byte 4 | Byte 5-Byte F |
|---|---|---|---|---|
| 1 | 3: setHeartbeatPeriod | Sec MSB | Sec LSB | |

The following application packet represents a broadcast message from the software architecture 10 to a client for publishing the heartbeat period (Publish Heartbeat Period). This message is a response to Set Heartbeat Period. It is necessary so that if a second client changes the heartbeat period, the first client will be notified. Clients who require non-changing heartbeat periods should use the DAQ API to set up an event with a constant broadcast operator, See DAQ API Id=2, Op Code 1, Byte 9=4, 5, or 6 (see change operator table).

| API ID | Op Code | Byte 3 | Byte 4 | Byte 5-Byte F |
|---|---|---|---|---|
| 1 | 16: newHeartbeatPeriod | Sec MSB | Sec LSB | |

The following application packet represents a directed message from a client to the software architecture 10 for reading memory, particularly the RAM (Read Memory). It is sent to the software architecture 10 and results in a "Publish Memory Data" response, which is shown below (Op Code 4) and contains values specified in Bytes 3-7 of the packet below.

| API ID | Op Code | Byte 3 | Byte 4 | Byte 5 | Byte 6 | Byte 7 | Byte 8-Byte F |
|---|---|---|---|---|---|---|---|
| 1 | 5: readMemory | Address Hi-byte | Address Mid-Byte | Address Low-Byte | Size MSB | Size LSB | |

The following application packet represents a directed message from a client to the software architecture 10 for reading EE memory (Read EE). It is sent to the software architecture 10 and results in a "Publish EE Data" response (Op Code=8), which is shown below and contains the values specified in the Read EE packet, Bytes 3-7 below.

| API ID | Op Code | Byte 3 | Byte 4 | Byte 5 | Byte 6 | Byte 7 | Byte 8-Byte F |
|---|---|---|---|---|---|---|---|
| 1 | 6: readEE | Address Hi-byte | Address Mid-Byte | Address Low-Byte | Size MSB | Size LSB | |

The following application packet represents a directed message from the software architecture 10 to a client for publishing memory data (Publish Memory Data) and is a response to Read Memory.

| API ID | Op Code | Byte 3 | Byte 4 | Byte 5 | Byte 6 | Byte n | Byte 8-Byte F |
|---|---|---|---|---|---|---|---|
| 1 | 4: publishMemoryData | data MSB | data | data | ... | data LSB | |

The following application packet represents a directed message from the software architecture 10 to a client for publishing EE memory data (Publish EE Data) and is a response to Read EE.

| API ID | Op Code | Byte 3 | Byte 4 | Byte 5 | Byte 6 | Byte n | Byte 8-Byte F |
|---|---|---|---|---|---|---|---|
| 1 | 8: publishEEData | data MSB | data | data | ... | data LSB | |

The following application packet represents a directed message from a client to the software architecture 10 for sending events (Send Events). The message instructs the software architecture 10 to send specified events regardless of event trigger criteria.

Note: Event Id is used synonymously with Op Code. Event Id is a more descriptive term for Op Code when describing an Event which is part of an API.

Note: the notation used below is repeated through out the document and is described here only. If Byte 3 contains the reserved value 0xFF, then the software architecture 10 interprets Byte 3 to mean all API Ids. Otherwise, Byte 3 specifies a particular API Id. Likewise, If Byte 4 contains 0xFF, the software architecture 10 interprets Byte 4 to mean all Events for the API or APIs specified in Byte 3. Otherwise, Byte 4 contains a single Event Id. Bytes 5 through Byte n contain a single Event Id.

| API ID | Op Code | Byte 3 | Byte 4 | Byte 5 | Byte 6 | Byte 7 | Byte 8-Byte F |
|---|---|---|---|---|---|---|---|
| 1 | 7: send Event(s) | API id (0xFF = all) | EventId# (0xFF = all) | EventId# | EventId# | EventId# | |

The following application packet represents a broadcast message from the software architecture 10 to a client for publishing events (Publish Event) and is a response to the above Send Events message. Alternatively, if the DAQ Engine is being used, this message is sent when the event trigger criteria is satisfied. Below, API Id and Op Code are notated as 'client defined'. This refers to the assignment made of API ID and Op Code by the createEvent commands (sent by the Client) of DAQ API (API Id=2) specifically in Bytes 7 and 8 of Op Code 1 & 2 and Bytes 3 and 4 of Op Code 12 & 13

| API ID | Op Code | Byte 3 | Byte 4 | Byte 5 | Byte 6 | Byte 7 | Byte 8-Byte F |
|---|---|---|---|---|---|---|---|
| client defined | client defined | data MSB | data | data | ... | data LSB | |

Core DAQ API: API ID=2 (Type 3, Version 1). The following application packet represents a directed message from a client to the software architecture 10 for creating a numeric event (Create Numeric Event). The message, identified by API Id of 2 and Op Code of 1 or 2 allows the client to create and configure feedback variables [NVOEvent structures of FIG. 33]. Byte 7 and 8 are used to assign the identifier (API Id and Op Code) which will be used to populate fields in the publish event message (API Id 1) when the event conditions are such that an event message is generated. Generated event messages are of the form found in the preceding description of the Core API where the message packet is labeled as 'Publish Event'. The identifiers API Id and Op Code located in bytes 1 and 2 respectively of the Publish Event message. The values found in these bytes can be assigned through the messages defined for the DAQ API, Op Codes 1 and 2 below. Bytes 3-5 contain the address in the memory of the software operating environment which will be evaluated for the event condition represented by Byte 9 which is an enumeration of evaluation rules and Bytes A and B which are arguments to the evaluation rules. Byte 6 specifies the number of contiguous bytes which should be evaluated as a single numeric value with respect to Bytes 9, A, and B.

| API ID | Op Code | Byte 3 | Byte 4 | Byte 5 | Byte 6 | Byte 7 |
|---|---|---|---|---|---|---|
| 2 | 1: createNumericEvent | address Hi-Byte | address Mid-Byte | address Low-Byte | size 1, 2, 4 | API Id |

| API ID | Op Code | Byte 8 | Byte 9 | Byte A | Byte B | Byte C |
|---|---|---|---|---|---|---|
| 2 | 1: createNumericEvent | Event Id | Change Operator | Change Val MSB | Change Val LSB | ACK'd Event<br>1 = ACK'd<br>0 = unACK'd |

Event operators associated with Byte 9 of the above application packet are discussed in further detail following this section of exemplary application packets and are shown in the table that denotes event operators available when creating a numeric-based event. Additionally, byte C corresponds further classification resulting in either acknowledged or unacknowledged events (discussed later). See FIG. 29 for an example of the operation of an acknowledged event.

The following application packet represents a directed message from a client to the software architecture 10 for creating a byte event (Create Byte Event). The messages definitions, identified by API Id=2 and Op Code=1 or 2 allows the client to create and configure feedback variables (events). The message specification for Op Code 2 is similar in intent, but has different implementation details that provide usefulness for certain application use cases. API Id 2 with Op Code 2 differs in functionality from API 1 Op Code 1 in that depending on the value of Byte A, either only 1 byte within the range specified by Bytes 3-5 and Byte 6 or all the bytes will be evaluated based on Byte 9's change operator and Byte B's change value. Whereas in the case of Op Code 1, the specified bytes were evaluated as a single numeric. In the case of Op Code 2, each byte or a single byte, according to the value specified in Byte A, will be evaluated independently according to the change operator specified in Byte 9 and the change value specified in Byte B.

| API ID | Op Code | Byte 3 | Byte 4 | Byte 5 | Byte 6 | Byte 7 |
|---|---|---|---|---|---|---|
| 2 | 2: createByteEvent | address Hi-Byte | address Mid-Byte | address Low-Byte | size | API Id |

-continued

| API ID | Op Code | Byte 8 | Byte 9 | Byte A | Byte B | Byte C |
|---|---|---|---|---|---|---|
| 2 | 2: createByteEvent | Event Id | Change Operator | byte index 0-255 0xFF = all | Change Val | ACK'd Event 1 = ACK'd 0 = unACK'd |

Event operators associated with Byte 8 of the above application packet are discussed in further detail following this section of exemplary application packets and are shown in the table that denotes event operators available when creating a byte-based event. Additionally, byte C corresponds to further classification resulting in either acknowledged or unacknowledged events (discussed later.) See FIG. 29 for an example of the operation of an acknowledged event.

The following application packet represents a directed message from a client to the software architecture 10 for clearing event(s) (Clear Event(s)). The Clearing Events message allows the client to clear the event definitions previously created with either of the create event Op Codes (1 or 2, as shown above). The client can send multiple Clear Event commands to the software architecture 10 using the MMP flag if synchronization is needed across multiple commands.

| API ID | Op Code | Byte 3 | Byte 4 | Byte 5 | Byte 6 | Byte n | Byte 8-Byte F |
|---|---|---|---|---|---|---|---|
| 2 | 3: clearEvent | API Id (0xFF = all) | EventId# (0xFF = all) | EventId # | EventId # | EventId # | |

The following application packet represents a broadcast message from the software architecture 10 to a client for publishing events cleared (Publish Events Cleared) and is a response to Clear Events. The message notifies the clients of the software architecture 10 when Op Codes or APIs are removed from the existing the software architecture node interface.

| API ID | Op Code | Byte 3 | Byte 4 | Byte 5 | Byte 6 | Byte n | Byte 8-Byte F |
|---|---|---|---|---|---|---|---|
| 2 | 4: publishEventsCleared | API Id (0xFF = all) | EventId# (0xFF = all) | EventId# | EventId# | EventId# | |

The following application packet represents a directed message from a client to the software architecture 10 for resetting the software architecture 10 (Reset SA). The Reset SA command instructs the software architecture 10 to re-initialize as if it had just powered up.

| API ID | Op Code |
|---|---|
| 2 | 8: resetSA |

The following application packet represents a broadcast message from the software architecture 10 to notify that the software architecture 10 has been reset (Publish SA Reset) and is a response to Reset SA.

| API ID | Op Code |
|---|---|
| 2 | 9: publishSAReset |

The following application packet represents a directed message from a client to the software architecture 10 for turning on external notification for a specified event (Set External On). The command instructs the software architecture to externally notify clients of the event. See FIG. 28 for an example of the usage of this command.

| API ID | Op Code | Byte 3 | Byte 4 | Byte 5 | Byte 6 | Byte n |
|---|---|---|---|---|---|---|
| 2 | 10: setExternalEventOn | API Id | OpCode | OpCode | OpCode | OpCode |

The following application packet represents a broadcast message from the software architecture 10 to notify that external notification of the specified event has been turned on (Publish External On) and is a response to Set External On. See FIG. 28 for an example of the result of this command.

| API ID | Op Code | Byte 3 | Byte 4 | Byte 5 | Byte 6 | Byte n |
|---|---|---|---|---|---|---|
| 2 | 10: publishExternalOn | API Id | OpCode | OpCode | OpCode | OpCode |

The following application packet represents a directed message from a client to the software architecture 10 for turning off external notification for a specified event (Set External Off). The command instructs the software architecture to not externally notify clients of the event.

| API ID | Op Code | Byte 3 | Byte 4 | Byte 5 | Byte 6 | Byte n |
|---|---|---|---|---|---|---|
| 2 | 11: setExternalEventOff | API Id | OpCode | OpCode | OpCode | OpCode |

The following application packet represents a broadcast message from the software architecture 10 to notify that external notification of the specified event has been turned off (Publish External Off) and is a response to Set External Off.

| API ID | Op Code | Byte 3 | Byte 4 | Byte 5 | Byte 6 | Byte n |
|---|---|---|---|---|---|---|
| 2 | 10: publishExternalOff | API Id | OpCode | OpCode | OpCode | OpCode |

Core DAQ API: API ID=2 (Type 4, Version 1—Extends Type 3, Version 1). The following application packet represents a directed message from a client to the software architecture 10 for getting event data (Get Event Data). Get Event Data instructs the software architecture 10 to send definition (s) of specified events. The definition is a mirror image of the data sent in the Create Event Op Code messages, which are shown above as Op Codes 1 or 2 for the Core DAQ API. The software architecture 10 will respond with a collection of Publish Event Data messages, which are shown below.

| API ID | Op Code | Byte 3 | Byte 4 | Byte 5 | Byte 6 | Byte n | Byte 8-Byte F |
|---|---|---|---|---|---|---|---|
| 2 | 5: getEventData | API Id (0xFF = all) | EventId# 0xFF = all) | EventId# | EventId# | EventId# | |

The following application packet represents a directed message from the software architecture 10 to a client for publishing numeric event data (Publish Numeric Event Data), and is a response to Get Event Data. Each event definition is reported in a separate internal network message and is governed by snapshot rules associated with the MMP flag of 28 of FIG. 4. The event definition contains the information specified about the event in Create Numeric Event.

| API ID | Op Code | Byte 3 | Byte 4 | Byte 5 | Byte 6 | Byte 7 | Byte 8 | Byte 9 | Byte A | Byte B-Byte F |
|---|---|---|---|---|---|---|---|---|---|---|
| 2 | 6: publishNumericEventData | address MSB | address LSB | size = 1, 2, 4 | API Id | Event Id | Change Operator | Change Val MSB | Change Val LSB | |

Event operators associated with Byte 8 of the above application packet are discussed in further detail following this section of exemplary application packets and are shown in the table that denotes event operators available when creating a numeric-based event.

The following application packet represents a directed message from the software architecture 10 to a client for publishing byte event data (Publish Byte Event Data) and is response to Get Event Data. Each event definition is reported in a separate internal network message and will be governed by the snapshot rules associate with the MMP flag of 28 of FIG. 4. The event definition contains the information specified about the event in Creation Byte Event.

| | Op Code | Byte 3 | Byte 4 | Byte 5 | Byte 6 | Byte 7 | Byte 8 | Byte 9 | Byte A | Byte B-Byte F |
|---|---|---|---|---|---|---|---|---|---|---|
| 2 | 7: publishByteEventData | address MSB | address LSB | size | API Id | Event Id | Change Operator | byte index 0-255 | Change Val | |

Event operators associated with Byte 8 of the above application packet are discussed in further detail following this section of exemplary application packets and are shown in the table that denotes event operators available when creating a byte-based event.

The following application packet represents a directed message from a client to the software architecture 10 for creating a remote numeric event (Create Remote Numeric Event). The message allows the client or another module in the embedded system to configure feedback variables associated with an existing API and Op Code using an embedded variable map. Although the number can be 4 bytes, the change value is limited to 2 bytes. FIG. 26B illustrates the embedded variable map. FIG. 27 defines the interaction between 3 network nodes where Node A successfully creates a Remote Numeric Event on Node B. And where Node C attempts the same, but through the interaction with Node B, is able to accomplish the intent of the request without duplication of the Identifier (API Id and OpCode). This is accomplished because Node C is able to query Node B for the address in memory of the initial Identifier so that an alternative (non-duplicated) Identifier may be selected. The alternative identifier is then used to create the Remote Numeric Event by sending (see message 8 in FIG. 27) a new message to Node B with the original memory address and the alternative Identifier.

| API ID | Op Code | Byte 3 | Byte 4 | Byte 5 | Byte 6 | Byte 7 | Byte 8 |
|---|---|---|---|---|---|---|---|
| 2 | 12: createNumRemoteEvent | API Id | OpCode | Change Operator | Change Val MSB | Change Val LSB | ACK'd Event<br>1 = ACK'd<br>0 = unACK'd |

FIG. 26B illustrates the embedded variable map. FIG. 27 defines the interaction between 3 network nodes where Node A successfully creates a Remote Numeric Event on Node B. And where Node C attempts the same, but through the interaction with Node B, is able to accomplish the intent of the request without duplication of the Identifier (API Id and OpCode). This is accomplished because Node C is able to query Node B for the address in memory of the initial Identifier so that an alternative (non-duplicated) Identifier may be selected. The alternative identifier is then used to create the Remote Numeric Event by sending (see message 8 in FIG. 27) a new message to Node B with the original memory address and the alternative Identifier.

The following application packet represents a directed message from a client to the software architecture 10 for creating a remote byte event (Create Remote Byte Event). The message allows the client or another module in the embedded system to configure feedback variables associated with an existing API and Op Code using an embedded variable map.

| API ID | Op Code | Byte 3 | Byte 4 | Byte 5 | Byte 6 | Byte 7 | Byte 8 |
|---|---|---|---|---|---|---|---|
| 2 | 13: createByteRemoteEvent | API Id | OpCode | Change Operator | Byte Index 0-255 | Change Val | ACK'd Event 1 = ACK'd 0 = unACK'd |

FIG. 26B illustrates the embedded variable map. FIG. 27 defines the interaction between 3 network nodes where Node A successfully creates a Remote Byte Event on Node B. And where Node C attempts the same, but through the interaction with Node B, is able to accomplish the intent of the request without duplication of the Identifier (API Id and OpCode). This is accomplished because Node C is able to query Node B for the address in memory of the initial Identifier so that an alternative (non-duplicated) Identifier may be selected. The alternative identifier is then used to create the Remote Byte Event by sending (see message 8 in FIG. 27) a new message to Node B with the original memory address and the alternative Identifier.

The following application packet represents a directed message from a client to the software architecture 10 for getting remote variable data from an embedded variable map (Get Remote Variable Data). The message instructs the software architecture to publish information concerning the data that exists in the embedded variable map. See FIG. 27 for an example of use of this command.

| API ID | Op Code | Byte 3 | Byte 4 | Byte 5 | Byte n |
|---|---|---|---|---|---|
| 2 | 14: getRemoteVarData | API Id | OpCode | OpCode | OpCode |

The following application packet represents a directed message from the software architecture 10 to a client for publishing remote variable data (Publish Remote Variable Data), and is a response to Get Remote Variable Data. It reports data from the embedded variable map, such as the API, op code, size, and address.

| API ID | Op Code | Byte 3 | Byte 4 | Byte 5 | Byte 6 | Byte 7 | Byte 8 |
|---|---|---|---|---|---|---|---|
| 2 | 14: publishRemoteVarData | Address Hi-Byte | Address Mid-Byte | Address Low-Byte | Size | API Id | OpCode |

Core Discovery API: API ID=3 (Type 3, Version 1). Referring to FIG. 6, the following application packet represents a broadcast message from a client to find nodes of the software architecture 10 (Find Node(s)). This broadcast message enables a node to locate other nodes of the software architecture 10.

| API ID | Op Code | Byte 3-Byte F |
|---|---|---|
| 3 | 1: findNodes | |

The following application packet represents a broadcast message (Publish Node) from the software architecture 10 allowing it to publish its presence to other components participating on 14. This message is sent when a node of the software architecture 10 powers up or is re-set or is sent as a response to Find Nodes. Additionally, this message can be sent when the node of the software architecture 10 through a secondary Discovery process adds (to itself) an API or adds Op Codes to an existing API. Publish Node is not sent when a client dynamically adds an API or Op Code to the software architecture 10 (via DAQ Op 1,2,12,13). The payload of the feedback message contains a firewall password, which is to be used by the firewall security feature of the software architecture 10 (see FIG. 31 for an example of this feature). This allows the sender of the message to become a 'trusted' node on network 14.

| API ID | Op Code | Byte 3 | Byte 4 |
|---|---|---|---|
| 3 | 2: publishSANode | Firewall Password MSB | Firewall Password LSB |

The following application packet represents a message which can be either directed or broadcasts from a client to the software architecture 10 for getting API(s) (Get APIs) of the software architecture 10. This directed message allows the client to discover the APIs that are supported by a specific node of the software architecture 10. API Id must be unique within an appliance.

| API ID | Op Code | Byte 3-Byte F |
|---|---|---|
| 3 | 3: getAPIs | |

The following application packet represents a broadcast message from the software architecture 10 to a client for publishing API(s) (Publish API(s)) of the software architecture 10. This message is a response to Get API(s) and is a directed message that allows the client to discover the APIs that are supported by the sending node of the software architecture 10.

| API ID | Op Code | Byte 3 | Byte 4 | Byte 5 | Byte n | Byte 7-Byte F |
|---|---|---|---|---|---|---|
| 3 | 4: publishAPIs | API # | API # | API # | API n | |

The following application packet represents a message which can be directed or broadcast from a client to the software architecture 10 for getting API information (Get API Info). This directed message allows the client to discover Version and Type information about the specified API(s).

| API ID | Op Code | Byte 3 | Byte 4 | Byte 5 | Byte n | Byte 7-Byte F |
|---|---|---|---|---|---|---|
| 3 | 5: getAPIInfo | API # (0xFF = all) | API # | API # | API n | |

The following application packet represents a directed message from the software architecture 10 to a client for publishing API information (Publish API Info) and is a response to Get API Info. This directed message allows the client to discover Version and Type information about the specified API(s). There is one message per API, and the messages are bounded using the MMP flag of FIG. 4.

| API ID | Op Code | Byte 3 | Byte 4 | Byte 5 | Byte 6 | Byte 7 | Byte 8 | Byte 9 | Byte A | Byte B-Byte F |
|---|---|---|---|---|---|---|---|---|---|---|
| 3 | 6: publishAPIInfo | API Id | Type MSB | Type LSB | Version MSB | Version LSB | Number Instances | Descr Char 1 | Descr Char 2 | Descr Char n |

Bytes 4 and 5 represent an API's Type which can be used As an indication of a specific sub-classification of an API. The value of Type can be used to determine compatibility concerns between sub-components (APIs). Byte 6 and 7 represent an API (of a particular Type)'s Version. This value can be used to indicate bug fixes or changes to functionality. As with Type, it enables a runtime compatibility check, which can inform the client if the versions are compatible. Alternatively, Bytes 4-7 can be used in conjunction with Byte 3 to form a 5 byte class identifier where class refers to a class definition within a class library (whom one of typical competence with the state of the art would understand). Using the alternate approach, Byte 3 (API Id) is a runtime object handle and Bytes 3-7 numerically concatenated form the class id.

The Number Instances associated with Byte 8 signifies to the client than an API has multiple instances. The client can follow up with Get Instance Info, which is described below, to find the Instance Ids that belong to the API. The Descr Char 1-Descr Char n is an optional feature that can be helpful to developers. Descriptive text can be used to annotate API Id. For example, 'upper' or 'lower' could be used for the two cavities of a double oven.

The following application packet represents a directed message from a client to the software architecture 10 for getting instance information (Get Instance Info). This directed message allows the client to discover the Instance Ids for the APIs that report more than one Instance of an API. The first instance of any API uses API Id as its Instance Id. If there are multiple Instances of an API Id on the same addressable node, subsequent instances are assigned an Instance Id dynamically. These dynamically assigned Ids can be discovered by sending the Get Instance Info message. The value of the Instance Id should be used in place of API Id when there are multiple instances of an API on a physical network node.

| API ID | Op Code | Byte 3 | Byte 4 | Byte 5 | Byte n | Byte 7-Byte F |
|---|---|---|---|---|---|---|
| 3 | 7: getInstanceInfo | API # (0xFF = all) | API # | API # | API n | |

The following application packet represents a broadcast message from the software architecture 10 to a client for publishing instance information (Publish Instance Info) and is a response to Get Instance Info. This directed message allows the client to discover the Instance Ids. The first instance of any API uses API Id as its Instance Id. If there are multiple Instances of an API Id on the same addressable node, subsequent instances will be assigned an Instance Id dynamically. These dynamically assigned Ids are communicated via the Publish API Info message described above. For purposes of uniformity, Publish API Info is sent for the first instance (i.e., where API Id=Instance Id). There will be one message for Instance of API, which is bounded using the MMP flag. The value of Instance Id should be used in place of API Id when there are multiple instances of an API on a physical network node.

Low Level API: API ID=5 (Type 1, Version 1). The following application packet represents a broadcast message from the software architecture 10 for publishing state (Publish State). This message sent as a result of a changed internal state of the machine, resulting from normal cycle progressions, user interactions, Op Code 2 below, or other messages received via network 14.

| API ID | Op Code | Byte 3 | Byte 4-Byte F |
|---|---|---|---|
| 5 | 1: publishState | state enum | |

| API ID | Op Code | Byte 3 | Byte 4 | Byte 5 | Byte 6 | Byte 7 | Byte 8 | Byte 9 | Byte A | Byte n |
|---|---|---|---|---|---|---|---|---|---|---|
| | 8: publishInstanceInfo | API Id | Instance Id | Type[1] MSB | Type LSB | Version[2] MSB | Version LSB | Descr[3] Char 1 | Descr Char 2 | Descr Char n |

[1] Allows for APIs to be sub-classed or specialized. For example, API Id may refer to a washing machine API and Type may specify a particular washer model.
[2] Enables version control (i.e. bug fixes or changes to functionality). Enables a runtime compatibility check, which can inform client if the versions are compatible.
[3] Allows client to associate Instance Id with its physical function. For example, 'upper' or 'lower' could be used for the two cavities of a double oven.

Preferably, the Descr Char 1—Descr Char n allows the client to associate an Instance Id with its physical function. For example, 'upper' or 'lower' could be used for the two cavities of a double oven. However, the user of the software architecture 10 may use Descr Char 1—Descr Char n for any useful purpose.

Core Debug API: API ID=4 (Type 1, Version 1). The following application packet represents a broadcast message from the software architecture 10 to a client for publishing saturation (Publish Saturation). Saturation happens when the supporting layers of the internal network 14 are unable to deliver the data that the software architecture 10 has put into the outbound queue of WIDE 14A. The software architecture 10 has no queue; if the WIDE 14A cannot service the outbound data, then the software architecture 10 sends out Publish Saturation.

| API ID | Op Code | Byte 3-Byte F |
|---|---|---|
| 4 | 1: publishSaturation | |

The following application packet represents a directed message from a client to the software architecture 10 for setting a register for saturation (Register for Saturation). The client sends this message to a software architecture node, which enables the Saturation message. Only the node that enables saturation can disable saturation.

| API ID | Op Code | Byte 3 | Byte 4-Byte F |
|---|---|---|---|
| 4 | 2: Saturation On or Off | 1 = on<br>2 = off | |

Exemplary machine state enumeration values are presented in the following table. According to one embodiment of the invention, the running state is included. However, in some cases, the running state is somewhat ambiguous and additional phase variables must be exposed so that proper client side business logic can be written. In an alternative embodiment, the running state is eliminated in favor of a more granular and definitive state machine where each phase of each state is documented properly. In this embodiment, sufficient address space exists in the byte for the additional enumerations.

| Machine State Enumeration | |
|---|---|
| idle | 1 |
| running | 2 |
| programming | 3 |
| fault | 4 |
| development | 5 |
| end of cycle | 6 |
| pause | 7 |
| reserved | 8 |
| reserved | 9 |
| reserved | 10 |
| appliance specific | 11-255 |

The following application packet represents a directed message from a client to the software architecture 10 for toggling the household appliance 12 software operating environment 16 governing state of FIG. 7 between Development and Idle State. Note Development State not shown on FIG. 7, but one with ordinary skill in the art can contemplate a Development state which can only be entered from Idle and when exited goes back to Idle.

| API ID | Op Code | Byte 3 | Byte 4-Byte F |
|---|---|---|---|
| 5 | 2: setDevelopmentState | 1 = on<br>2 = off | |

Core Key Press API: API ID=6 (Type 1, Version 1). The following application packet represents a directed message from a client to the software architecture 10 for pressing a key (Key Press). This directed message allows the client to send virtual key presses. Key indexes are not discoverable due to coding techniques used in the embedded processor; therefore, key indexes may be extracted from the source code files manually or through other automated mechanisms.

| API ID | Op Code | Byte 3 | Byte 4-Byte F |
|---|---|---|---|
| 6 | 1: pressKey | key index | |

The following application packet represents a broadcast message from the software architecture 10 to a client for publishing key press (Publish Key Press).

| API ID | Op Code | Byte 3 | Byte 4-Byte F |
|---|---|---|---|
| 6 | 2: publishKeyPress | key index | |

Exemplary key press index enumeration values are presented in the following table.

| Key Press Index Enumeration | |
|---|---|
| start | 1 |
| cancel | 2 |
| pause | 3 |
| reserved | 4-25 |
| appliance specific | 26-255 |

Memory/Port API: API ID=7 (Type 3, Version 1). The following application packet represents a directed message from a client to the software architecture 10 for writing memory (Write Memory). The Memory/Port port API is enabled via the Development State of FIG. 3 and the associated interaction is similar to the previously described association between Development State of FIG. 3 and the Low Level API (API ID=7).

This directed message allows the client to write to a specified RAM location. The write to the specified RAM location is limited to a single packet. In the current embodiment, this would be 13 bytes shown in 28A of 28. MMP (of 28)=1 is not valid for this message.

| API ID | Op Code | Byte 3 | Byte 4 | Byte 5 | Byte 6 | Byte 7 | Byte n |
|---|---|---|---|---|---|---|---|
| 7 | 1: writeMemory | Address Hi-Byte | Address Mid-Byte | Address Low-Byte | data byte | data byte | data byte |

The following application packet represents a directed message from a client to the software architecture 10 for writing EE memory (Write EE). The write to a specified EE location is limited to a single packet. In the current embodiment, this would be 13 bytes shown in 28A of 28. MMP (of 28)=1 is not valid for this message.

The Memory Port

| API ID | Op Code | Byte 3 | Byte 4 | Byte 5 | Byte 6 | Byte 7 | Byte n |
|---|---|---|---|---|---|---|---|
| 7 | 2: writeEE | Address Hi-Byte | Address Mid-Byte | Address Low-Byte | data byte | data byte | data byte |

Poll Variable API: API ID=10 (Type 1, Version 1). Referring to FIG. 5, the following application packet represents a directed message from a client to the software architecture 10 for reading poll variables (Read Poll Variable(s)). This message instructs the software architecture 10 to send a Publish Poll Variable message, which is shown below, for poll-only variables. Poll variables can be hard-coded by a developer for a specific application and can be used if RAM/ROM resources do not allow the use of the DAQ API.

| API ID | Op Code | Byte 3 | Byte 4 | Byte 5 | Byte 6-Byte F |
|---|---|---|---|---|---|
| 10 | 1: readPollVariable(s) | Event Id 1 (0xFF = all) | Event Id 2 | Event Id n | |

The following application packet represents a directed message from the software architecture 10 to a client for publishing poll variables (Publish Poll Variable) and is a response to Read Poll Variable(s). There is one message per poll variable index as specified in the initiating Read Poll Variable message.

| API ID | Op Code | Byte 3 | Byte 4 | Byte 5 | Byte 6 | Byte 7 | Byte n | Byte 9-Byte F |
|---|---|---|---|---|---|---|---|---|
| 10 | Event ID n: (publishPollVariable) | data MSB | data | data | data | ... | data LSB | |

A note on the event operators discussed in the DAQ API section above. Byte 9 of the Create Event Numeric and Byte message(DAQ API opcodes 1 & 2) and Byte 5 of CreateNumRemoteEvent and CreateByteRemoteEvent(DAQ API op codes 12 & 13) are the event change operator shown in the NVOEventStructure of FIG. 33. Operators are instructions which describe to the software architecture 10 the mathematical condition at which the software architecture 10 should generate an event message. The table below describes examples of event operators. The arguments for event operators are dependant on the type of event being created (numeric-based or byte-based which are op codes 1 and 2, respectively).

Event operators are part of the DAQ API which has two variations: basic (Type 1) and an extended (Type 2). Note the fifth column in the table which denotes the availability of each Event Operator for the plurality of revisions (4) of the DAQ API. Note that Types 1 & 2 are depreciated and the preferred embodiments are the Basic Type 3 or the Extended Type 4 which is inclusive of Type 3 functionality.

The following table denotes the event operators available when creating a numeric-based event (API ID 2, Op Code 1 and 12):

| Name | Operator Id (Byte 8) | Arg 1 (Byte 9) | Arg 2 (Byte A) | DAQ API Type Availability |
|---|---|---|---|---|
| On Change | 0 | — | — | 1, 2, 3, 4 |
| Deadband | 1 | Deadband Val (MSB) | Deadband Val (LSB) | 2, 3, 4 |
| Check Value == | 2 | Compare Val (MSB) | Compare Val (LSB) | 2, 3, 4 |
| Boundary <= \| => | 3 | Compare Val (MSB) | Compare Val (LSB) | 2, 3, 4 |
| 25 msec increments | 4 | — | time = val * 25 ms | 1, 2, 3, 4 |
| Seconds | 5 | — | time = val (sec) | 1, 2, 3, 4 |
| Minutes | 6 | — | time = val (min) | 1, 2, 3, 4 |
| Reserved | 7 | — | — | — |
| BIND | 8 | API Id: DAQ = 2 | Event Id | Unavailable at this time. |

The following table denotes the event operators available when creating a byte-based event (API ID 2, Op Code 2 and 13):

| Name | Operator Id (Byte 8) | Arg 1 (Byte 9) | Arg 2 (Byte A) | DAQ API Type Availability |
|---|---|---|---|---|
| On Change | 0 | Offset (1 - size) | — | 1, 2, 3, 4 |
| Deadband | 1 | Offset (1 - size) | Deadband Val | 2, 3, 4 |
| Check Value == | 2 | Offset (1 - size) | Compare Val | 2, 3, 4 |
| Boundary < or > | 3 | Offset (1 - size) | Compare Val | 2, 3, 4 |
| 25 msec increments | 4 | — | time = val * 25 ms | 1, 2, 3, 4 |
| Seconds | 5 | — | time = val (sec) | 1, 2, 3, 4 |
| Minutes | 6 | — | time = val (min) | 1, 2, 3, 4 |
| Bit Mask | 7 | offset | mask | 1, 2, 3, 4 |
| BIND | 8 | API Id: DAQ = 2 | Event Id | Unavailable at this time. |

The BIND operator allows the client 16 to create multiple memory events from a single event trigger. In other words, once an Event ID has been assigned, subsequent events can be created which will automatically be sent when the original master event is triggered.

When a byte based event (op code=3) is set up with the On Change operator, a value of 255 in byte 9 will instruct the software architecture 10 to do a change detect for all bytes in the range specified by the address and size arguments.

The Bit Mask operator allows the ability to watch for bit transitions within a byte. The mask value should be set such that bit=1 is a 'care about' and bit=0 is a 'don't care'. When set to 'don't care' a value transition at that bit location will not result in an event generated.

The software architecture 10 does not provide an explicit solution for time synchronization, but does provide an enabling mechanism. The capability of the remote client 16, 22 to create an event that is periodically broadcast allows the remote client 16, 22 to maintain a time of day clock which is synchronized with the appliance. Since the software architecture 10 may not explicitly expose a time of day clock API, the client 16, 22 can have the address in memory where time of day is stored.

The software architecture 10 core has several design considerations which can be considered and contemplated to create alternative embodiments of the invention described herein.

The following items can be considered when determining alternative embodiments of the core implementation of the software architecture 10:

Message Architecture
Payload Structure or Message Size
Multi-Payload Message Integrity Checking
State Aware Messaging
API Versioning—Discovery
Connection Integrity
Traffic (flow) Control and Acknowledged Messages
   Inbound Invalid
   Inbound Valid
   Outbound
   Power-up Condition
State Integrity
Key Presses vs. Logical API
Multi-Node Network
   Multiple Nodes
   Multiple Clients
   Multiple API implementations on same network
   Multiple API implementations on the same network node
   API(s) using same op codes—Namespace
   SAP assignment
   SAP discovery
Message Architecture Message architecture is a primary design element whose solution has many dependent design consequences. The internal communication network 14 protocol 28 provides new possibilities for event driven message architecture as opposed to previous networks. An element to consider is whether nodes will poll one another if they will register for notification messages.

Polling is a practice of nodes periodically sending messages to the owners of data requesting updated values (e.g. continually request data every 100 ms). Polling is generally simpler to implement and more commonly used, and can maintain connection integrity verified with each request. However, when polling, the client must continuously ask for information. Network Bandwidth is used up with data that is not changing (bandwidth is the amount of data that can be passed along a communications channel in a given period of time and there are several factors that effect bandwidth such as: number of nodes on a network, the transmission frequency [baud rate], and the protocol overhead [CRCs, acknowledgements, source/destination IDs, etc], the transport protocol hardware, and cabling govern the limits of bandwidth, however, the Application protocol has the responsibility to make the most efficient use of the available bandwidth). Polling architectures do not scale: as nodes increase the number of messages increases exponentially. Assuming there is information on each node that every other node needs: messages=$n^2-n$. Data is typically not synchronized with the memory of the control and message latency can be as much as twice the polling rate.

Eventing is a practice of nodes registering with the owners of data to be notified under certain conditions with new value of data. The data owner is then responsible to send a message to the observing nodes when the data meets the criteria originally specified during registration. (e.g. send data only when data changes). In an eventing model, bandwidth usage is optimized because data is only sent when it changes. This model scales well with message traffic and minimizes latency. Data is synchronized with the control. However, a connection validation (heartbeat) is needed. Otherwise, a client may not know when an event source is offline. Alternatively, connection validation in an eventing model can be achieved using acknowledgments which are an additional message transmitted from the event observer back to the event source. When the event source transmits an event message, the event source will not consider the transaction to be complete until an acknowledgement message is received. After a timeout has expired, the event source may retransmit the event. This process may repeat for a configurable number of acknowledged event transmission retries.

In Eventing architectures, Message binding of FIG. 9 and governed by MMP of 28 can be needed. It is a mechanism to group events which were generated from the same 'scan' of the microcontroller.

In this case, the preferred embodiment is an eventing model since eventing has advantages listed above as well as the simplicity of the remedies which address the disadvantages of eventing. Connection validation is addressed by use of a heartbeat and/or acknowledged events. When the heartbeat is used, the event source will send out an event periodically so that all of the event listeners of that node can know that the event source is healthy. Likewise, implementing the heartbeat such that its frequency is programmable, can also be used to notify all event subscribers that the event source is healthy. The heartbeat period is configurable from the network. Acknowledged Events which are described in detail herein are an alternate method which can be used in addition to the heartbeat or programmable heartbeat to insure connection integrity. Message binding is addressed with the message bounding bit in the payload of each message packet 28. This allows the software architecture 10 driver to collect messages corresponding to the same microcontroller scan and present those to the application layer as a whole.

Using a the a sub-component of the invention known as the DAQ 30, the software architecture allows a client 16 to dynamically register with an appliance control components 16 (enabled with the software architecture 10 and including the optional sub-component of the software architecture DAQ 30) via the internal communication network 14 to receive notification when the value at a specified memory location changes relative to a specified condition. This relieves the appliance control 16 from having hard-coded feedback variables and allows real-time feedback to change according to the application, without client polling (event-based updates are accurately broadcast as needed).

Figure 33:
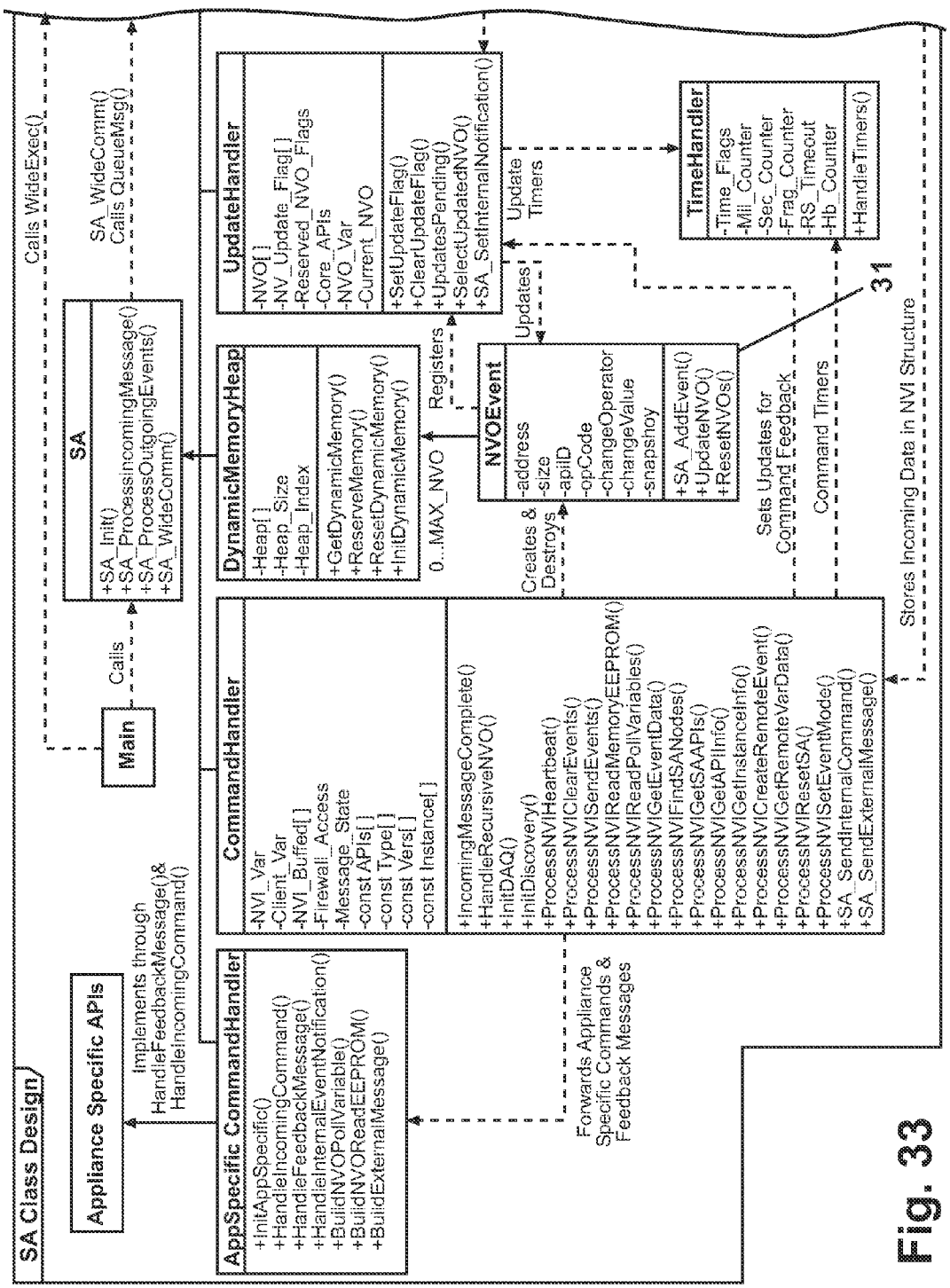
FIG. 33 is a UML class diagram illustrating the preferred implementation of the SA.
Figure 33:
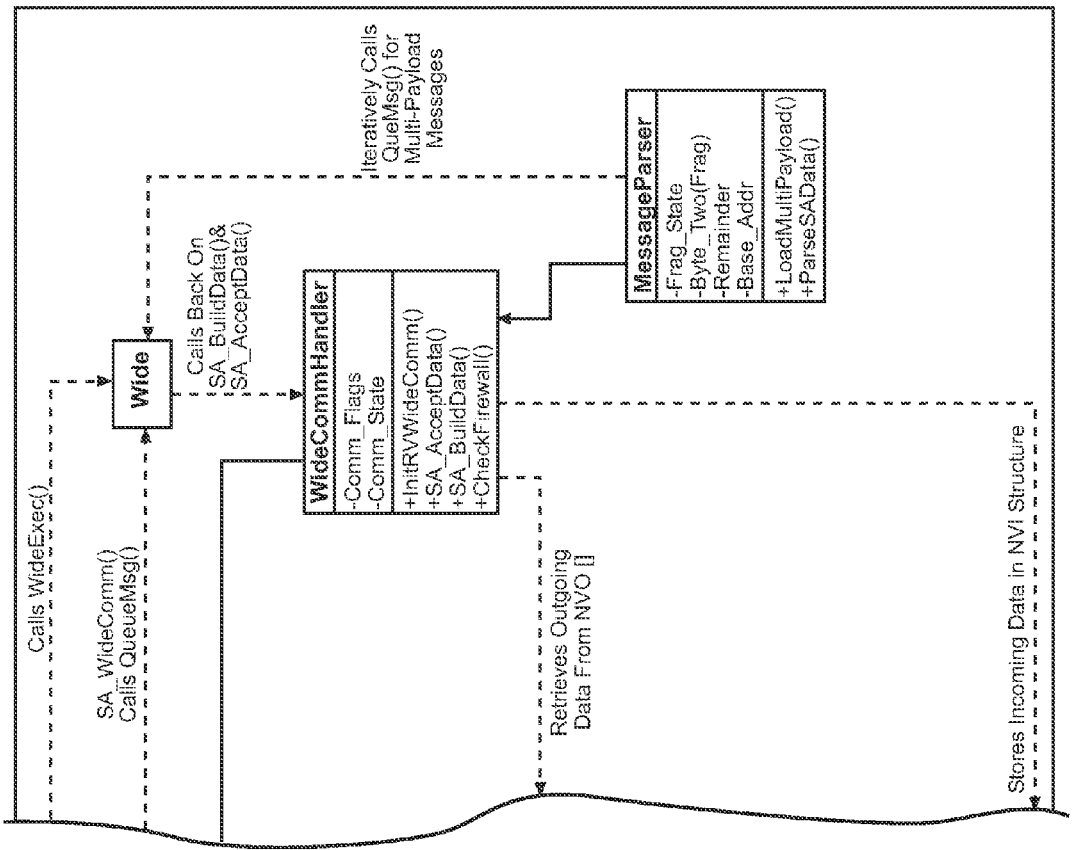

A dynamic memory heap of FIG. 33, i.e., memory reserved for runtime configurable feedback messages, is employed wherein the size of the heap is configurable at compile time. It has been found that each feedback event variable requires about 10 bytes of RAM. The events registered in the heap (NVOEvent of FIG. 33) can be added or reset through internal communication network 14 commands issued by the client to a component enabled by the software architecture having also installed the optional sub-component DAQ 30.

Payload Structure 28A

One example payload structure is a static compound payload which consists of grouping multiple variables together (at design time) so that the client can, with one transaction, send a complete command to, or receive the complete state of a component within the appliance 12. In the case of a command, the client may not intend to change every variable in a payload, therefore, a pre-requisite status update is required to populate the command payload with the current status for those variables which are not intended to change. Moreover, the variables that change may not map directly into a single payload definition resulting in multiple messages containing interspersed changed and non-changed data.

In a simple payload structure, only one variable can exist in a payload. This has a simpler, easier implementation and can approximate a dynamic compound payload (described below). However, bandwidth is not optimized because of a larger ratio of message overhead to data and message binding needed as variables are sent separately.

In a dynamic compound payload structure, payloads are not statically defined at design time, but are dynamically created by the sending node. In this case, the length of the payload is determined by the data, which the sender wishes to send, and moreover, there must include identifiers and possibly delimiters in the payload, which will allow the receiving parser to un-marshal the component parts of the payload. To reiterate, the receiving node must have a parser sophisticated enough to separated the multi-variable payloads into their component parts. This payload structure optimizes bandwidth but can increase ROM requirement due to the sophistication required by the parser. There is also some added overhead to the application protocol since the dynamic compound payload must embed op code lengths as part of messages, requires additional parsing by the receiving component and can be hard to understand and implement.

It is a preferred embodiment of this invention to employ a simple payload structure for the application protocol. The complexity of a dynamic compound payload can have difficulties in a cost-benefit analysis for the messages employed in the software architecture 10. To maximize the use of the software architecture 10, the complexity of the interface should be preferably minimized. By way of using compound payloads, by their complex nature, would potentially retard the use of the software architecture 10, especially with embedded clients. Simple payloads are a good approximation of dynamic compound payloads even though there can be additional message overhead (i.e., there are five bytes of overhead for every the internal communication network 14 message). There is an additional two bytes of overhead to support the software architecture 10 application protocol 28. This leaves 13 bytes per the internal communication network 14 message protocol 24 for data in some application-specific conditions. Using a static compound payload can be inflexible and wasteful.

Message binding of FIG. 9 is addressed with the use of the MMP bit in the payload of each message packet. This allows the software architecture 10 driver to collect the messages corresponding to the same microcontroller scan and present those to the application layer as a whole.

State Aware Commands

Relative to a user interface for an appliance 12, the appliance 12 acts like a state machine. As keys are pressed, the state machine transitions from one state to another. For each state, it is known what keys are valid candidates for the next push. Likewise it is also know which keys are not valid for the next push.

Generally, when a key is pressed that is invalid, the appliance 12 will produce an audible alarm to indicate to the user that the Appliance was in an inappropriate state for that key. The same concept exists for the external client wishing to send valid commands, albeit that this client may not sending key presses.

In general, two types of state machines are developed for an appliance control: the key press state machine (as mentioned above) and a process state machine. An example of a typical process state machine is shown in FIG. 7.

FIG. 7 is a schematic illustration illustrating various states of a household appliance 12, such as a washer shown by example in FIG. 7, and to the interaction of the software architecture 10 through various states 32 and a fault error mode 34. The various states 32 of the example washer appliance are shown in FIG. 7 as idle, washing, rinsing, spinning, and pause. Other states for this example appliance 12 as well as states for different appliances 12 are contemplated and the example shown in FIG. 7 should be by example only.

The states of the process state machine can be reported to the external client 16. However, upon inspection, it can be seen that the process state machine in FIG. 7 does not address events from all possible user inputs (i.e. clock set, spin speed selection, load size option, etc). In general, the logic in the appliance control has a final else clause which handles all other cases which were not pre-defined.

Supposing that it is desirable for the client 16 to understand the rules governing the state transitions of the control so that it may avoid sending invalid commands. Accounting for the fact that the client 16 will not be sending key presses, the designer must understand that there is no available document or data structure allowing client side validation (i.e., validation before the request is sent). Eventually, this can lead to client applications that are likely to send a command that the receiving component will not execute due to its validation logic which is based on the exemplary state of FIG. 7.

The solution can have an effect not only on bandwidth usage, but also to the overall robustness and end user satisfaction of the application. From a bandwidth perspective, it can be stated that a message not resulting in the desired action, but rather, an error code or retry is a waste of bandwidth (assuming that it could be prevented). From a user satisfaction perspective, applications which prevent the user from making mistakes are generally considered more "user friendly" than those which allow the user to make mistakes and then use dialog boxes to explain what happened.

Various embodiments of state appropriate commands have been contemplated in accordance with this invention.

Using a client-coded rules section, a subset of state information is used to develop case logic or an emulation of the state of the control for the purpose of preventing invalid requests. This model typically does not impose change on the control architecture but can have the client and control can easily be out of sync. The rules and logic development can be based on trial and error (e.g., code, test, re-code). A client design will rapidly evolve, creating poorly designed procedural code.

Using a design-time state-based API data model, a data model is developed such that the client can interpret it and prevent invalid requests. In essence, it is a correlation between state and valid op codes (op codes are message identifiers). The advantage to this is that the developer of the Op Code or API is also responsible to publish information to the client developer (at design time) allowing the designer to emulate the state machine on the client. This emulated state machine enables the client application from sending invalid requests. It is necessary for the control to expose each state defined in the API data model. The design-time data model requires the control developer to be responsible to communicate state rules governing Op Code usage. The client and control can easily get out of sync because data is not available at runtime. A document must be created which reflects the as written code. This document must be maintained and published. The document must be parsed or converted into client side logic and this does not work all of the time. The appliance state can change just as a command is being sent resulting in an invalid command.

Using a run-time state-based API data model, this solution is identical to the previous with the exception that the data model is not shared between developers at design time, but between client and control at runtime. Some additional messaging is required for this data to be communicated from the control. In the runtime data model, the control developer must be responsible to communicate state rules governing Op Code usage. A client can discover at runtime the Op Code/State correlation definition. The client and control are always in sync and the client and developer activities are optimized—no manual translation to/from a document. Additional code (ROM) (written once) required to marshal and un-marshal Op Code/State correlation definition. Some network bandwidth required for transmission of data and some start-up latency as a result of transmission of data. This does not work all of the time. State can change just as a command is being sent resulting in an invalid command.

Using a post-command acknowledgment enumeration model, the three options above have the goal of preventing the command from being issued by client to control in the invalid state. This solution does not attempt this preemption. Instead, this technique allows the client application to send any command at any time. If the command is invalid, an acknowledgment will occur so that the client can take appropriate action. This acknowledgment may or may not include an enumerated reason code. In a post-command reason code model, there is no change imposed on the control architecture but a client is more likely to send commands which will be rejected. The client developer must design a strategy to handle rejection acknowledgment and the end-user experience may not be as pleasant due to frequency of rejected command messages.

Using a design-time naming convention and source code parsing model which is a combination of the design and runtime data models, this has the least impact on the structure of the embedded code, as well, delivers the desired runtime functionality. It is accomplished by creating a client-side parser which can parse the embedded source code and determine the variable to be monitored for each external Op Code. The requirements for this solution are: (1) each non-diagnostic external command (Op Code) will have an associated single Boolean variable which represents the permission state required for execution; and (2) a naming convention is used such that a parser can associate each permission variable to the corresponding external Op Code. In a source code parsing model, the control developer is responsible to communicate state rules governing Op Code usage. A client 16 can discover at runtime the Op Code/State correlation definition pending proper versioning and the client and control are always in sync with proper versioning. The extra reference document is not needed, however, there are non-trivial changes to coding practice, additional logic to be executed each scan, small additional RAM and ROM required, and only sophisticated clients are able to parse source code.

Using a learning client model, this solution requires no change to the embedded system. In this case, the client would "learn" after each rejected command and build a client side permission map that could, over time, achieve the desired runtime behavior. In a learning client model, there is no change imposed on the control architecture, however, this assumes that the correct state variables are being evaluated at the time of rejection. If no state variables are being observed, then the client cannot learn what caused the rejection.

It has been found that several of these options are preferred embodiments. For now, a main preferred embodiment is the runtime API data model. An exemplary beneficiary of this design would be the home control application. The model, however, requires additional embedded design. And because the current business environment does not create a requirement for this embodiment, the post-command acknowledgment is adopted until such time that the cost-benefit of adopting the runtime API data model (also referenced as Taxonomy Engine) becomes favorable.

One of the challenges of the software architecture 10 is to provide functionality without impacting the production schedule of the appliance 12. The software architecture 10 can implement an acknowledged request model. NVORecipeStatus (API ID=1, Op Code=1) is a preferred acknowledgment message that the software architecture 10 sends after each message received.

API Versioning—Discovery of FIG. 6

Although the core of the software architecture 10 is independent of any API, its purpose for the software architecture 10 is to expose multiple APIs. It is realistic to expect that APIs will be continually added to the software architecture 10 over time. In anticipation of this, consideration for API discovery and versioning is made.

It is also conceivable that as the software architecture 10 applications grow, the microprocessor resources will not be sufficient to support all the software architecture 10 APIs and functions simultaneously. With the use of compiler directives, the software architecture 10 can be configured so that APIs will appear and reappear for the same model over the development life of the machine.

Discovery is a key to the long-range success of the software architecture 10. A fundamental purpose of the software architecture 10 is to act as middle-ware between client 16 and control component 16. Given the scenario described below, it will be necessary for clients 16 to query the control to discover what the current capabilities are. If certain capabilities are not present (i.e., compile time decision), it is desirable for the application to be able to gracefully fail and communicate to the user that the support for the application is not currently compiled into the appliance control software.

There can be dozens of client implementations and dozens of cross-platform and platform specific APIs. Compiler directives can be developed to include or exclude certain functions of the software architecture 10. There may not be space on the control for all possible functions of the software architecture 10 to exist on the microprocessor simultaneously.

Various embodiments of the invention described herein relating to the versioning and discovery methods of APIs are contemplated without departing from the scope of this invention.

Using a model number-based discovery model, the client is responsible to understand the capabilities of the control. This can be done using client-based data structures, remote data bases, or runtime code delivery vehicles like OSGi which include all relevant information on a particular model number for an appliance 12. In a model number-based discovery model, there is no additional requirement on the appliance control. However, a model number is not typically assigned at beginning of a product development cycle so it is not available in early software development. Model numbers can be changed due to color schemes, branding, and other irrelevant factors. Different APIs can be residents on the same model due to compiler directives. The client can be required to be responsible to acquire capabilities definition or equivalent code after discovery.

Using an API ID-based discovery model, API-based discovery does not rely at all on model number, but rather defines any product as a collection of well-defined interfaces. This technique allows for the same APIs to be resident on multiple products resulting in some reuse. In an API ID-based discovery model, the reference to API ID compensates for the shortcomings of a model number-based approach. This model allows multiple products to share same compiler directives and same API definitions and can promotes sub-function reuse of the software architecture 10. However, the client can be responsible to acquire capabilities definition or equivalent code after discovery, additional management overhead can be required to maintain and assign unique APIs, and additional resources from a control microprocessor can be required to support discovery Op Codes (i.e., additional messaging).

Using a capabilities discovery model (also referenced as a Taxonomy Engine), this model takes API Discovery an additional step. In addition to the ID of an API, the client will also request and obtain the data definition corresponding to that API. In other words, the client will discover each function call, each function calls arguments, and all the valid values for each argument. In the capabilities discovery model, no secondary lookup is required to acquire capability definition. This model approaches a UPnP or Web Service type concept and sets the foundation for the conversion to LCD screen user interfaces which can be data driven. However, this concept may be cost deficient when applied to low margin mechanical key pads and actuators. And, to take advantage of this technique, the client 16 must develop an interpreter for the capabilities definition which can require more intensive modeling effort by the software architecture 10 sub-function developer and significantly more resources from the control microprocessor.

It has been found that, at the time this application was prepared, an API ID-based discovery model is a preferred embodiment. In addition to API ID, each API can have a type and a version, so that many different permutations of an API can exist over time. This can make the protocol much more flexible (e.g. there can be many types of APIs for a particular appliance 12, such as a dryer, as well as a different version of each type: Dryer API, Horizon Dryer Type, Version 1).

Discovery can be initiated in a number of ways according to the invention. On power up, each node enabled with the software architecture 10 broadcasts a message on the internal communication network 14 called Publish Node.

Secondly, a node, at any time, can broadcast a message on the internal communication network 14 called Find Nodes. This message will result in all nodes responding with a Publish Node message. This API is discussed in more detail with respect to FIG. 5 and the Discovery API.

As discovery is a key to the software architecture 10, versioning is a key to successful discovery. The same rationale used to justify API discovery can be applied to API versioning. Versioning allows the client to find out more information about the API which it has discovered.

During API discovery, the API version and type is reported within the same data structure as the API ID. For example, a simple number bumping approach can be employed. Further, a one- or two-byte or n byte data structure for API ID and a version number are contemplated.

Connection Integrity

In eventing architectures, connection integrity is an issue; whereas in polling architectures, connection integrity is inherent. In eventing architecture, the client 16 can successfully register to listen for feedback (such as for a temperature reading). Once registration is complete, the client relies on the control for notification of changes to temperature. As such, the client would interpret a network problem as a constant temperature. By contrast, in a polling architecture, the client would constantly ask the control for temperature feedback the response or lack thereof would immediately indicate the integrity of the connection.

Using an optional heartbeat model to perform connection integrity, a client must register for a network-based heartbeat. Using an automatic heartbeat model, the software architecture 10 produces a heartbeat automatically when a notification registration buffer is not null. Heartbeats can be broadcast messages or messages directed at a specific node.

In an optional heartbeat model, if there is an instance when it is not needed, the heartbeat can be eliminated. In instances where it is needed, a client must configure the software architecture 10 to produce a heartbeat. In an automatic heartbeat model, there is no effort required for desired functionality—the software architecture 10 is inherently robust. In a broadcast heartbeat, fewer messages need to be sent, a custom heartbeat can be accomplished through time-based event updates and it has simpler implementation. However, this can result in message handling from other network nodes which are not participating in the software architecture 10 collaboration. Also, nodes not properly handling broadcast messages can misinterpret incoming messages. In a directed heartbeat model, only enabled nodes need to handle the software architecture 10 application protocol. However, more messages can be sent using a directed heartbeat model.

For this invention, it has been found that a preferred embodiment is a heartbeat for connection integrity, and specifically, a broadcast messages can be used for a heartbeat. Clients that do not prefer the broadcast heartbeat rate can alternately use a periodic time-based NVO event update instead. Making the heartbeat automatic can lessen the burden on the client. With respect to the APIs contained in the software architecture 10, the following functions are supported as part of the Core API (Id=1): Heartbeat Message, Set Heartbeat Period. The heartbeat is preferably automatically initiated with a default period upon receipt of the first message from a client 16.

Figure 29:
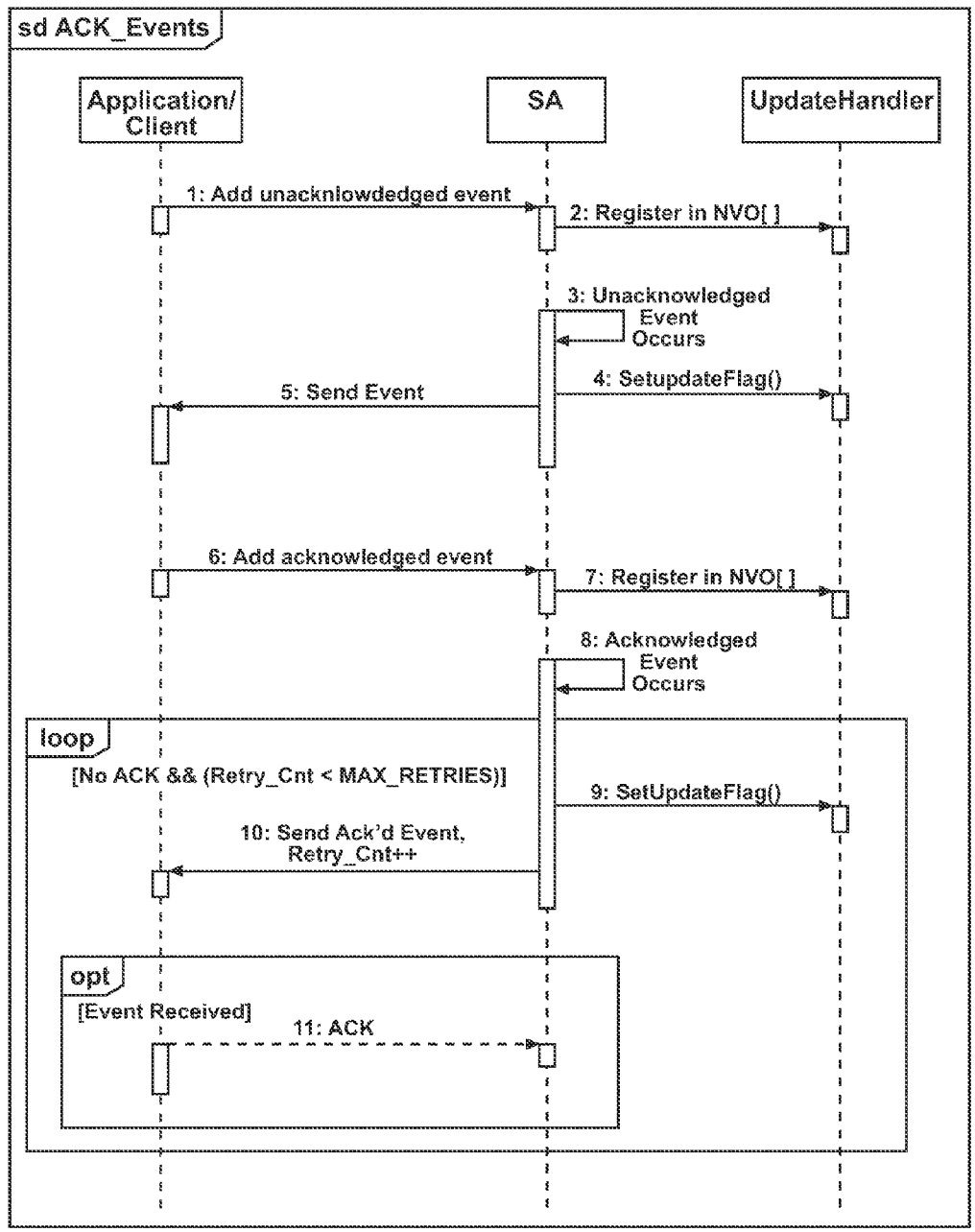
FIG. 29 is a UML sequence diagram of an acknowledged event within the SA, where the controller SA waits a predetermined time for an acknowledgement message from the client SA until processing the next event.

An additional optional preferable method for connection integrity can be introduced into the software architecture 10. It has been found that as the application of the software architecture proliferated, it was determined that an additional method of connection integrity was needed. Using the heartbeat method for connection integrity is appropriate for many application scenarios. This method is chosen because it represents a good tradeoff between utilization of bandwidth and confidence level of the event source. However, it is possible that an event message sent by the software architecture 10 will fail to be processed by the intended event subscriber even when the event subscriber did not detect a missing heartbeat. In this case, the event subscriber cannot detect failure and therefore cannot take corrective action. The corrective action, in the case of a detected missing heartbeat, is that the event subscriber may request that the event source re-send (all or a sub-set of all) events so that the event subscriber has the most current data. To address this potential undetected failure mode, a second method of connection integrity has been made available through the software architecture 10. The method, known as acknowledged events, allows the integrity of each event message to be individually managed. FIG. 29 illustrates the functionality of the acknowledged event. Further details concerning acknowledged events are described in the descriptions of FIG. 29.

Traffic (Flow) Control

Configurable asynchronous processes are powerful, but can fail when configured beyond their physical processing and bandwidth limits. Mechanisms are introduced to prevent saturation in four known failure scenarios: inbound invalid requests, inbound valid requests, outbound message events, and a power-up condition.

Inbound Invalid Requests. It is likely that the client will format and send a request that cannot be properly parsed or understood by the control or may be invalid per the state of the control.

Inbound Valid Requests. Without consideration, the client may ask the control to do a second task before the control has been able to process the first.

In a buffering model, a receive buffer could be used allowing the client to send many requests without concern for the control's ability to service them. In this model, the client has no responsibility even though the implementation of this model is simpler. However, buffering does not solve the flow control problem; it only delays or makes the problem less likely or less frequent and buffering requires more RAM.

In a flow control model, messaging can be used so that the client is required to wait until a control is 'ready' before sending a second request. In a flow control model, the flow control problem is solved robustly, and failure modes are eliminated. However, a client must implement a flow control protocol.

In an acknowledged request model, a control provides a response either positive or negative to each client request. In an acknowledged request model, this model allows a client 16 to develop simple re-try or recovery scenarios. However, this model requires more bandwidth for the acknowledgments and additional ROM and design is required.

In an unacknowledged request model, client requests are un-acknowledged—a client must use state information to determine if the command succeeded. In the unacknowledged request model, less bandwidth and ROM is employed. However, application user experience can suffer, a client application has no indication if an issued command was successful and therefore cannot automate retries, and a user will notice an unsuccessful command and need to manually replicate the command actions.

It has been determined that a preferred embodiment of this invention is a flow control protocol with an acknowledged command model. Moreover, acknowledgments can be enumerated such that a client process can develop the most robust recovery scenarios as possible. Because the acknowledgement message previously mentioned in this invention provides the API and op code for the acknowledged command, a client can discern the command being responded to. This prevents confusion in a multiple control board network, in which multiple control boards inside of an appliance all utilize the software architecture 10. Flow control and command acknowledgment are techniques which allow the client to send data as rapidly as possible without saturating the control. The benefits can be very responsive applications without introducing unnecessary latency or unexpected application failures.

The flow control benefits are achieved using publish Acknowledgement, API Id=1, Op Code 1. Each command is acknowledged with a publish Acknowledgment response. A new command is only allowed after receipt of a publish Acknowledgment value of READY or UNSUPPORTED. publishAcknowledgment has the state machine for command flow control as shown in FIG. 8.

Figure 8:
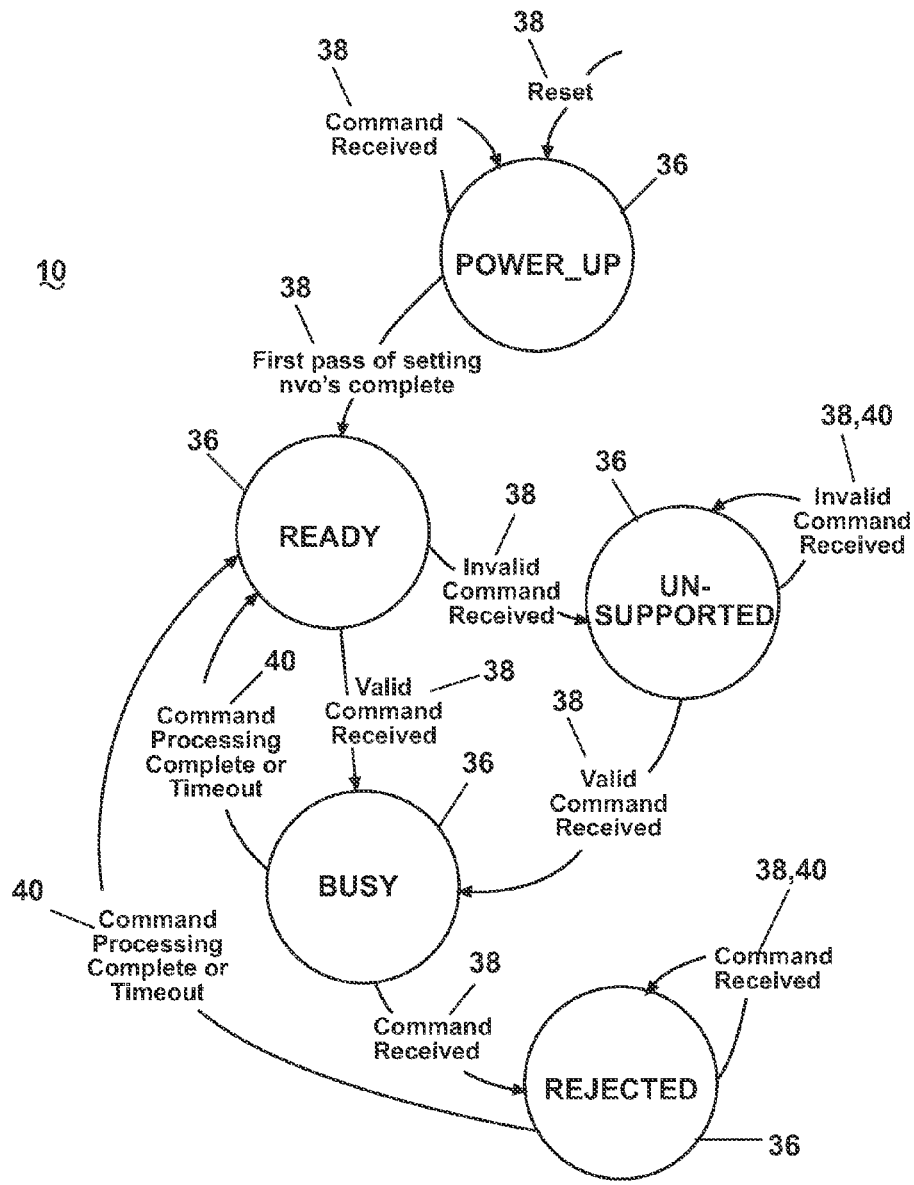
FIG. 8 is a schematic illustration showing the response of the controller SA to various information exchanges in the form of commands issued and received by other SA installations to validate or reject those commands based upon the state of the household appliance as well as the internal state of the controller SA.

FIG. 8 is a schematic illustration showing how the architecture 10 of FIG. 1 interacts with incoming commands according to the invention and validates or rejects those commands based upon the state of the household appliance. Various flow control status indicators are shown in FIG. 8 with reference numeral 36 as, e.g., POWER_UP, READY, BUSY, REJECTED, and UN_SUPPORTED based upon various commands 38 and issued responses 40.

Outbound Messages Events (Feedbacks). During each scan of the microcontroller, the DAQ 30 of software architecture 10 collects byte arrays representing the events that must be sent out on the bus (see PROCESS DAQ EVENTS state of FIG. 36. The DAQ 30 of software architecture 10 is configurable as shown in FIG. 5 and therefore it is possible that the client or clients could configure the software architecture 10 to transmit more data than is possible for the bandwidth of the communication bus (i.e., over configuration).

In order to prevent this, a configuration limit model can be employed which would limit the ability of clients 16 to configure the software architecture 10 to avoid this problem. In a buffering model, the software architecture 10 can be equipped with a transmit buffer. In a saturation message model, the software architecture 10 detects when there is too much data presented to the transport layer such that the data may not be sent to the client. In a require re-initiation model, event distribution is suspended and an event saturation message is send out and/or broadcasted. Eventing is resumed once a SendEvents (e.g., 255=ALL) message is received. In a no re-initiation model, a saturation message is sent out and/or broadcasted and then the software architecture 10 continues eventing.

In the transmit buffer model, the client has no responsibility and client implementation is simpler. However, buffering does not solve problem; it only delays or make problem less likely or less frequent and requires more RAM.

In the configuration limit model, this model would prevent problem so that a recovery process is not necessary, it is impossible to derive a configuration limit, and the limit is based on machine state transitions which are of a random nature relative to the software architecture 10.

In the saturation message model, the client can detect that the software architecture 10 was unable to submit new data to the internal communication network 14 on at least one scan. The client is unable to determine if data was missed and the saturation message does not necessarily mean there was failure—only the possibility of missed data.

In the no re-initiation model, the client has no responsibility, however, the client developer is not forced to implement saturation recovery process, the client developer can not be aware that events can be dropped due to over configuration of the software architecture 10. This type of failure is not catastrophic and therefore client applications may be oblivious to the loss of data.

In the require re-initiation model, the client developer must consider the saturation failure and its implication to the application, this prevents transient hard to find bugs, and the failure modes are catastrophic and/or obvious. However, the client must implement a saturation recovery process and there may be momentary latency during a required re-initiation process.

In a do nothing model, unnecessary work is avoided but an unforeseen situation may arise causing client developer to spend time troubleshooting something which can be diagnosed programmatically.

It has been determined that a saturation message that does not require re-initiation to be available via compiler directive is a preferred embodiment of this invention. The saturation message must be successfully transmitted before further events are put into the transport layer transmit buffer. The following messaging functions are supported as part of the software architecture 10 Debug API (API Id=4): get Saturated and Register for Saturation Message.

As shown in FIG. 4 packet structure 28, all packets of the software architecture 10 use a Cmd/Fb flag enabling the possibility of namespace conflict. Thus, it is possible to overlap op codes under the same API using the Cmd/Fb flag for discernment.

Power-Up Condition. If the software architecture 10 node experiences a transient loss of power or micro reset, it might be possible for the client to have an incorrect snapshot for the software architecture 10 modules variables. For robust operation, the software architecture 10 can notify its client that the previously exported variables can no longer be considered valid. When considering the transient condition, the configuration of the software architecture 10 could potentially be stored in non-volatile memory, which would allow for the automatic resumption of communication.

In a broadcast message model, the software architecture 10 can send a special broadcast message notifying all clients to 'dump their cache' upon power-up. It is understood that some applications of client 16 may not need to consider this failure mode and therefore would not make use of the special message. It is also known that the software architecture's software operating environment could experience a failure (resulting in a reset of its internal memory) and a recovery within the heartbeat period. With only the heartbeat as a means of detection, this fast recovery would obfuscate the probability that the client's 16 memory holding copies of certain values from the memory of the software operating environment of the software architecture would no longer correspond to the current values within the memory of the software operating environment. To address this failure scenario, a power-up message can be included in the software architecture 10. This message is independent of the heartbeat and would indicate to any client 16 that any previously held values of the memory of the software operating environment of the software architecture 10 would be most probably be invalid and that the client should, through the use of the sendEvent message of API 1 Op Code 7, re-acquire the current values. It is also understood that the client should suspend or modify any logic or calculations which operate on these memory values in an appropriate way until the current values are re-acquired.

In a loss of heartbeat model, the software architecture 10 can discontinue its heartbeat, allowing the client to determine the proper failure mode action. However, as described above, loss of heartbeat model does not cover all failure scenarios. This is especially true when using the automatic resumption model.

In an automatic resumption model, the software architecture 10 can automatically resume normal operation from the last known state after a power-up or reset. In the automatic resumption model, the client may misinterpret the information received as state transitions that did not occur. In other words, for some State A existing before a Reset or Power-up and some State B which is the initial power up State; without additional indication of a State I representing power-up or reset, the client may interpret a State A to State B transition as occurring without having passed through State I.

In a require re-initiation model, a client developer must consider the scenario of the preceding paragraph and its implication to the application. This can prevent transient, hard to find bugs, because the failure is catastrophic and as such easily identified and fixed. However, the client must implement transient recovery process and there can be a momentary latency during re-subscription/data re-acquisition process.

It has been determined that a loss of heartbeat model requiring re-subscription after a power-up/reset is a preferred embodiment of this invention. The advantage of a special broadcast message indicative of the state of initial conditions is also understood to be a useful indication when the resources within the software operating environment allow for such additional feature. Even though the heartbeat mechanism can be made to approximate the utility of a power-up message mechanism by making the heartbeat time out small, a preferred solution will include a powerup message when resource constraints of the software operating system are not prohibitive. For this reason, the software architecture 10, supports as an optional feature, a power up message which is API Id=3, Op Code=2, publishSANode. Re-subscription can be required because the dynamic event triggers are stored in RAM and will be lost on a power up.

Preferably, the software architecture 10 module does not send any messages out until it has detected a client except the optional power up message publishSANode. A client is detected by the receipt of a valid command. Once the client is detected, a configurable heartbeat message begins broadcasting and the software architecture 10 is then ready for normal operation. Therefore, if the host microprocessor for the software architecture 10 experiences a power-up/RESET, the client will be notified by sensing the absence of the Heartbeat message (see API Id=1 Op Code=2) and optionally sensing the message, publishSANode (see API Id=3 and Op Code=2).

State Integrity

The DAQ 30 of FIG. 5 of the software architecture 10 provides several distinct advantages over a commercially available DAQ systems. The software architecture 10 can expose any variable in the microprocessor memory. In general this will also include the I/O signals of interest. Prior art DAQs cannot do that. The software architecture 10 is available to production machines via a single 3-wire plug, whereas prior art DAQs or emulators require more wiring or harnessing. Prior art DAQs are not practical in the context of a consumer field test. The software architecture 10 can be deployed on the production system. The software architecture 10 coupled with a modem can provide remote monitoring.

The most fundamental aspect, making the software architecture 10 different from prior art devices is that it runs as a blocking subroutine (SA_ProcessOutgoingEvents of FIG. 36 and FIG. 11) called synchronously from the main( ) function of the microprocessor. This insures that the client can have (within the limits of network bandwidth) a complete scan-by-scan snapshot of microprocessor memory exactly as the execution engine of the microprocessor scanned it. This opens up many interesting possibilities ranging from low-cost emulation and debugging to hybrid algorithm development using the software architecture 10 to enable PC-aided co-processing with the production electronics.

A comparison of asynchronous data collection and synchronous data collection methods will now be described. In asynchronous collection:
1. Let A and B be variables inside the appliance control memory.
2. Let C be a variable calculated in the client as the product of A and B.
3. Let A=23 and B=67.
4. Client polls for A: A=23.
5. A and B change. A=56, B=77.
6. Client polls for B: B=77.
7. Client calculates C: C=A*B=23*77 (this combination of A and B never occurred on the microprocessor).
8. Client presents invalid value for C to the consumer or end user of the application.

Most applications will work with asynchronous data collection It is simple and straight forward. However, problems associated with asynchronous collection are extremely time-consuming to debug and identify.

In synchronous collection, the client defines or registers A and B with the software architecture 10. This allows the software architecture 10 to maintain coordinated values of A and B on every scan.
1. Client registers for A and B
2. Client requests a send all.
3. Current values for A and B are sent by the control to client.
4. A and B change. A=56, B=77
5. Control sends bounded event(s) containing A=56 and B=77
6. Client does not calculate C until the bounding or end delimiter bit is reached.
7. Client calculates C=56*77
8. Client presents correct value of C.

With synchronous data collection, the data collection is robust and virtually bulletproof. It enables applications which have not yet been conceptualized and allows for 'real time' debugging of production software w/o special coding on the production electronics. However, additional RAM is required on the control to maintain snapshots of client "care about" variable or property list.

It has been determined that the software architecture 10 preferably can support and promote the synchronous data collection technique. However, asynchronous memory polling is available in the Core API (API ID=1).

With the synchronous data collection technique being employed, the concept of bounded updates should be discussed. Bounded updates are events that are grouped together as a snapshot of the appliance state taken during the same scan of the host microprocessor's Main( ) loop execution. The appliance control main loop will allow for an iterative update of feedback variables that are registered with the DAQ API (e.g., every 25 ms). Each registered variable is monitored and only those that change value according to their memory monitor change operator are broadcast as updates to the client. When updates are in the process of being broadcast, no new updates are allowed in order to preserve the snapshot in time. A snapshot is communicated to the client using the MMP flag in Byte 2 of the software architecture 10 header as shown in the application protocol 28 in FIG. 4.

While the MMP of 28 FIG. 4 is true, more messages are pending for the snapshot. When MMP is false, the current message is the last message in the snapshot. Therefore, if the first message of a snapshot is the only message in that snapshot, MMP will be false.

The example in FIG. 9 illustrates a bounded command (Cycle+Temperature+MMP) with acknowledgements, followed by two consecutive bounded updates. Where bounded refers to elements of protocol which indicate to the receiver that more messages are coming from the source and that data processing by the application logic of the receiving component should be delayed until the bounding indicators of the protocol within the packet structure 28 (MMP bit 7) indicate a complete transaction at which time data processing by the application logic is permitted. The bounded command is shown by reference numeral 42 and the two consecutive bounded updates are shown by reference numbers 44 and 46, respectively. Notice that updates do not begin until bounded command execution is complete, providing the client the ability to filter away transient feedback data. Bounded commands are provided by the same mechanism, MMP found in 28, as bounded updates in order to provide applications a greater level of control.

The example of FIG. 9 is conceptual. The actual mechanism is MMP found in 28. However for illustrative purpose, the bounded command begins with an initial "begin" command initiator (MMP set) and includes commands to set a washer cycle to wash, a recipe status to ready, a water temperature to medium, again a recipe status to ready, and finally a cycle start indicator, followed by a command terminator (MMP unset). It can be noted that, in FIG. 9, updates (such as by eventing) are disabled to prevent updates from happening before the bounded command is complete. In addition, a "process command" indicator is shown periodically throughout the bounded command processing in the appliance 12 to illustrate the portions of the command issued from the client 16 through the internal communications network 14 are processed.

In the bounded updates 44, the updates are once again enabled (since they were disabled at the beginning of the bounded command 42) to allow the appliance 12 to report its status to the client 16. In the example shown in bounded updates 44, the acknowledgment state is shown to ready, the cycle is reported as wash, the state is reported as running, the basket is reported as fill, the pump is reported as on, and the temperature is reported as medium. Again, beginning and terminating indicators enclose the bounded update 44. These beginning and terminating indicators can be reported by use of the flag, MMP, in the application packet structure 28 as discussed in FIG. 4 or another method which would be apparent to one skilled in the art of network protocol.

In the bounded update 46, the basket is reported as agitate, the pump is reported as off and the motor is reported as on. Again, beginning and terminating indicators (MMP) enclose the bounded update 46.

API Strategy (Key Presses vs. Logical API)

In almost all cases, the appliance 12 is controlled by an integrated keypad. The embedded software handles the key presses or user events generated by the keypad and action is taken. In effect, the key press handling function(s) are the API for the appliances. The question to be considered in this section is if this API is the best approach or if a second API should be developed for an external client 16, 22.

In a key presses model, to use the Key Press API, the external client 22 must create virtual key presses and transmit those over the network. The external client 22 must be designed with the knowledge of the integrated keypad so that these key presses can be generated correctly and this requires an external network interface card to generate key presses. In this model, no modification is needed to underlying keypad programming. However, the client 22 must monitor the current keypad state in order to determine the key presses needed to achieve desired state. The Client API must change if the design of the key pad changes rather than machine capabilities. This architecture breaks best practices of software development by interposing a presentation tier between a middle tier and the persistence tier. There will need to be extended commands for Energy Management, Service and Diag., Testing, etc which are not available in the basic keypad interface. There must be a way to have a logical API as well as leverage as much as possible the validation code associated with the key press handling routines without needing to duplicate code.

In a logical API model, by contrast, the Logical API is developed from an abstraction of the machines capabilities rather than the design of the keypad. For example, Bake on a European oven using key presses might require that the client read the encoder position of the cycle dial and programmatically change the encoder to correspond to a Bake setting. If using a logical API, the client need only send the Op Code for set Cycle with the enumeration value for Bake: {0x01, 0x01} (setCycle(Bake)). In the logical API model, the client 16 need not be concerned with the keypad state, keypad design, or key press handling routines. The API remains independent of changes to the keypad design, allows for extended commands, and is an industry best practice.

It has been determined that the software architecture 10 will use a logical API which is integrated with the key press handling routines. The logical API exposes many of the extended commands, which enable various value-added applications. In the appliance control, when a key on the user interface is pressed or an external command is issued, it is directly mapped to a Logical API function call as a common entry point (e.g., when the WASH key is pressed or an external WASH network command is issued will both call the SetCycle(WASH) function in a washer with the software architecture 10 installed thereon). A Logical API function aims to describe a set of functionality in a parameterized manner so that it can be re-used. For example, non-logical specialized functions for temperature might be IncrementTemp( ) or DecrementTemp( ), which cannot easily be used to set the temp to any value. But a logical API function can be: SetTemperature(newTemp, or temp++, or temp−−). This last function can be used by both key presses and external commands.

A command handler for the software architecture 10 can comprise a method for the embedded software to response to either logic commands (e.g., setCycle(bake)) or key presses (e.g., pressing the "Bake" button on an oven appliance 12). The method translates incoming key presses and results in an invocation of the appropriate function within the logical API.

As much validation and state-based logic as possible exists inside this Logical API function so that external commands are treated the same and execute the same code as key presses. This API can be implemented without a major redesign of appliance control software. Only the Customer Interface Manager software must be reorganized and grouped to call API functions as the entry point for each key press command. This is not a requirement of the software architecture 10, however. It only serves to minimize the amount of code that must be written. If a collection of Logical API functions is not available to the external command engine, then validation and state logic found scattered in the appliance control must be duplicated for each external command, resulting in larger code size and increased possibility for error.

Identification: Multi-Node Issues

The discussion above on API Versioning and Discovery established a benefit for a mechanism to discover the APIs resident on any one node having the software architecture 10 installed thereon. Taken to the next step, there are additional considerations:

1. Multiple Nodes
2. Multiple Clients
3. Multiple installed Nodes which implement the same API
4. A single Node with multiple duplicate APIs
5. Multiple APIs Using the same Op Codes
6. SAP Assignment
7. Client Discovery of the Nodes supporting the software architecture 10 Protocol Multiple Nodes. It is probable that multiple components on the network will implement the software architecture 10. Therefore, considerations should be made for networks with multiple components which implement the software architecture 10.

In a facade pattern model, the facade pattern is used to create simple access to a collection of objects. This is done by creating an interposing software layer between the client and the various target objects so that the client has a simple interface to a single object. This single source is then responsible to forward requests to the appropriate target object. In the facade pattern model, this model is easier to manage because the API is centrally defined. In most applications, the facade presents a simpler interface to the client. However, this model requires compile time design to include other nodes' APIs into the facade node. Additional RAM/ROM can be required for the facade to handle and forward requests to the target node. And, if two nodes are clients to one another, then the facade pattern would create unneeded processing, as the facade node would first make request through his own facade only to forward those to the target node.

In a distributed services model, this method uses discovery protocol as the means for the client to find the target objects. The client is responsible for the independent interaction with each target object. In other words, the client will discover the software architecture 10 node(s) and then will interrogate each as to what API(s) are supported by each node. In the distributed service model, this model scales well such that components can be plugged together at runtime. However, this model can require multiple documents to manage the network variable definitions (APIs).

It has been determined that the software architecture 10 will use the distributed service model for managing multiple enabled nodes on the network 14. The facade approach can be undesirable because changes to the target object API require changes to the facade (change, compile, download, test). Whereas in a single compile time environment supported by good re-factoring tools, facade could be a good choice. In a distributed environment, the more flexible distributed service model will allow for faster development and flexible configurations. However, in some cases there may not be enough resources on each microprocessor in the system to support the software architecture 10. In other cases, there may be legacy protocol and there is no desire to make modifications to a legacy board. In these cases, facade can be a good alternative to the distributed service model.

Multiple Clients. As shown in FIG. 1, multiple nodes or clients 16 on the network 14 will implement the software architecture 10. Therefore, considerations should be made for networks with multiple occurrences of 10. One major consideration is that of event registration and notification. If multiple clients register with the software architecture 10 for events, the software architecture 10 should be able to manage the event distribution.

Using a node ID directed message eventing model, the software architecture 10 will store the Node ID(s) of each event requester such that when that event is triggered, a directed message will be sent to the requesting Node(s). In this model, messages are only sent to nodes that care about the event. However, this model requires one byte per message to store the Node ID and requires more RAM to create additional memory structures for each requesting node.

In a node ID directed message eventing with API ID Identifier, using this approach, the software architecture 10 stores the node ID(s) of each event requestor such that when that event is triggered, a directed message is sent to the requesting node(s). In addition, the API ID of the host node is included in the event. This model allows the client transport layer to better route messages internally. However, this model also requires one byte per message to store the API ID and requires more RAM to create additional memory structures for each requesting node.

In a broadcast message eventing model, using this approach, the software architecture 10 does not track the node ID of the event requestor. When the event is triggered, the software architecture 10 sends a broadcast message. In this model, the software architecture 10 implementation is simpler and smaller, there is no need to spend one byte per message to store the Node ID. However, broadcasting can create unnecessary event processing by other nodes.

A forth, hybrid approach, which is the preferred approach, comprises a model where broadcast messages are used which eliminates the need to store Node Id. However, the client will include API Id and Op Code in the Event Creation Messages of the DAQ (API Id 2, Op Codes 1, 2, 12, & 13) such that they are dynamically assigned (as discussed in the paragraph below). Using this approach, the resultant event message will contain the assigned API Id and Op Code (as shown in the publishEvent message of API Id=1) In this message (publishEvent), the API Id and Op Codes of Bytes 1 and 2 of 28 in FIG. 4, are those assigned by the client 16 using the Event Creation Messages (cited above).

It has been determined that the software architecture 10 described herein will use the broadcast messaging model which includes the API ID and Op Code. This will provide the benefit of routing by trading API ID storage for Node ID storage. Given the discussion on SAP below, the risk of broadcast messaging is much lessened. And although some amount of processing will be used by the nodes to discard messages not relevant to them, it is superior to directed messages which could eventually cause saturation of the network and of the software architecture 10 code. Including the API ID allows the client to configure the control with dynamic APIs which will encourage better, modular designs in the future.

Using the Same API on Multiple Nodes. It is probable that some optional network component will implement the same API as does the UI or Appliance Manager board (i.e. service/diagnostic or energy). This will allow the optional network component 16 to manifest itself to an external client 22. Thus, the software architecture 10 can permit the client 16, 22 to interact with two physical nodes—each implementing the same API. This design consideration is at the intersection of several others, and likewise, its resolution is a combination of preexisting design solutions.

Optional nodes are possible through dynamic membership. The client will be able to find out which nodes support the protocol 28 through the discovery API (see FIG. 6). Each node may be interrogated to find out what APIs are supported through discovery as well. Op codes are not globally unique, but the internal communication network 14 node id coupled with the API ID and the Op Code are unique. The API ID is embedded into each event.

To summarize, the client may first discover the software architecture 10 nodes and then discover the support APIs of each. The client may then initiate an interaction with each API of each node. As each packet 24 includes both the node ID and the API ID, both client and target will be able to avoid namespace conflicts and route messages to the appropriate application space.

Multiple Instances of APIs on the same Network Node. There are appliance 12 designs, which lend themselves to API re-use on the same microprocessor. Examples would include a double oven (i.e., two separately-controlled baking chambers) or a two-compartment refrigerated drawer. In other words, in some cases there are multiple cavities that perform the same function and can therefore be controlled via the same API. The design approach for this case is discussed.

In a unique function name model, the designer will create an API ID that has unique Op Codes for each command or variable without concern for re-using the definition. In other words, Op Code 10=lower oven set temp and Op Code 11=upper oven set temp. In this unique function names model, there is less messaging during discovery, however, this model does not promote modular design and code reuse.

In a multiple API ID model, the designer uses the same Op Code definition, but will designate a unique API ID for each instance of the API. In other words, upper oven API Id=1, lower oven API Id=2. In this model, there is less messaging during discovery and this model promotes modular design and reuse. However, this model will result in consuming the available API IDs at a faster rate.

In an instance ID model, the software architecture 10 dynamically assigns the API ID to each instance of the API except for the first instance. The first instance of the API will be identified by a global API ID repository. To enable this, the software architecture 10 specifies API IDs (e.g., 246-255) as reserved APIs for dynamic assignment to API instances. This model promotes modular design and code reuse, and does not consume API IDs. However, there is more messaging during discovery.

The software architecture 10 is an object oriented protocol designed to allow objects to discover and collaborate with each other in a robust manner. Basic to these requirements are: (1) collaboration entities must be uniquely addressable so that messages can be appropriately routed on the network and (2) collaboration entities must be uniquely identifiable so their messaging contracts, rules for interaction, and compatibility concerns may be understood. In a single runtime environment, the compiler is capable to enforce item (2). In a networked or distributed environment, embedded compilers do not generally address item (2).

Collaboration entity (object or API) addressing uniqueness is governed by the combination of a 3-bit node ID (found in the Address Field of 24 in FIG. 4) and an 8-bit API or Instance ID (found in Byte 1 of 28 in FIG. 4). Any network message containing these two pieces of information can be correctly routed. This provides for 255 unique collaboration entities (or objects) for each network node.

Entity identification is defined by an 8-bit API ID (e.g., a class identifier), a 2-byte Type ID (i.e., sub-class or specialization), and a 2-byte version ID (i.e., Type ID means intent and Version ID means compatibility).

This two-tiered approach recognizes uniqueness of addressing separately from uniqueness of identification. This separation provides for a more efficient use of bandwidth by removing four bytes of identification information from each packet. In turn the client must cache the identification information and index it by the eleven total bits of address.

It has been determined that the Instance ID model is a preferred embodiment of this invention. The Discovery API (API ID=3) has support for the Instance ID in messages, Publish API Info, Get Instance Info, and Publish Instance Info. Instancing is a very powerful concept, which can be exemplified by its use in the protocol.

API—Op Code Namespace. Messages on a serial network generally have a ASCII or numeric identifier which allow the receiver of the message to route the data contained in the message to the appropriate internal function. This function will then operate on the remaining data in the payload.

The remaining data in the payload is defined at design time in a document. This document describes the meaning of each bit and/or byte in the payload. From this, internal software message handlers are developed specifically for each payload definition. Therefore there is, in general, one message handler for each unique Op Code and Cmd/Fb pair.

Normally, if there were multiple independent payload definitions that shared the same Op Code without any additional identification mechanism, it would be impossible for the receiver to route that message to the appropriate message handler. However, this invention provides the Cmd/Fb flag to support the overlap of Op Codes using, the flag for differentiation. Thus, this invention provides the functionality to overlap a command and its corresponding feedback message using the same Op Code.

This section discusses techniques that can be employed to provide unique identification to message payload definitions.

In a globally-unique Op Code model, using this approach, Op Codes must be globally unique. In other words, each platform or API developer must be allocated an Op Code range (e.g., 350-385) which must not overlap with the Op Code range of any other project. This model is inefficient due to range allocations which require spare IDs. Further, API developers will not have control over their Op Code numbering scheme and this model requires an order of magnitude more coordinated decisions (information handoff).

In a globally-unique API ID model, using this approach, Op Codes are grouped into logical collections forming an API. The API will be assigned a globally unique ID composed of API Id, Type, and Version. Therefore, thy Op Codes therein need only be unique within the API. In this model, there is no need for allocated spare IDs, API developers can start at Op Code=1, and this model requires less information coordination to avoid namespace conflicts.

It has been found that this invention employs the globally-unique API ID strategy as a preferred embodiment. Certain fixed Op Codes, which are part of the software architecture 10 Core API, revert to the common starting number (1) and the Core API can preferably be assigned an API Id of (1).

SAP Assignment. SAP found in 24 identifies the structure of the Wide Payload or SDU 26 It is the same concept as an API ID, which was introduced earlier herein. The advantages of SAP are also the same, in that incoming messages need to be identified and routed to the correct internal handlers (or quickly discarded). In the example WIDE network 14 discussed herein, there are sixteen available SAPs. The software architecture 10 fits the criteria for SAP membership. In this scenario, the internal communication network 14 administrator can approve the software architecture 10 application protocol and assign the software architecture 10 an official SAP. Other network identifiers for the protocol 24 are contemplated without departing from the scope of this invention. For example, the software architecture 10 can be assigned a default SAP of 1 on the internal network 14.

A SAP (or other sub-protocol identifier) allows the internal communication network 14 node to participate in the software architecture 10 and non-architecture 10 messaging. The software architecture 10 SAP fits into global architecture, and adds more scope to the software architecture 10. The internal communication network 14 SAP is a sound concept from both a technical and practical perspective. Securing a network 14 specific ID provides the software architecture 10 with global visibility and official acceptance which can help to proliferate its use and propel it to a global standard.

The software architecture 10 Discovery FIG. 5. In the previous section, it was established that the software architecture 10's API ID is analogous to the internal communication network 14's SAP. Likewise, in previous sections, it is established that it is advantageous for the software architecture client 16 to discover by interrogation the API(s), which reside on each physical node of the software architecture 10.

A similar question and/or solution can be presented for the software architecture 10 discovery. If a service tool wanted to dynamically discover all of the software architecture 10 API(s), it would first need to discover the Node IDs of the internal communication network 14 node(s), which supported the software architecture 10 protocol. This can be accomplished by a broadcast message model which sends a broadcast command which the software architecture 10 nodes will respond to. In this model, the software architecture 10 can broadcast a new API which is added to the software architecture 10 or can broadcast the addition of a new network 14 node(s) which implement the software architecture 10. The Discovery API, FIG. 6 which will serve as the mechanism for the software architecture 10 discovery. There can be both a polling discovery message and an unsolicited broadcast message available and is discussed in the Discovery API (API ID=3).

Multi-Payload Message Integrity

Frag, bit 6 of Byte 2 in the software architecture 10 header, enables the software architecture 10 protocol to send payloads greater than that of the underlying protocol (i.e. that of the internal communication network 14). When Frag is set, the receiver should realize that the current message will be fragmented into multiple packets or fragments.

In the message-fragment id model, the first fragment of a fragmented message uses the standard packet structure as described in FIG. 4. This initial fragment provides the message's API, Op Code, and Cmd/Fb flag. All subsequent fragments of the message will preferably assume the fragmented message structure described in FIG. 24. In this structure, the Frag flag still exists (along with the MMP flag) to reinforce the data. However, Byte 2 now contains the more fragments pending flag (MFP) in bit 5, message id (MID) in bits 3-4, and fragment id (FID) in bits 0-2.

The MFP flag informs the receiver that at least one more fragment of the current message should be expected. The transition of MFP from 1 to 0 informs the receiver that the current packet is the final packet of the current message. MID provides an 2-bit identifier for each message. Thus, each fragmented message (group of fragments) will be assigned a MID, and this MID will then increment for each subsequent fragmented message (group of fragments). The MID will increment to 3 and then rollover back to 0. FID provides a 3-bit identifier for each fragment within a message. Thus, for a particular message, the first fragment will always be assigned and FID of 0. For each subsequent fragment of that message, the FID will be incremented. The FID will increment to 7 and then rollover back to 0.

The fragmentation protocol provided by this invention allows the receiver to check the integrity of a fragmented message. By monitoring the Frag and MFP flag, the receiver can ensure no erroneous halts to a fragmented message. By checking that the MID does not change within reception of a single fragmented message, the receiver can ensure that two separate fragmented messages do not become merged (perhaps due to a lost fragment). By checking that the FID correcting increments per fragment, the receiver can ensure that not fragment is lost within a message (or received out of order). See FIG. 25 for an example of the message-fragment id model.

In a summary CRC model, this solution makes use of a well-known existing cyclic redundancy checksum (CRC) concept. An additional two-byte CRC can be appended to the last payload of a multi-payload message. The CRC is the CRC representation of all payload bytes concatenated into a single combined payload. The sender generates this CRC. The receiver validates this CRC according to well-known methods. In this summary CRC model, this solution re-uses existing CRC algorithms which are established and well known, however, the CRC algorithm is more complex than frame counter and the CRC may not be easily portable to a third party vendor.

Therefore, it has been determined that the message-fragment id model is a preferred embodiment for confirming multi-payload message integrity in the software architecture 10 according to the invention. The message-fragment id model is easier to implement for third parties and is easier to add to the existing architecture 10.

Software Organization

Figure 10:
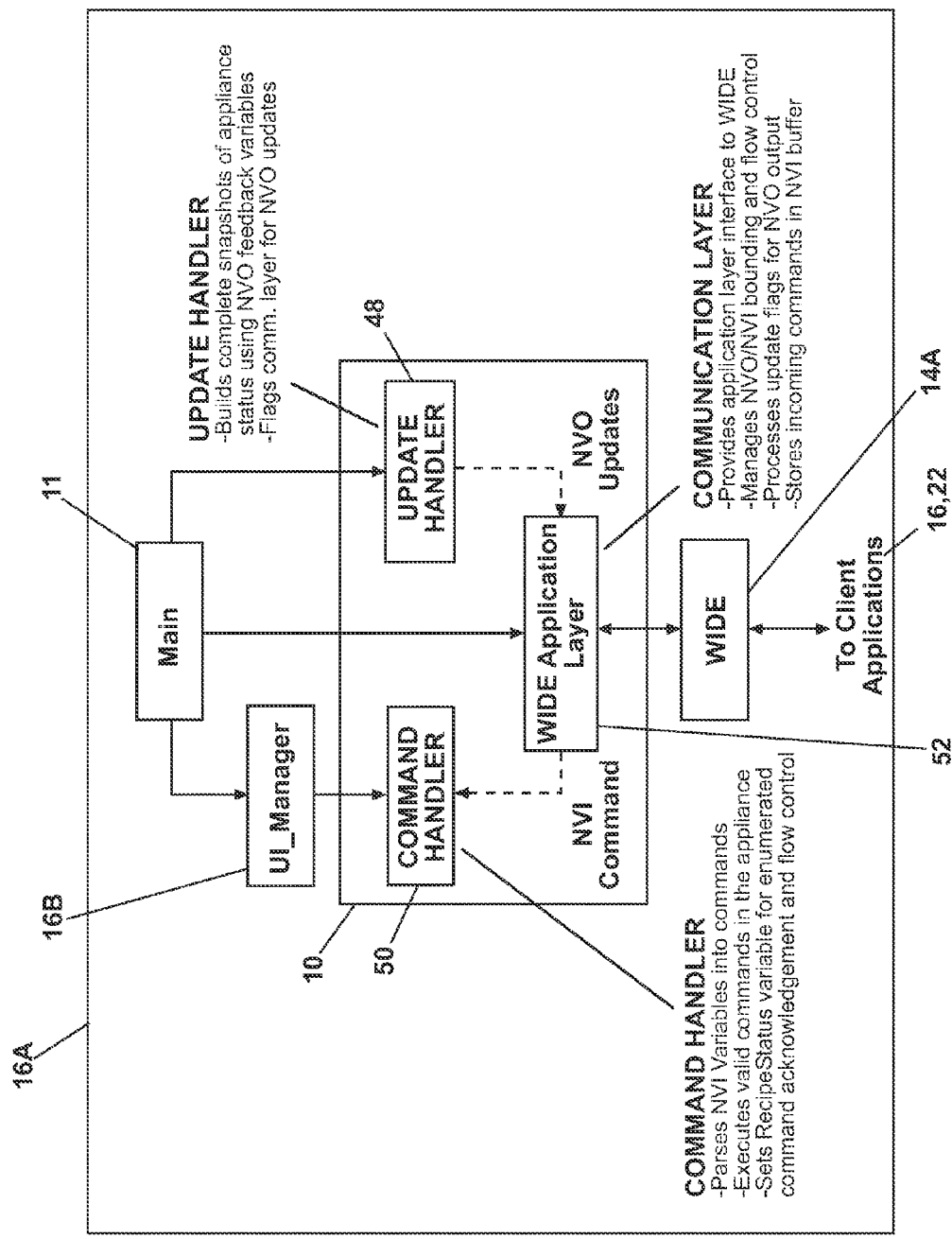
FIG. 10 is a schematic illustration showing the SA in relation to the overall software environment of a component, where the software environment comprises various software operating layers, with the software architecture comprising a command handler, an update handler and an internal communications network layer interface for interconnecting the SA to the internal communications network of the household appliance.

With respect to the software architecture 10, the code organization and implementation files will now be discussed with respect to FIG. 10. FIG. 10 is a schematic illustration showing the software architecture 10 of FIG. 1 according to the invention in relation to the software operating environment 16A of a component 16 containing various software components 16B wherein the software architecture 10 comprises a command handler 50, an update handler 48 and an internal communications network layer interface 52 for interconnecting the software architecture 10 to the internal communications network software operating layer 14A, which creates and sends data over the communications network 14 of the household appliance 12. Also shown is an example of how other software components 16B within the software operating environment 16A would invoke on and interact with the components of the software architecture 10 (50, 52, and 48).

In order to create a more generic implementation of the software operating environment 16A, the dependency between the UT Manager (which is one of several software components 16B within the software operating environment 16A) was eliminated. In this implementation, the Main execution loop 11 of the software operating environment 16A executes the invocation onto 50. It was previously believed that the previous implementation afforded more accurate and robust performance of the software architecture 10 due to the particular timing details associated with the execution timing associated with UI_Manager 16B.

To define the first level of detail for the software architecture 10, three main software components (sub-components) are shown: the update handler 48, the command handler 50, and the internal communications network layer interface 52. The update handler 48 interacts with the DAQ engine 30 in order to identify information flagged for updates within the operation of the DAQ such that the internal communications network layer interface 52 can process said information resulting in interaction with internal communications network software operating layer 14A resulting in a packet structure 24 transmitted onto network 14. The command handler 50 validates and processes incoming commands from the internal communications network layer interface 52 invoking onto the appropriate software operating function according to the Identifiers API Id and Op Code values of packet structure 28. The internal communications network layer interface 52 is meant to decouple (as much as practicable) the particulars of the software architecture 10 from the internal communications network software operating layer 14A, the network 14 of FIG. 1, and the packet structure 24 of FIG. 4. The internal communications network layer interface 52 interfaces with the internal communications network software operating layer 14A, which creates and sends data according to the definition of FIG. 4 over the communications network 14 of the household appliance 12.

Software operating layer sub-components 48, 50 and 52 of the software architecture 10 shown in FIG. 1 work together to manage communications with other components 16 or 22 which also have the software architecture 10 or an alternative capable to interact with packet structure 24.

Figure 34:
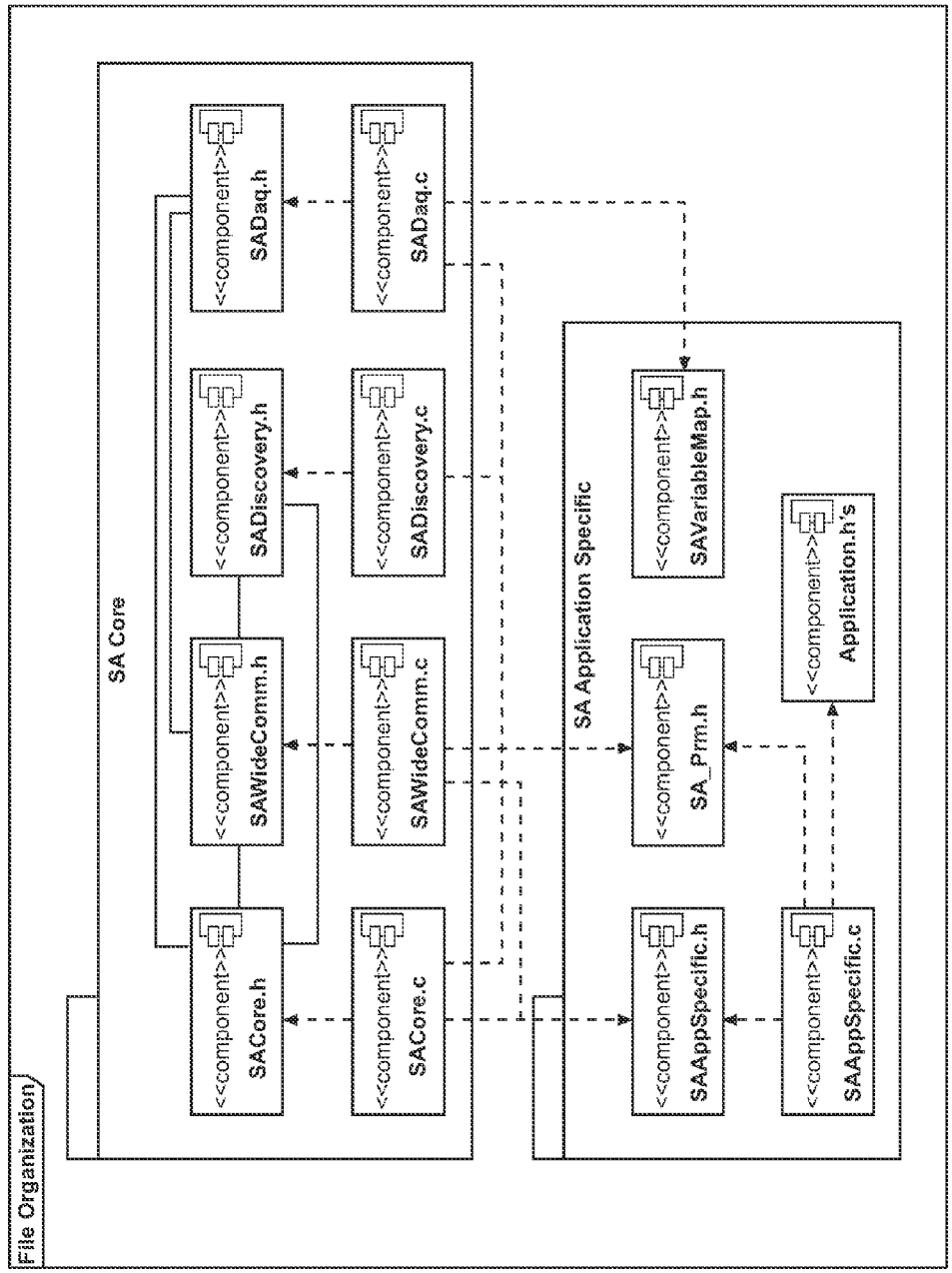
FIG. 34 shows the preferred organization of source code files of the SA.

FIG. 34 shows several implementation files which are contemplated for use with this invention.

SA_prm.h. The software architecture 10 includes configurable parameters and command enumerations.

SACore.c/.h. This file for the software architecture 10 core software contains the update handler 48 and command handler 50 which processes commands, manages flow control feedback, and takes snapshots of appliance data for dynamic updates.

SAAppSpecific.c/.h. This file for the software architecture 10 core software contains appliance-specific command handlers and command implementations for driving a particular type of appliance 12 (such as a file specifically directed for management and communication with a washing machine, for example). Any command that is not generic to all appliances 12 is implemented in this function. These commands are enumerated in SA_prm.h and are called by the command handler.

SAWideComm.c/.h. This file contains the internal communication network 14 application layer 52 which provides the interface to the internal communication network 14 protocol and controls bounding of messages into snapshots, parsing incoming commands, and processing update flags to send out update messages.

SADaq.c/.h. These files contain all functionality for the DAQ engine 30. Thus, all functionality concerning the update handler 48 and eventing is contained here.

SADiscovery.c/.h. These files contain all functionality for a node implementing the software architecture 10 to discover other nodes (and the corresponding functionality of) other nodes which implement the software architecture 10.

SAVariableMap.h. This file contains the embedded variable map which allows for event creation by an external client without knowledge of a variables address in memory.

FIG. 11 illustrates an example interface of the software architecture 10 with an appliance control where the software architecture 10 of FIG. 1 is thrice invoked from the supervisory scheduler (MAIN) according to the invention. Also shown is MAIN's invocation onto WIDE.WideExec( ).

WIDE.WideExec( ) subsequently calls back onto the software architecture 10 according to FIG. 33 where the component of the software architecture 10, WideCommHandler, exposes functions. SA_AcceptData( ) and SA_BuildData( ). Also shown is MAIN's invocation onto SA_WideComm( ) (also a function exposed by a component of the software architecture 10) which ultimately results in the invocation shown in FIG. 33 onto the function WIDE.QueueMsg( ) of the component WIDE of the software operating environment 16A.

Figure 13:
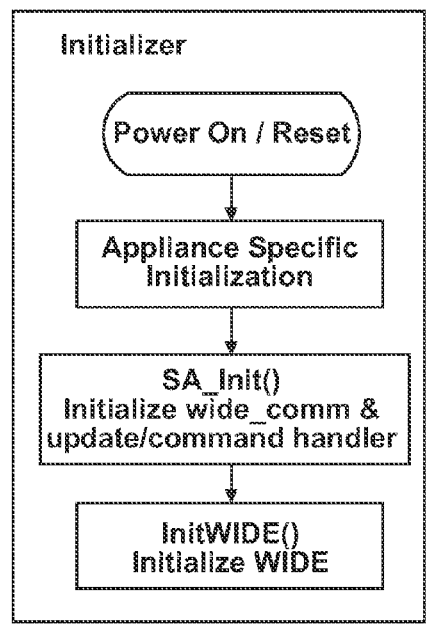
FIG. 13 is a schematic illustration of the example implementation of the software architecture shown in FIG. 11 including an appliance initialization section.

FIG. 13 is a schematic illustration of the example implementation of the software architecture shown in FIG. 11 including an appliance initialization section. The initialization function calls SA_Init( ) from an initialization routine before entering the main execution loop shown in FIG. 11.

The table following this paragraph illustrates a documentation example of how APIs will be managed, including the mechanism of Compiler Directives to control the deployment of the functionality exposed through the APIs of the software architecture 10.

size=300 bytes), 7 APIs defined, and a maximum command size of 15 bytes.

Figure 14:
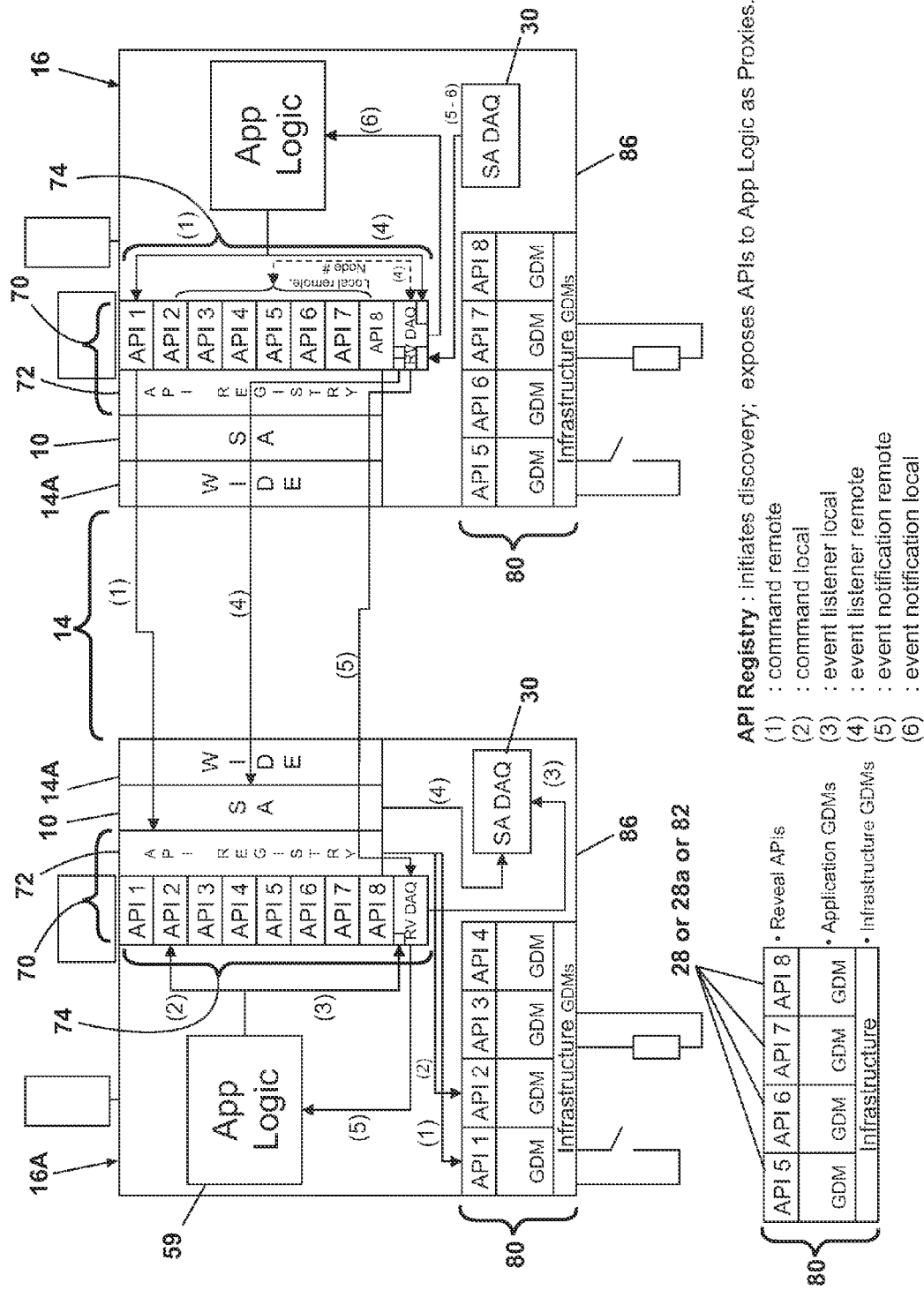
FIG. 14 is a schematic illustration of a pair of software operating environments, each corresponding to a different component with its own SA, and connected by the internal communications network.

FIG. 14 is a schematic illustration of a virtual router incorporating the software architecture of FIG. 1 according to the invention showing a mapping between a pair of software architecture implementations. The virtual router of FIG. 14 is a software design which encapsulates the API implementations (objects, see APIs 1-8 in each side of the router of FIG. 14) of the software architecture 10 such that the collaboration between an embedded client (application logic, algorithms, closed loops, sequencers, and state machines) and embedded components (the software architecture 10 API implementation: objects like defrosters, heaters, temp sensors, valves, etc.) is uniform and identical regardless if the entities collaborate over the network or share a runtime environment.

FIG. 14 shows six unique collaboration examples labeled as such illustrative of how a pair of software operating environments 16A existing on separate hardware components 16 and connected by a network 14 will use the various software

| API Name | API ID | Type | Version | Compiler Directive | ROM Use | RAM Use | Notes |
|---|---|---|---|---|---|---|---|
| CORE | 1 | 1 | 2 | SA_COR | 1810 | 43 | Based on 30 dynamic events registered |
| Data Acquisition (DAQ) | 2 | 1 | 2 | SA_DAQ | 1658 | 373 | Based on 30 dynamic events registered (10 bytes RAM/event) |
| Data Acquisition Extended (includes SA_DAQ) | 2 | 2 | 1 | SA_DAQ_EXT | SA_DAQ + 1064 | DAQ | Based on 30 dynamic events registered (includes SA_DAQ) |
| Discovery | 3 | 1 | 1 | SA_DISC | 516 | 3 | |
| Debug | 4 | 1 | 1 | SA_DEBG | | | |
| Low Level | 5 | 1 | 1 | SA_LOLV | | | |
| Key Press | 6 | 1 | 1 | SA_KEPR | | | |
| Memory - Port API | 7 | 1 | 1 | SA_PORT | 342 | 0 | |
| Energy Management | 8 | 1 | 1 | SA_ENGY | | | |
| GMCL | 9 | 1 | 1 | SA_GMCL | | | |
| Poll Variables | 10 | 1 | 1 | SA_POLL | | | |
| Service and Diagnostics | 11 | 1 | 1 | SA_DIAG | | | |
| Unused (140-240) | | | | | | | |
| Non-Standard (241-245) | | | | | | | |
| Reserved for API Instance Id (246-255) | | | | | | | |

In the above table, API Ids in the 241-254 range can be used without consideration for standards. They are intended to allow a designer the flexibility to use the software architecture 10 in an application where the expectation of re-use is minimal. In such cases, this will eliminate the need to develop a specific API Id and Type for a collection of messages which are expected to be a 'one off'. These Ids can also be used for candidate standard APIs which have not yet received their official ID. Additionally, in the above table, the RAM and ROM estimates are taken using Motorola HC08 Cosmic Compiler version 4.3f with the software architecture 10 configured to have 30 dynamic events allowed (i.e., heap components 16B of the software operating environment 16A to create transparent access between the operating logic of 59 and the software components 16B of both the right hand and the left hand software operating environments.

Prior to describing the collaboration examples, a description of the structure of FIG. 14 should aid in the understanding of the collaboration examples. Each software operating environment 16A contains representations of a sub-set of useful software operating components (16B) contained, including: the software architecture 10, internal communications network layer interface 14A, the DAQ 30, and a hardware abstraction layer 80.

The hardware abstraction layer 80 comprises: a mechanism therein to encapsulate the particular fixed address of the connected electrical circuits on which the software operating layers of 80 will operate; and software interfaces (28, 28A, or 82) encapsulating occurrences of 16B in the form of (one of the following): 28 the packetized representation (an ordered collection of bytes) of a message exchanged by the software architecture 10, 28A the packetized representation (an ordered collection of bytes) of a message exchanged by the software architecture 10 representing only the application payload 28A (the valid data arguments) expected by the software operating component 84 or 86, 82 an alternate representation of either 28 or 28A where the intent and data values and resultant actions are functionally identical but not of the form of an order collection of bytes. 82 is in the form of a unique software function having arguments represented by individual named variables whose value is derived from 28A or represented by an ordered collection of bytes derived from 28A.

Application GDMs 84 (Global Design Modules) are variants of 16B known as global design modules which are standard software operating components having been subjected to a standard development process including functional and non-functional requirements, testing, documentation, and implementation guidelines. Application GDMs address appliance specific concerns such as defrosters, heaters, door closure. Application GDMs can be classified in at least 2 variants. Variant contains specific application logic apart from 59 used to govern the behavior and gather information from a collection of other software operating components including a plurality of other 84(es) and 86(es). Variant 2 contains specific application logic apart from 59 used to govern the behavior and gather information from a specific electromechanical device or sensor such as a heater, evaporator, motor, valve, solenoid, relay, pressure or temperature sensor. Variant 2 may be configured to address specific concerns made relevant by the specific manufacture's variant of the device, by the particular configuration of the device based on the usage mode determined by the application requirements (i.e. Scaling values), or by a confluence of factors which create specific concerns not mentioned heretofore.

Infrastructure GDMs 86 address specific recurring concerns which are independent of the application of the system architecture of FIG. 1. They can be re-used across a plurality of appliances such as refrigerators, cooktops, dishwasher, dryers, clothes washers, etc. Infrastructure GDMs can be classified in at least 2 variants. Variant 1 is associated with a particular concern resulting from a recurring combination of electrical components or electrical constraints. Some examples are: manufacture interface constraints, device duty cycles, electrical load characteristics examples of which are inrush and steady state current limits, or other constraint such as the mode of analog conversion to digital examples of which are 4-20 mA current loops vs. 0-5 Vdc analog voltage feedbacks. Variant 2 is associated with appliance and application independent software components known as utility functions. They provide logic used by other 16B components including 59 and 80. Variant 2 may contain or use references to Variant 1 of 86. Examples include timers, zero cross detection, and other useful software components whose purpose is more utilitarian than driven by application or electromechanical requirements.

An embedded virtual router 70 provides an encapsulating layer by which architectural dependencies (the method by which one component 16B is accessed by or exposed to another 16B [examples of 16B are 30, 84, 86] within or between at least two software operating environments connected by 14) between the application logic 59 (of the software operating layer 16A of the component 16) and the components comprised by the hardware abstraction layer 80, DAQ 30, another instance of application logic 59 or component therein, or any other useful component 16B are minimized or eliminated.

A software component 72 used by other software components 16B to obtain references to any other software components 16B where the obtained 16B may be part of a software operating environment 16A existing in or on: the same hardware component 16, a different hardware component 16 connected by 14, a different hardware component 22 connected by a combination of network segments including 14, or a different hardware component 16 of a different appliance 12 connected by 14, a combination of different network segments between the two occurrences of 12, and the 14 of the first appliance 12.

The software component 72 also provides the mechanisms for other software components residing within the same software operating environment 16A to publish the necessary identification and/or routing information into the memory of 72 such to enable the aforementioned enumerated uses of 72. The identification and routing information may be associated with components residing within the same software operating environment or the identification and routing information may be associated with components apart from the components residing within the same software operating environment, but are known by components residing within the same software operating environment.

Structures 74 in the memory of 70 are able to receive messages or provide functions for invocation of messages and are able to send messages or provide callback functions for the distribution of information. These structures having an access definition of 28, 28A, or 82 corresponding to an occurrence of a software component such as components within 80, 59, or any other useful software component located in the aforementioned enumerations of 72 and the capability to route the information to that software component or to an appropriate intermediate software component having the same or similar purpose of 74.

Looking now at the possible collaboration examples, it is expected that the structures 74 of 70 will be created and populated based on discovery queries containing requests for access to specific software components 16B which are both identifiable and routable, invocations implying said access, or by software components 16B which are able to invoke on 70 on behalf of themselves or other components 16B resulting in creation and population of structures 74.

Collaboration 1: a command is issued by software component 59 of the right-hand software operating environment 16A and received by a software component contained in the collection of 74 with an identifier of API 1 within component 70 of the same software operating environment. Using the identification and routing information contained within 70, the component identified by API 1 transmits the received information through the other local software operating layers 10 and 14A, and finally transmitted over 14 and received by 14A of left hand software operating environment. The message is then handled by 10 and routed to the appropriate component within 74 of the left hand software operating environment. The appropriate 74 of the left hand software operating component using identification and routing information contained within 70 of the same software operating component then invokes on or sends the message to the local implementation of API 1 contained in the left hand software operating environments hardware abstraction layer 80. Thus the application logic within software component 59 of the right hand software operating environment invoked a function implemented in the software operating environment of the left hand side without information contained therein for the realization of said invocation. Therefore, the value of the design implied by FIG. 14 is that application logic 59 is re-useable with respect to the location of the of the other software operating components 16B within a plurality of software operating environments 16A connected by a network 14 or a plurality of network segments which may include 14.

Collaboration 2: In this case, the initiation of the message is from 59 of the left hand software operating environment 16A. Illustrated is the case where the final invocation is on a software component (in this case API 2) within the same software operating environment using the same methodology described in greater detail in Collaboration 1. Therefore, in Collaboration 2, an alternative architectural disposition between an occurrence of Application logic 59 to some other useful software component (API 2 of Hardware abstraction Layer 80) is shown to have no effect on the implementation of either. And furthermore, it is the purpose of software component 70, also being able to comply with the Identification and interface requirements imposed by the software architecture 10, to provide this capability.

Collaborations 3-6 show additional uses for the Embedded Virtual Router 70. The mechanisms used to accomplish these variants are the same as described in Collaborations 1 and 2. They are included to illustrate the usefulness of the design and the expected additional message patterns to be available with respect to the DAQ 30. Local event listeners (3) and remote event listeners (4) of Application Logic 59 are provided with an interconnection to a representation of the DAQ engine 30 providing not only a connection to the DAQ in the local software operating environment, but also to the DAQ(s) which reside in remote operating environments. DAQ generated messages based on the occurrence of DAQ events can be transmitted locally (6) and remotely (5) through mechanisms available in 70.

Figure 15:
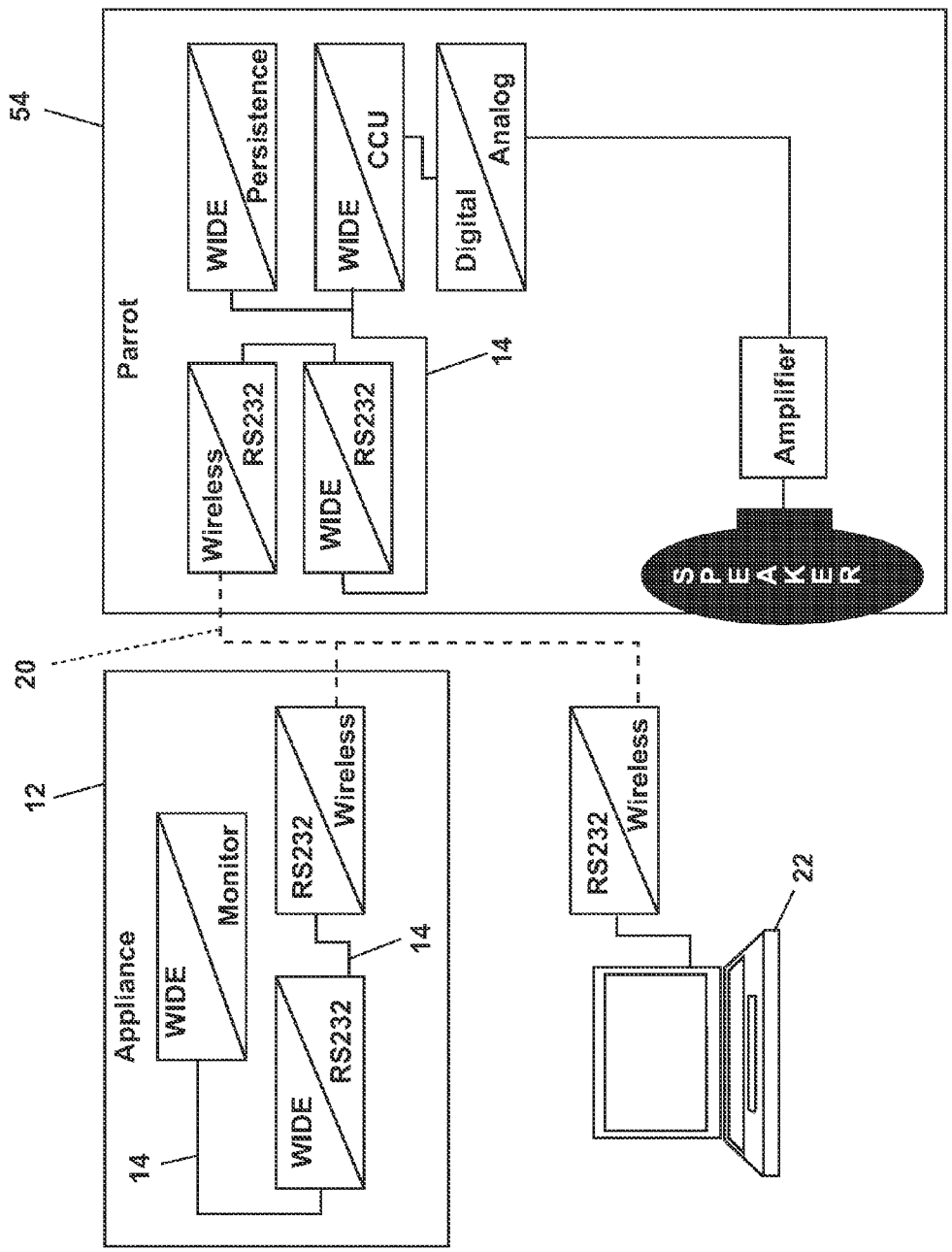
FIG. 15 is a schematic illustration of a persistence node exposed to other components within the Parrot Appliance via network 14 and supporting packet structure 28 of the software architecture 10 of FIG. 1 according to the invention.

FIG. 15 is a schematic illustration of an atypical appliance constructed using the architecture of 12 and comprising a persistence node 54 incorporated as a component comprising the software architecture 10 of FIG. 1 according to the invention. Whereas the state of the art in embedded systems is to provide data persistence local to the PCB, the persistence node according to this invention provides a persistence service exposed to components 16 and 22 through the mechanisms of the software architecture 10 and/or the embedded virtual router 70.

Various examples of the connectors and protocols (RS-232, wireless, WIDE, etc.) are shown within the components of each client which communicate with one another along an internal network on each component 16, appliance 12 and persistence node 54. In summary, the persistence node 54 is a logical entity which is discoverable and useable by all components 16 sharing a network 14, 20 or a runtime connection. This entity will provide services and protocol mechanisms necessary to read, write, and store information.

As discussed above, appliances 12 are "state" driven machines and typically have a user interface (e.g., a keypad) using which a user can effect a change in state of the appliance 12 (e.g., change a washer from an idle state to a "wash" state). As applications are developed that require external communication with an appliance 12 (e.g., testing, diagnostics, remote control, etc.), there are three possible techniques to perform this interface: (1) translate external commands into key presses (see FIG. 16 and discussion); (2) use custom software to execute state-change commands (see FIG. 16 and discussion); or (3) simply translate key presses into a logical API (see FIG. 17 and discussion).

Figure 16:
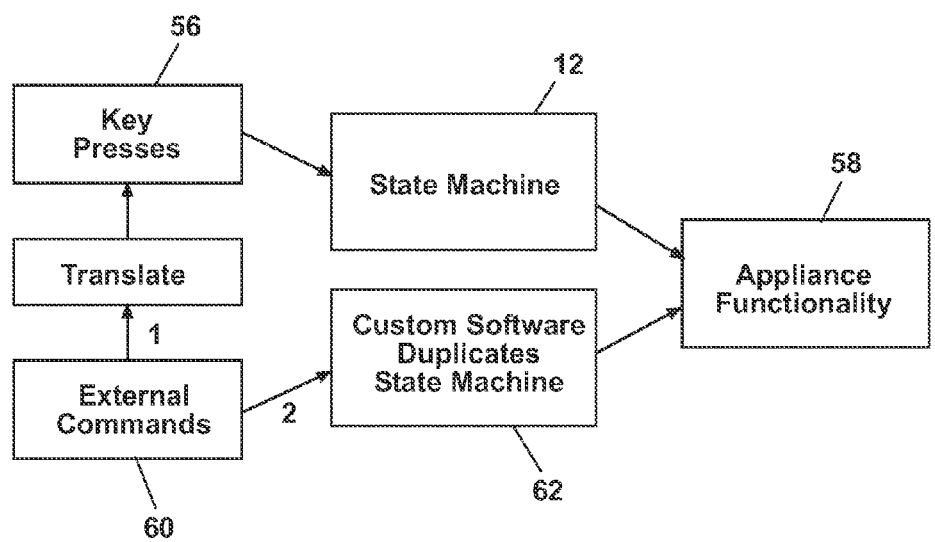
FIG. 16 is a schematic illustration of a prior art method by which external commands are translated into key presses for testing household appliance functionality.

FIG. 16 is a schematic illustration of a prior art method by which external commands are translated into key presses for testing household appliance functionality. In the prior art method, a user would actuate an appliance 12 via one or more key presses 56 to change the state of the appliance (referred to in FIG. 16 as a "state machine" 12) to affect the appliance functionality 58. In order to test the functionality 58 of the appliance, the user would prepare external commands 60 and either (1) translate the external commands 60 to key presses 56; or (2) prepare custom software 62 which would emulate the state machine appliance 12 to attempt to duplicate the appliance functionality 58. This can be difficult and error prone.

Figure 17:
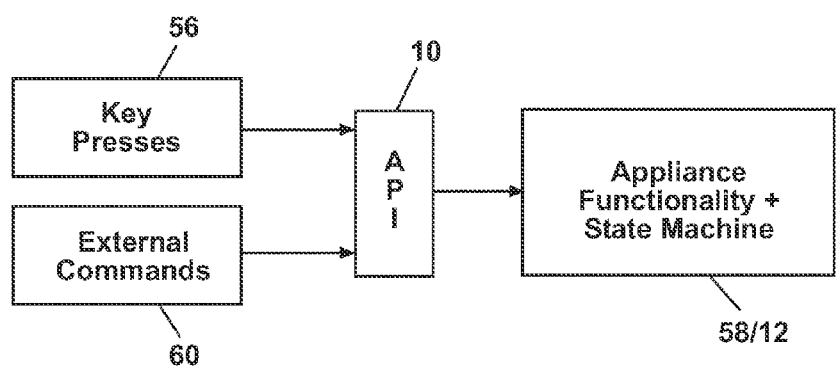
FIG. 17 is a schematic illustration of the interaction of user-initiated key presses and externally-fed software commands are passed as arguments to the SA for issuing commands to a household appliance to, e.g., test household appliance functionality and/or change the state of the household appliance machine.

In an new method of operating and testing an appliance, FIG. 17 is a schematic illustration of the interaction of user-initiated key presses 56 and externally-fed software commands 60, typically from a client, are both passed as arguments to the software architecture 10 of FIG. 1 according to the invention for issuing commands to a household appliance 12 to, e.g., test household appliance functionality 58 and/or change the state (i.e., actual operation) of the household appliance 12.

The method discussed with respect to FIG. 17 is novel because, instead of translating external messages, treating the appliance 12 as a closed system, it exposes the functionality of the appliance 12 independently of whether the message is received as an external key press or a software command local or remote to the appliance 12. The messages (commands) are processed through an API of the software architecture 10 (now an open system as opposed to the prior art "closed" system), while preserving key-press validation and feedback to the user.

Currently, appliance control software is not set up to validate and execute external commands. To remedy this, an appliance API is defined that includes both user functionality as well as low-level machine control commands. During normal operations, when a key is pressed or an external command is issued, it is directly mapped to an user functionality API function call as a common entry point (e.g., a WASH key is pressed on a user interface [keypad] or an external WASH command is issued will both call a setCycle(WASH) function immediately, regardless of the state of the appliance 12). All validation and state-based behavior will exist inside this function so that external commands are treated the same end execute the same code as key presses 56.

This API can be implemented without a major redesign of appliance control software. Only a user interface software would need to be reorganized to call API functions as the entry point for any command instead of just reacting to key presses inside of the state machine 12. Use of this method of FIG. 17 enables the manufacture of an appliance 12 to test and diagnose the keypad/user interface separately. This saves time and effort in development, diagnosis and testing of appliances. This will also eliminate the need for complex mechanical keypad actuation devices as well as mechanical actuation harnesses which were conventionally used to test user interfaces and appliance functionality.

In addition, the appliance 12 API contains a command to send the appliance into a diagnostic or factory test mode. In this mode, all state-based behavior and command validation code is disabled to allow for a low-level API. API commands in this mode can access and control low-level parts of the appliance 12 such as reading and writing to EEPROM, pressing keys (56), reading sensor values, writing to cycle parameters, actuating relays and other actuators, etc.

The API interface discussed with respect to the software architecture 10 is an object-oriented software package that is effective when one object (appliance functionality) has multiple clients that need to interact with it (e.g., both key presses 56 and external commands 60). This is a new approach because appliances do not currently contain object-oriented software and are generally thought of as being a closed system and having only one client: user interface keys. This invention contemplates that appliances 12 will have many clients through the introduction of an internal communication bus (i.e., network 14) and external connectivity 20. These clients may include web applications, diagnostic tools, testing tools, and home automation systems, among others.

Appliances 12 with the API software architecture described herein will be "future proofed" and ready for many advanced remote applications that customers may request. These can include energy management, improved service and diagnostics tools, and remote control and monitoring. In addition, since the API is the entry point into all appliance functionality, customers can benefit from improved automated development testing and factory testing of appliances 12.

The software architecture 10 also contemplates that the virtual device model can be aware of the current capabilities of the physical device (the appliance 12). For example, if an oven is baking, the appliance clock cannot be modified. Capabilities synchronization is a general solution meant to allow a virtual model to recognize changes to the capabilities of a device based on its state.

Currently, this purpose is achieved through code which is written per appliance 12. The solution contained in the software architecture 10 replaces device specific code with a general solution. This solution is comprised of additional messages which the software architecture 10 broadcast containing the current set of invalid commands (API and Op Code). This information is evaluated at runtime so that the user interface will be expressed in such a way that the user may only modify those device characteristics which are modifiable, so that the customer is not given the opportunity to modify a device characteristic which is currently immutable as dictated by the actual device.

The software architecture 10 is a cross-product system of applications and tools. These applications help to increase both quality and speed to market in the product development process. This is done by interacting with the data that is stored in memory inside the appliance 12.

In order to stay flexible, configurable and generic, the applications interact with the appliance by specifying numeric memory locations (addresses) which are required. Each time the software in the appliance changes, however, these locations in memory can move around and take on a very different meaning. In order to solve this problem, a variable map file standard and generator were created.

The variable map file generator takes the software names (textual descriptions) written in code and associates them with the numeric address and size of that piece of data. It then outputs this information in a standard file format. This is executed each time the code is changed and compiled. The information in this standard file provides independence from both the compiler and from where data is located in memory.

The variable map file is then read by any application that wants to interact with a software architecture 10-based appliance 12. Applications are coded against the meaningful textual names of data, rather than the numeric addresses of data which greatly simplifies application development.

The variable map file format and usage process are described in the table below.

| Module | Variable Name | Address | Size |
|---|---|---|---|
| appman.h | Hour_Timer | 0213 | 1 |
| appman.h | Zone1 | 020e | 3 |
| appman.h | Zone1.Act_Temp | 0210 | 1 |
| appman.h | Zone1.Zone_State_Tmr | 020f | 1 |
| appman.h | Zone1.Zone_State | 020e | 1 |

An example of the method used in working with the variable map concept includes the following steps.
1. An engineer builds an application coded against the textual descriptive names of meaningful data located in the appliance control.
2. The appliance control code changes, resulting in new locations of the meaningful application data.
3. An engineer compiles the new appliance code, which also automatically generates an associated variable map file. The new code and variable map file are deployed together.
4. When the application is run against the new code, it does not have to change, as long as it has the proper variable map file.
5. If new data is required by the application, it can be easily identified or retrieved from the variable map file.

Thus, as shown above, the development engineer need only remember the "Variable Name" column in the table above, and not need to constantly look up the constantly-changing address values in the "Address" columns above.

Figure 18:
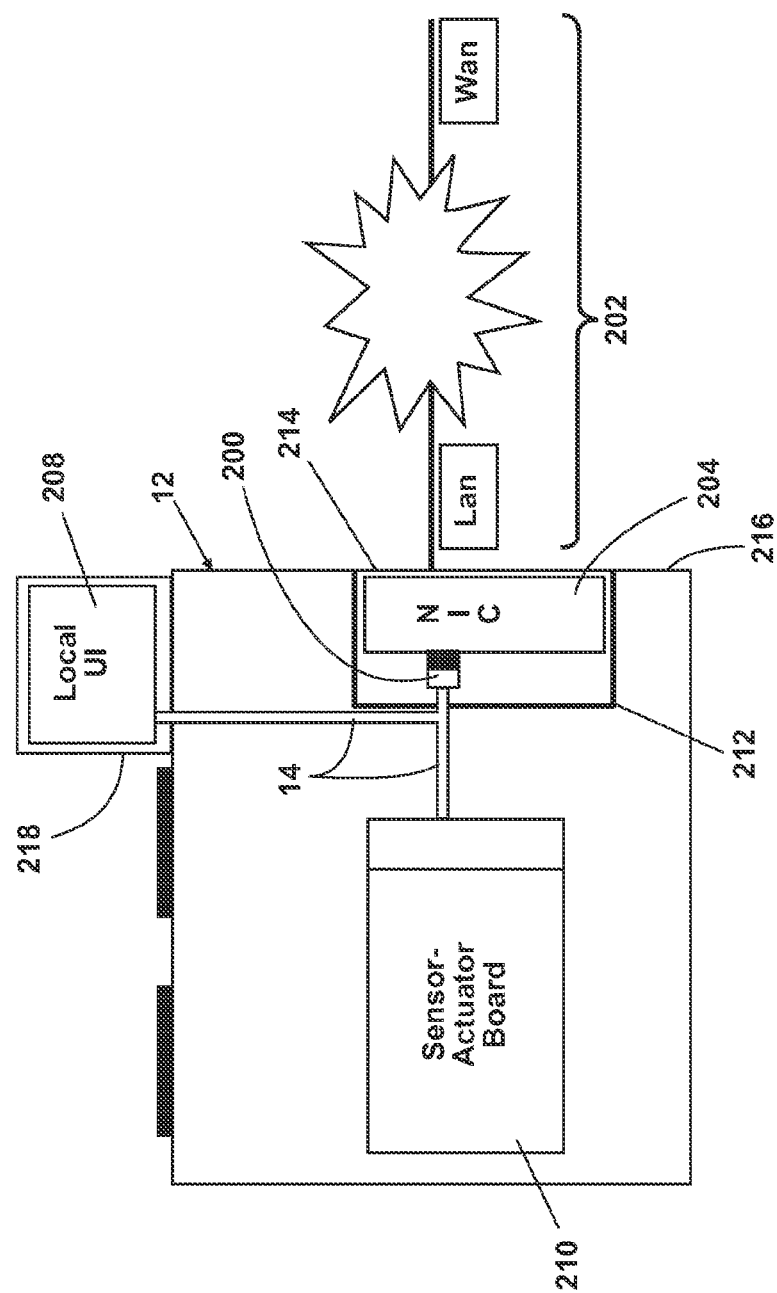
FIG. 18 is a schematic illustration showing mounting of a NIC in a recess formed in a rear side of the appliance.

Referring now to FIG. 18, the household appliance 12, which is shown as an oven for exemplary purposes, having an internal communication bus 200 can be electrically coupled to an external network 202 through a network interface card (NIC) 204 similar to the aforementioned network interface connector 20. A NIC is a well-known device that connects a computer or other client to a network, and any suitable NIC can be utilized with the appliance 12. According to one embodiment of the invention, the NIC 204 is electrically connected to the internal communication bus 200 and adapts an internal communication bus protocol to a standard communication protocol, such as TCP/IP and GSM, so that the appliance 12 can communicate with an external client (not shown) through the external network 202, such as a local area network (LAN) and/or a wide area network (WAN). Thus, the external client can communicate with the software architecture 10 associated with various internal components of the appliance 12 that reside on the internal network 14. For example, the appliance 12 in FIG. 18 is shown as comprising a user interface (UI) 208 and a sensor-actuator board 210, each comprising a printed circuit board (PCB) with the corresponding software architecture 10, and the external client can communicate with the software architectures 10 through the NIC 204.

The NIC 204 can be mounted to the communication bus 200, which is preferably externally exposed, of the appliance 12 through any suitable mounting means, as is well-known in the computer network art. According to one embodiment of the invention, the communication bus 200 is located in a recess 212 defining an opening 214 that is flush with a wall, such as a rear wall 216, of the appliance 12, as shown in FIG. 18. When the communication bus 200 is located within the recess 212, the communication bus 200 and the NIC 204, when mounted to the communication bus 200, are protected from damage that can occur during transport of the appliance 12.

The NIC 204 can be supplied with the appliance 12 at the time of manufacture or can be purchased separately from the appliance 12 as an accessory. Thus, a customer can choose to purchase the appliance 12 without the capability to connect to the external network 202 and upgrade the appliance 12 at a later time to add connectivity, if desired.

Figure 19:
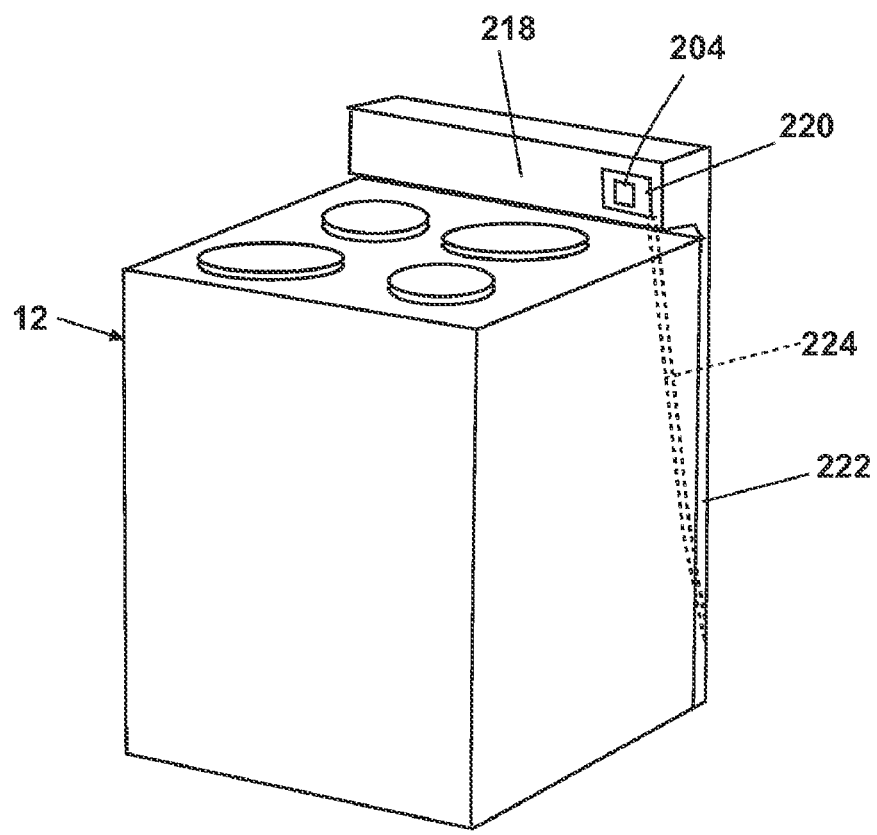
FIG. 19 is a schematic illustration showing mounting of the NIC to a front side of the appliance and a wiring conduit extending from the mounting location of the network interface card to the rear side of the appliance.

The NIC 204 can communicate with the external network 202 through a wired connection or wirelessly. For example, the NIC 204 can communicate with the external network 202 via wireless infrared (IR) communications or other short range wireless means. In such situations, the NIC 204 is preferably mounted to a front side 218 of the appliance 12 to facilitate robust communication. According to one embodiment of the invention, the NIC 204 can be mounted in a recess 220 at the front side 218 of the appliance, as illustrated in FIG. 19 with respect to an oven, for example. When mounted to the front side 218 of the appliance, the NIC 204 can be connected to a rear side 222 of the appliance via wires disposed in a wiring conduit 224 that extends from the mounting recess 220 at the front side 218 to the rear side 222 of the appliance 12, where the wires enter the appliance 12.

Figure 20:
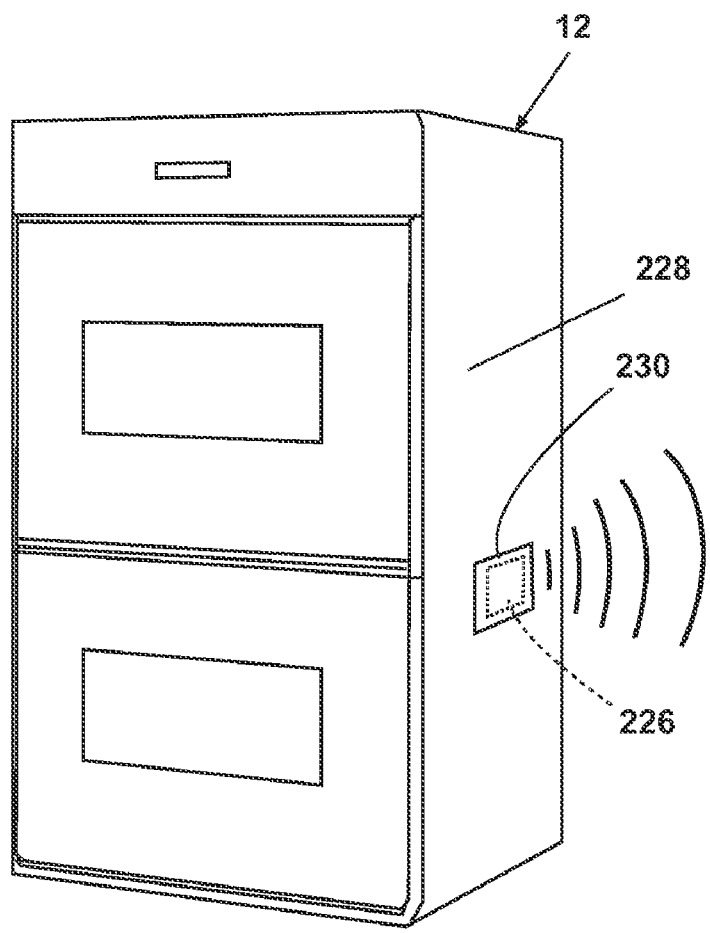
FIG. 20 is a schematic illustration of the appliance comprising a safety barrier that allows communication from an RF PCB located in the appliance and prevents human contact with excessive heat and/or electricity.

Another example of wireless communication is radio frequency (RF) communication. For example, a RF printed circuit board (PCB) 226 can be located inside the appliance 12, which requires connection between the RF PCB 226 and an externally mounted antenna. Alternatively, the RF PCB 226 can be mounted externally of the appliance 12, but this configuration requires an electrical connection between the RF PCB 226 and appliance control electronics, and an installer must open a cabinet or case 228 of the appliance 12 during installation of the RF PCB 226. According to one embodiment of the invention, the RF PCB 226 is mounted within the appliance 12, and a non-metallic safety barrier 230 that is a poor conductor of heat and electricity is provided as part of the appliance case 228. An exemplary safety barrier 230 is a plastic window, such as a Plexiglas window, integrated with the appiance case 228, as shown in FIG. 20 for an appliance 12 in the form of an oven for illustrative purposes. The safety barrier 230 allows for RF communication with the internally mounted RF PCB 226 without an external antenna and prevents human contact with excessive heat or electricity.

Figure 21:
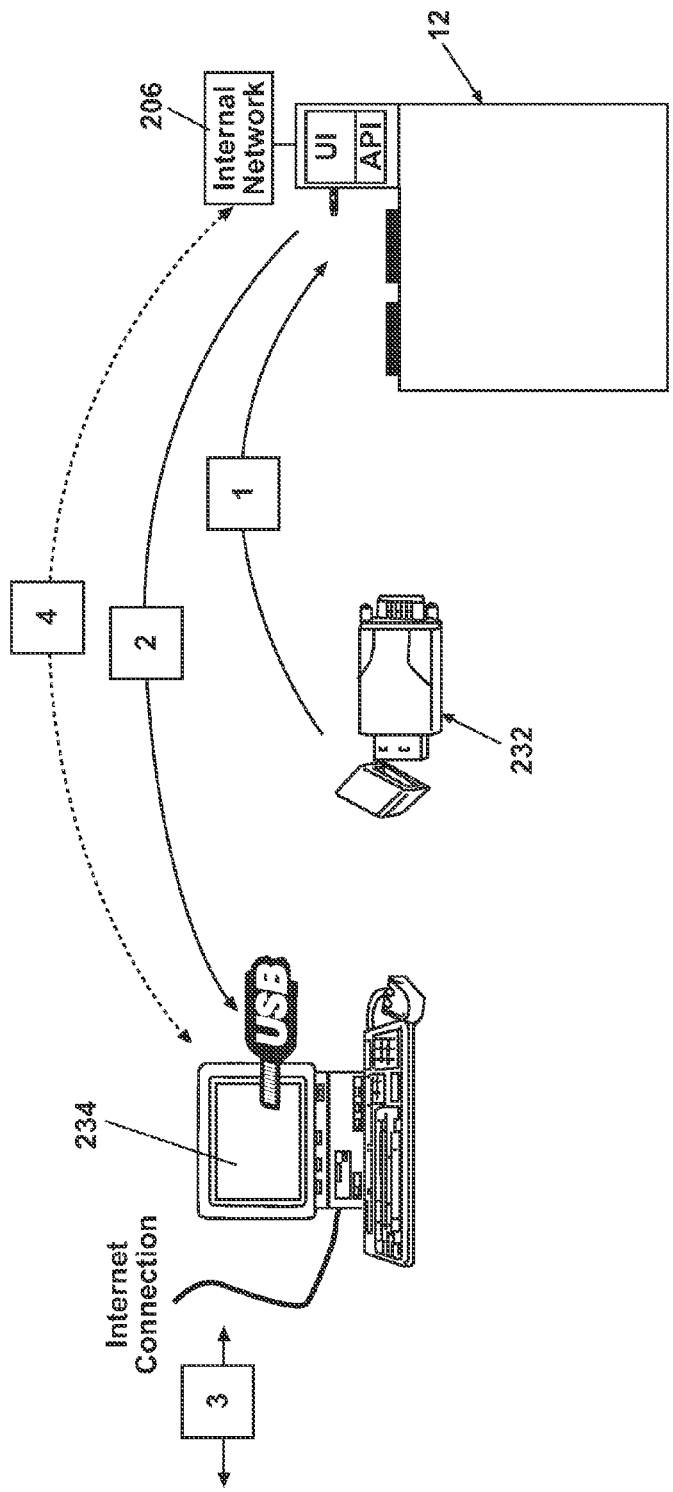
FIG. 21 is a schematic illustration illustrating the use of a service module that obtains diagnostic data from the appliance and uploads the diagnostic data via a personal computer over an external network.

Referring now to FIG. 21, the appliance 12 can be configured with hardware to facilitate service and diagnostics of the appliance 12. In one embodiment, a service module 232 adapted to removably connect with a standard communication bus on the appliance 12 is configured to record diagnostic data, such as by communicating with the software architecture 10 on the internal network 14. The service module can readily connect to the internal network 14. The connection of the service module 232 to the appliance 12 is represented by step 1 in FIG. 21. The service module 232 is then removed from the appliance 12 and connected to a personal computer 234, such as through a USB port or other suitable standard communication bus. The connection of the service module 232 to the computer 234 is represented by step 2 in FIG. 21. After the service module 232 is connected to the computer 234, the service module 232 connects to the Internet, preferably automatically, and uploads the diagnostic data to a remote client (not shown), as indicated by step 3 in FIG. 21. The remote client processes the diagnostic data to identify an appliance problem or failure and potentially prevent a service call or, if the problem or failure requires a service call, to optimize the effectiveness and efficiency of the service call. Optionally, the service module 232 can download customized testing scripts based on the diagnostic data to run tests on the appliance 12 to further diagnose or eliminate the problem or failure. Reconnection of the service module 232 to the appliance 12 to execute the testing scripts is represented by step 4 in FIG. 21.

Figure 21A:
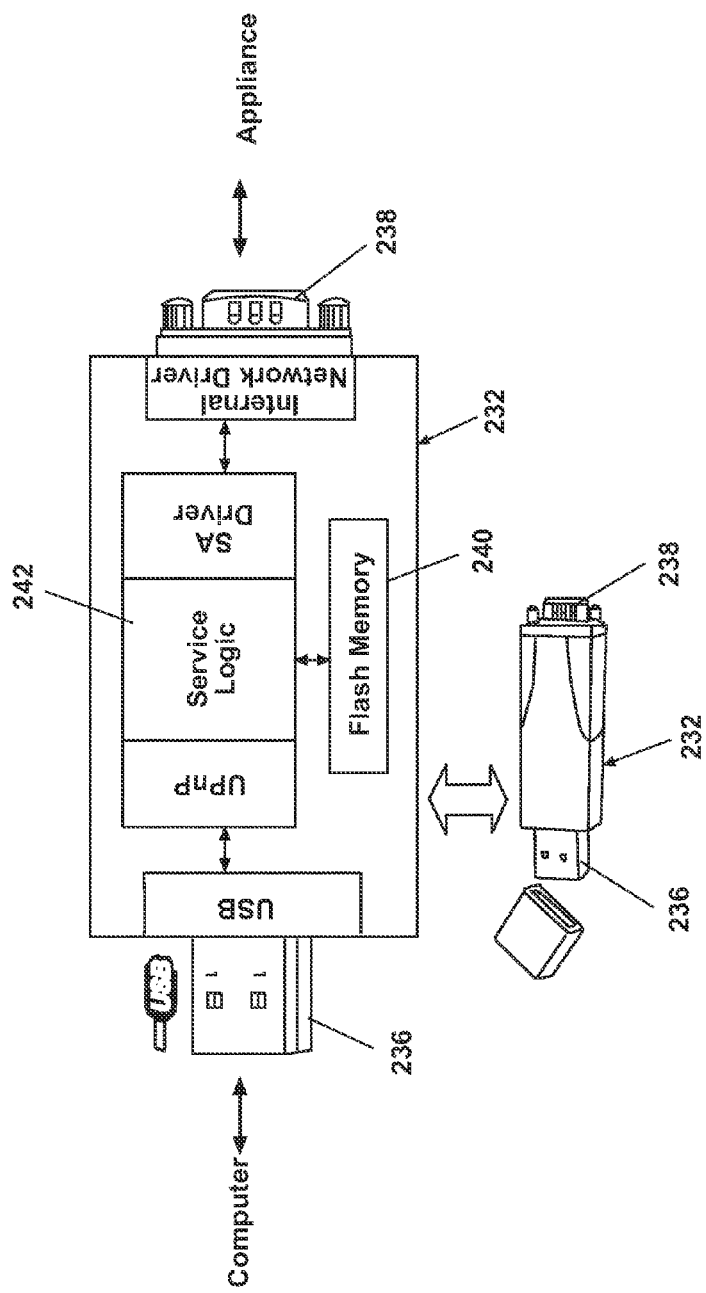
FIG. 21A is a schematic illustration of architecture for the service module of FIG. 21.

An exemplary architecture for the service module 232 is illustrated schematically in FIG. 21A. The service module 232 comprises a pair of communication buses, such as external serial buses. According to the illustrated embodiment, the service module comprises a USB 236 at one end for connection to the personal computer and an RS-232 (EIA-232) bus 238 at an opposite end for connection to the appliance 12 and particularly to the software architecture 10 residing on various nodes of the appliance internal network 14. The service module 232 further comprises memory 240, such as flash memory, for storing the diagnostic data, the testing scripts, and other data. The flash memory 240 communicates with a service logic 242 that controls the operation of the service module 232.

Figure 22:
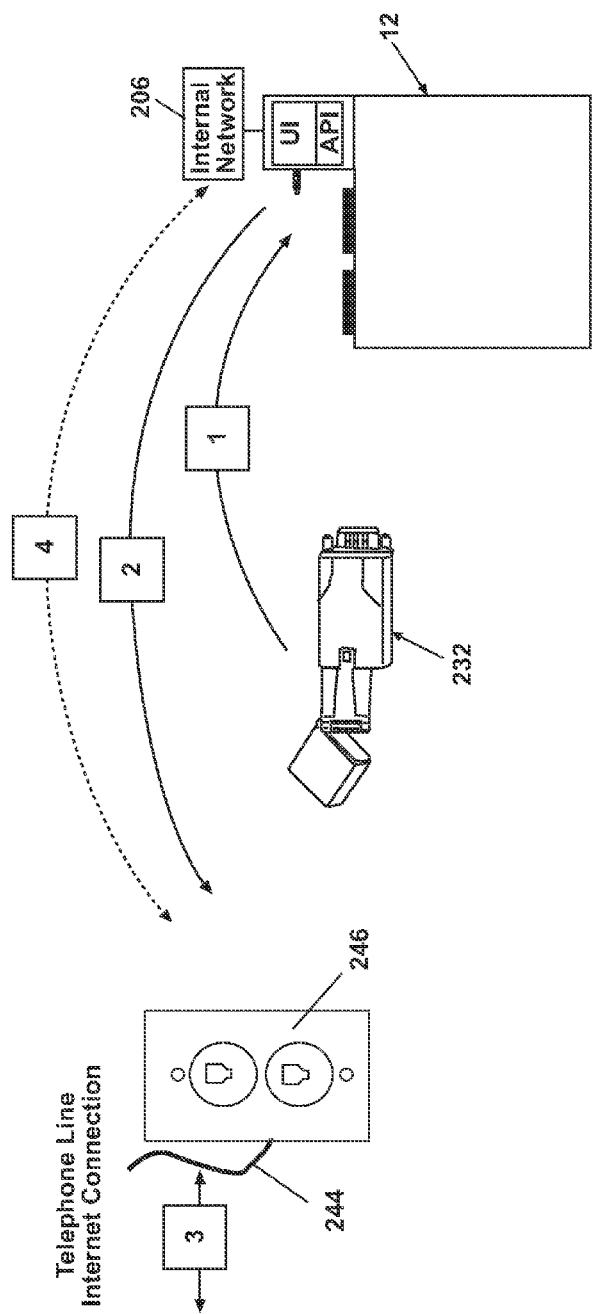
FIG. 22 is a schematic illustration similar to FIG. 21 with the service module uploading the diagnostic data via a telephone line.

FIG. 22 illustrates an alternative hardware architecture for service and diagnostics of the appliance 12. This architecture is similar to that shown in FIG. 21, except that the personal computer 234 is replaced with a telephone line 244, and the service module 232 is adapted for connection to the telephone line 244. Thus, the alternative architecture of FIG. 22 is more suitable for appliance users who do not own a personal computer or do not have a personal computer connected to the Internet. The process for obtaining diagnostic data is the same as described above with respect to FIG. 21; however, rather than connecting the service module 232 to the personal computer 234, the user connects the service module 232 to a standard telephone jack 246, and the service module 232 automatically connects to the Internet through the telephone line 244.

Figure 22A:
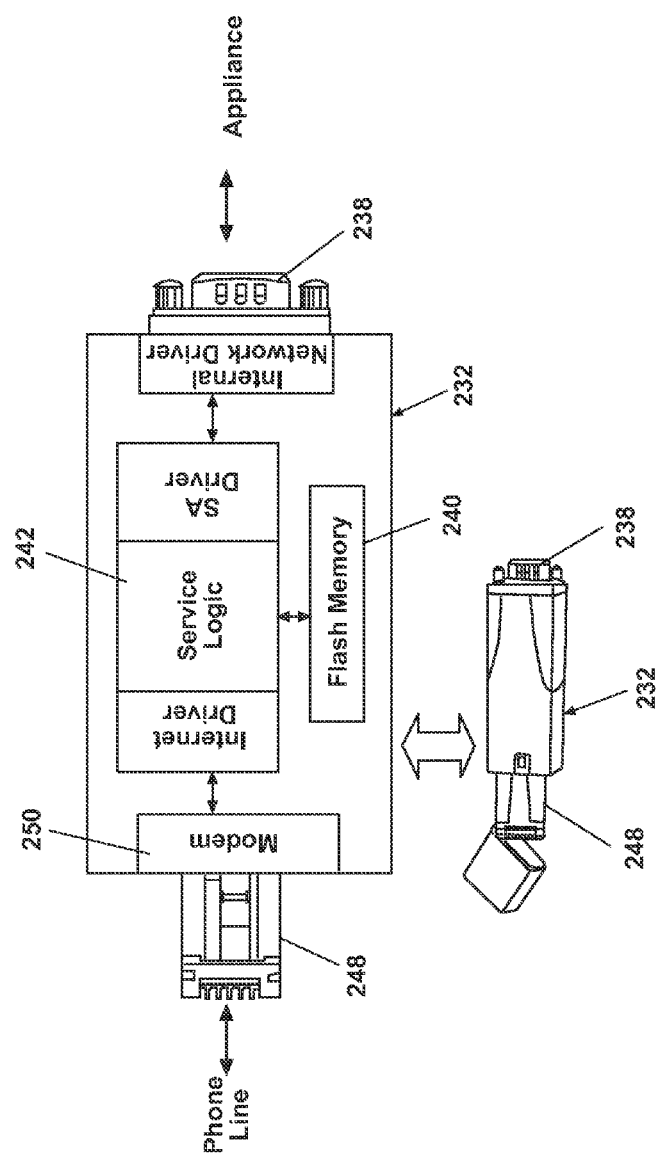
FIG. 22A is a schematic illustration of architecture for the service module of FIG. 22.

Referring now to FIG. 22A, the service module 232 for use with the system shown in FIG. 22 is similar to the service module 232 illustrated in FIG. 21A, except that the USB 236 is replaced with a telephone line plug 248, such as an RJ11 plug, for connecting a modem 250 of the service module 232 with the telephone line 244 to establish a connection to the Internet.

Figure 23:
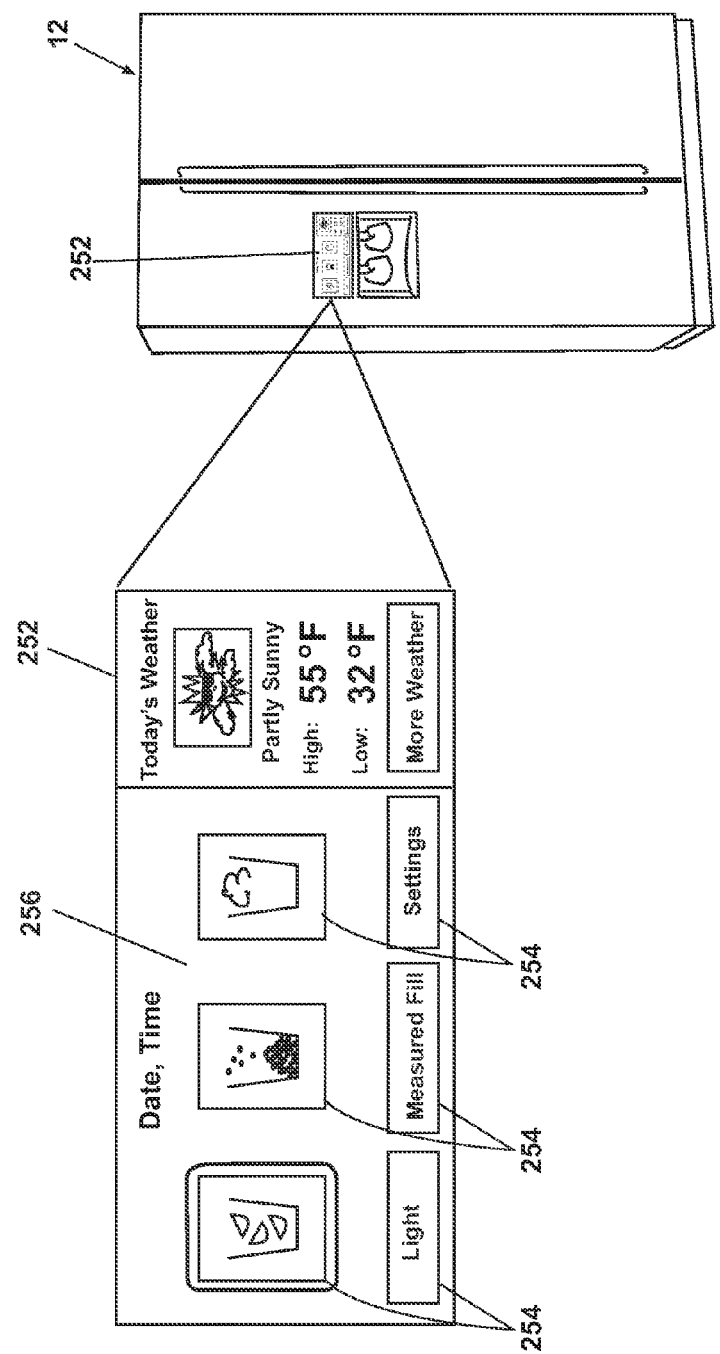
FIG. 23 is a schematic illustration of the appliance in the form of a refrigerator equipped with an exemplary accessory module in the form of a weather station module forming a component with a client SA enabling the weather station module to become operational without manual configuration.

The service modules 232 described above can be supplied with the appliance 12 at the time of manufacture or sold as an accessory during or after the sale of the appliance 12. Other various types of accessory modules can be provided with the appliance 12 or purchased later by a customer for upgrading the appliance 12. An exemplary accessory module can comprise a display operably connectable to the internal network 14 and the external network 202 and visible to the user when mounted to the appliance 12. The display can communicate various data the user, including, but not limited to, data, such as operational status, related to the appliance and obtained via the software architecture 10 on the internal network 14, or information downloaded from the Internet through the external network 202. An exemplary accessory module is a weather station module 252, which is shown in FIG. 23 as mounted to an appliance 12 in the form of a refrigerator for illustrative purposes. In addition to displaying weather-related information or other information that can be downloaded from the external network 202, the display of the weather station module 252 can also include one or more touch pads or a touch screen 256 with selector areas 254 for controlling various operations of the refrigerator, such as for controlling an ice dispenser and a light, and for accessing settings, such as temperature, of the refrigerator.

FIG. 24 illustrates the preferred packet structure for a fragmented message. Such a packet structure is preferably used for communication when the message payload is larger than that of the underlying protocol. This fragmentation packet structure was previously described in the discussed concerning multi-payload message integrity; however, as brief summary can be listed here. In a fragmented message, the standard packet structure described in FIG. 4 is preferably used in the first fragment. All subsequent fragments preferably use the packet structure described in FIG. 24. The difference between these protocols is in Byte 2.

For the entirety of a fragmented message, the Frag flag should bet set. The MFP flag (more fragments pending) should be set until the final fragment of the fragmented message. MID (message id) gives each fragmented message (the group of fragments) a handle or id, preventing merging of separate fragmented message. FID (fragment id) gives each fragment of a fragmented message a handle or id, allowing the detection of a lost fragment. A more in-depth explanation can be found in the discussion on multi-payload message integrity.

FIG. 25 provides example operations of the fragmentation protocol discussed given in FIG. 24. Explanation of this protocol can be found in the multi-payload message integrity section.

Figure 26A:
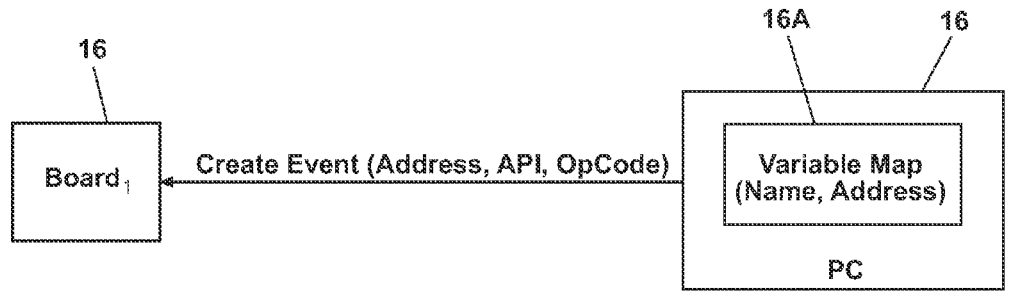
FIG. 26A is a schematic illustration of the location of variable map information at a central location, such as the main controller PC board, which is then communicated to the boards of the other components.
Figure 26B:
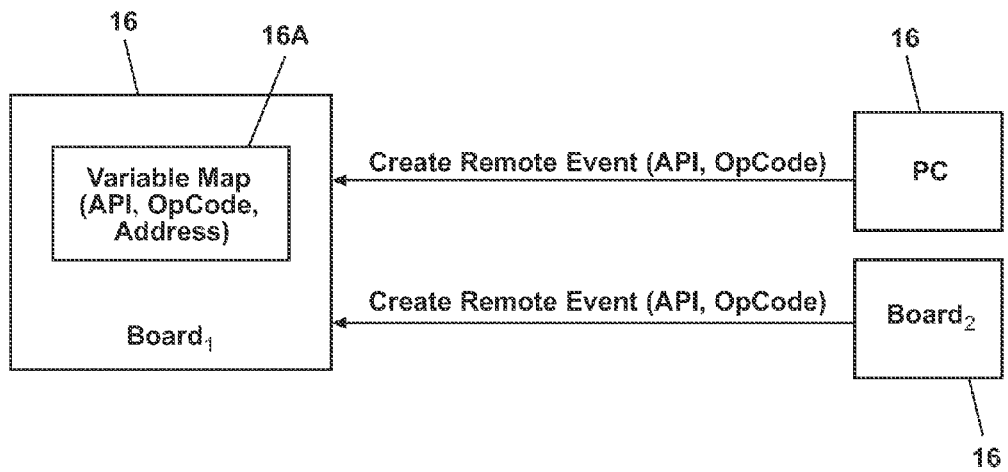
FIG. 26B is a schematic illustration of the location of variable map information on the controller of the component, which is collected from the other components on the network.
Figure 27:
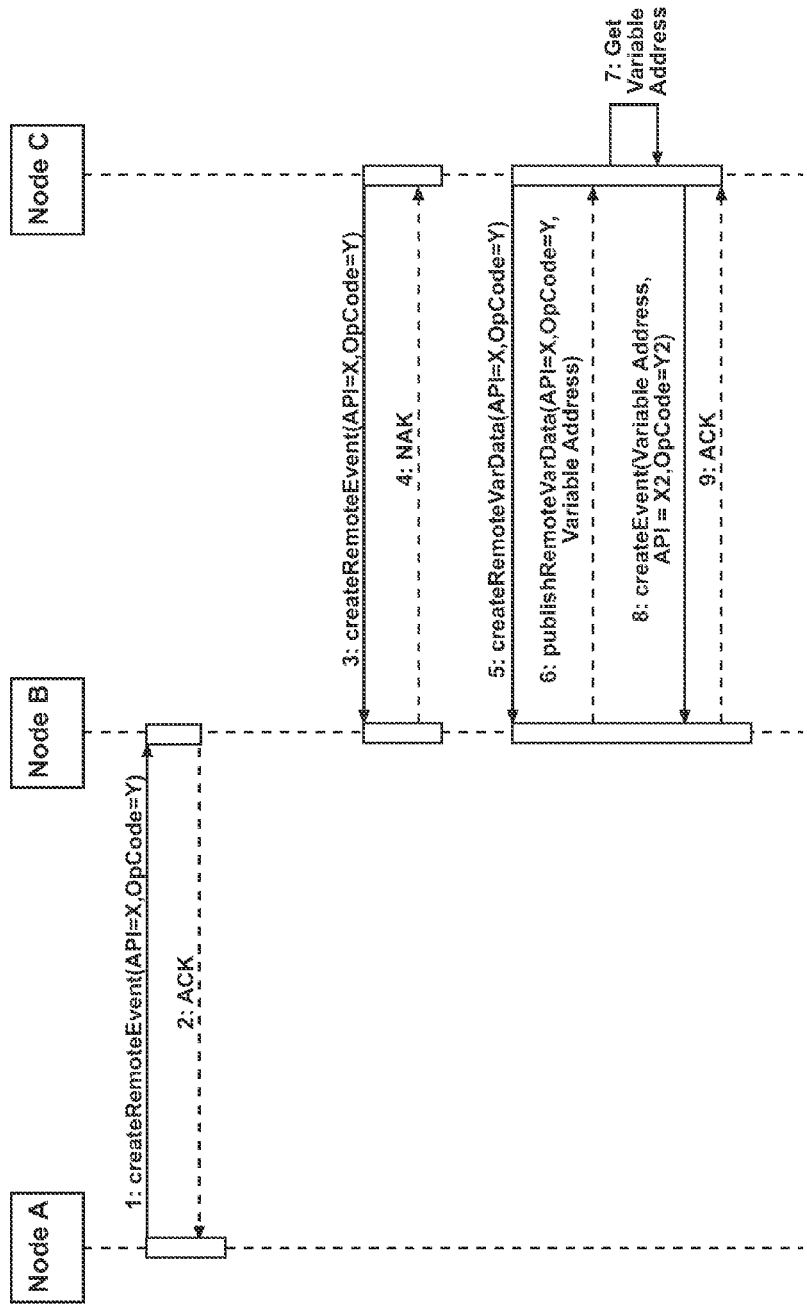
FIG. 27 is a UML Sequence Diagram showing a messaging scenario where a duplicate event request is assigned a variable address to permit both requests to reside in the network.

FIGS. 26A and 26B represent alternate architectures for locating the address and Identifier information such that well formed messages can be constructed and sent to the software architecture of FIG. 10 resulting in event creation within the DAQ 30 of FIG. 5. As previously mentioned, the DAQ engine 30 requires a variable's memory address for event registration. FIG. 26A illustrates an example of using the client-configured data acquisition scheme in which the client (computer or other client) holds a current memory map that relates a variable's name to its memory location. This memory address, in addition to the Identifier (API Id and Op Code), is used to construct a well formed message which is sent to the DAQ resulting in DAQ event creation. FIG. 26B illustrates an example of using the client-configured data acquisition scheme in which the client (i.e. another control board) does not know the memory address's of desired event variables. In this case, the client can utilize the embedded variable map functionality of the invention. Thus, the client must only provide an API and Op Code and is not required to include the memory address of the variable in the well formed message to be sent to the DAQ. Because, in this case, the software of the DAQ performs the additional task of acquiring the memory location of the variable specified by the Identifier. Once acquired, the DAQ uses the same function calls referenced in the previous case of FIG. 26A to create the event structures in the DAQ's array of event structures contained in the DAQs memory heap.

Variable map information in FIG. 26A relates variable symbolic names to their address in the memory of 16A. FIG. 26B relates variable Identifiers (API Id and Op Code) to their address in the memory of 16. The rational for the alternate architectures is that these support both interactions with a human actor who might find it advantageous to work in symbolic names (which tend to be meaningful and communicate will the usefulness of the variable) and interactions with other instances of the software architecture 10 or some component 16 or 22 or some other software component which is able to interact with the software architecture 10. In software based interactions (non-human interactions) it is advantageous not to use symbolic names as they require more memory to store, more bandwidth to transmit, and more computational cycles to process. Instead, numeric identifiers can be substituted for symbolic names. The software architecture 10 uses the numeric identifier API ID and Op Codes as numeric substitutes for symbolic names. Additional numeric identification is available for any valid occurrence of API Id. Where the former numeric identification is sufficient to provide a unique index per component 16 residing on the network 14 and where the latter, the additional identification information can be obtained using a secondary query requiring a component of the former numeric identification, API Id. Then together, API Id and the additional numeric identification (the latter) provides identification unique within the totality of possible software components able to be represented within the software architecture 10.

FIG. 27 provides an example of use of the client-configured data acquisition scheme using the embedded variable map. Here, Node A registers for an event on Node B using the publicly know API X and Op Code Y that links to the desired event variable. Next, Node C attempts to register for the same event using API X and Op Code Y. Because the API and Op Code pair have previously been registered by Node A, Node C's request is rejected. However, Node C then requests data from the remote (embedded) variable map with the get Remote Variable Data command. Node B responds with information, including the desired variable's memory address. Node C then uses this memory address to register for an event, but this time with a different API and Op Code pair.

FIG. 27 can also be thought of as disclosing two message scenarios relating to the event creation suggested in FIG. 26B. The first scenario describes the Messaging between Nodes A and B both of which communicate via internal communication network 14 and which is compatible with software architecture 10. In the first scenario, Node B is able to comply with the request from Node A. The second scenario describes the Messaging between Nodes C and B both of which communicate via internal communication network 14 and are compatible with software architecture 10. In this scenario, Node B cannot comply with the request from Node C because the API Id and Op Code in message 3 has already been allocated by a previous request. In this case, Node B responds appropriately resulting in a query (5) from Node C resulting in a network message (6) from Node B containing the necessary information allowing Node C to re-create the same NVOEvent memory structure of FIG. 33 with an API Id and OP Code unique to the DynamicMemoryHeap of FIG. 33 of Node B's software architecture 10.

Figure 28:
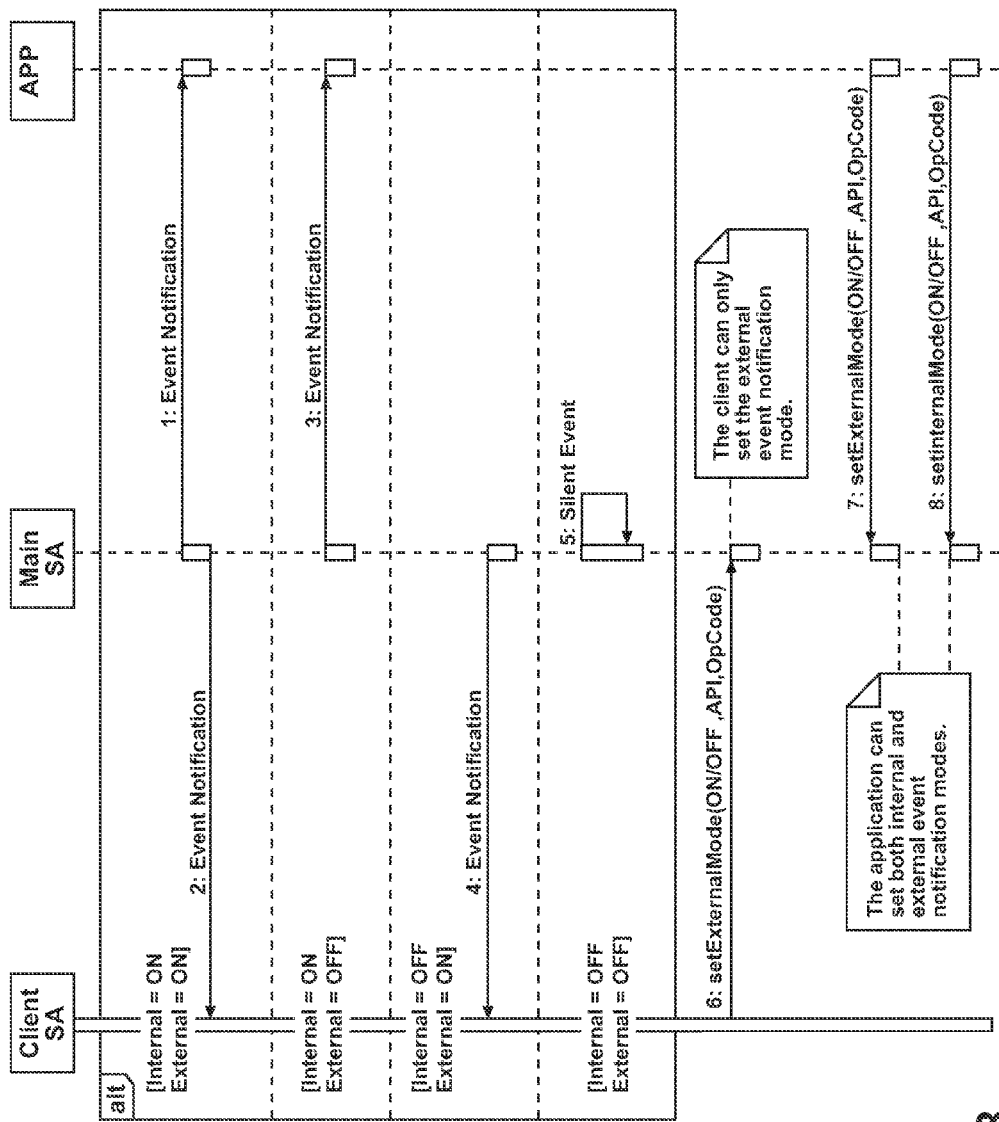
FIG. 28 is a UML sequence diagram of a standard format illustrating the disabling and re-enabling of the realization event requests.

FIG. 28 illustrates the configurable event notification functionality provided by this invention. Preferably, events would only notify external clients when triggered by default. However, it may be desired that this external notification be "muted" at some times without actually removing the event from the DAQ engine 30. Additionally, it may be desired that the internal application within the software architecture 10 be notified when an event occurs. Thus, this invention provides such functionality. As previously discussed, external notification can be altered using the Set External Event On/Off command within the DAQ API. Additionally, the software architecture 10 preferably provides an internal function to turn internal notification on and off. FIG. 28 shows examples of event notifications under the possible configurations.

In this way, the invention has the ability to disable and re-enable the realization of the NVOEvents of FIG. 33 onto the internal communication network 14. In addition, the ability to disable and re-enable the realization of the NVOEvents of FIG. 33 as internal messages sent to software component 16B within the same software operating environment 16A of the software architecture 10.

FIG. 29 illustrates the functionality of an acknowledged event within this invention. In an acknowledged event, the software architecture waits a pre-determined time for an acknowledgement message from the client until processing the next event. If the pre-determined time expires, a pre-determined number of retries are executed. Preferably, all events are assumed to be unacknowledged by default. Thus, after sending an event to the client(s), the DAQ engine 30 immediately processes the next event. However, some applications require that events be acknowledged to insure that the message was received by the event requester. Using this technique, the sender can resend the event if the acknowledgment is not received. The acknowledgment confirms that the requester has received the event. The advantage to the preferred embodiment of providing the option for acknowledged events is that it is the requester who determines the necessity of the acknowledgement according to the application requirements. Therefore, when the requester creates the event using the mechanisms provided by the software architecture 10 within the interface to the DAQ 30, information is included in the message 28A which provides a further classification of the event as acknowledged or unacknowledged. As shown in the example in FIG. 29, upon occurrence of an acknowledged event the software architecture blocks all other event while waiting for an acknowledgment from the client. If no acknowledgement is received, the software architecture 10 will re-send the event after a configurable amount of time. This retry sequence will occur a configurable amount of times, until finally the software architecture stops attempting to send the event and notifies the application through a callback function of failure.

Figure 30:
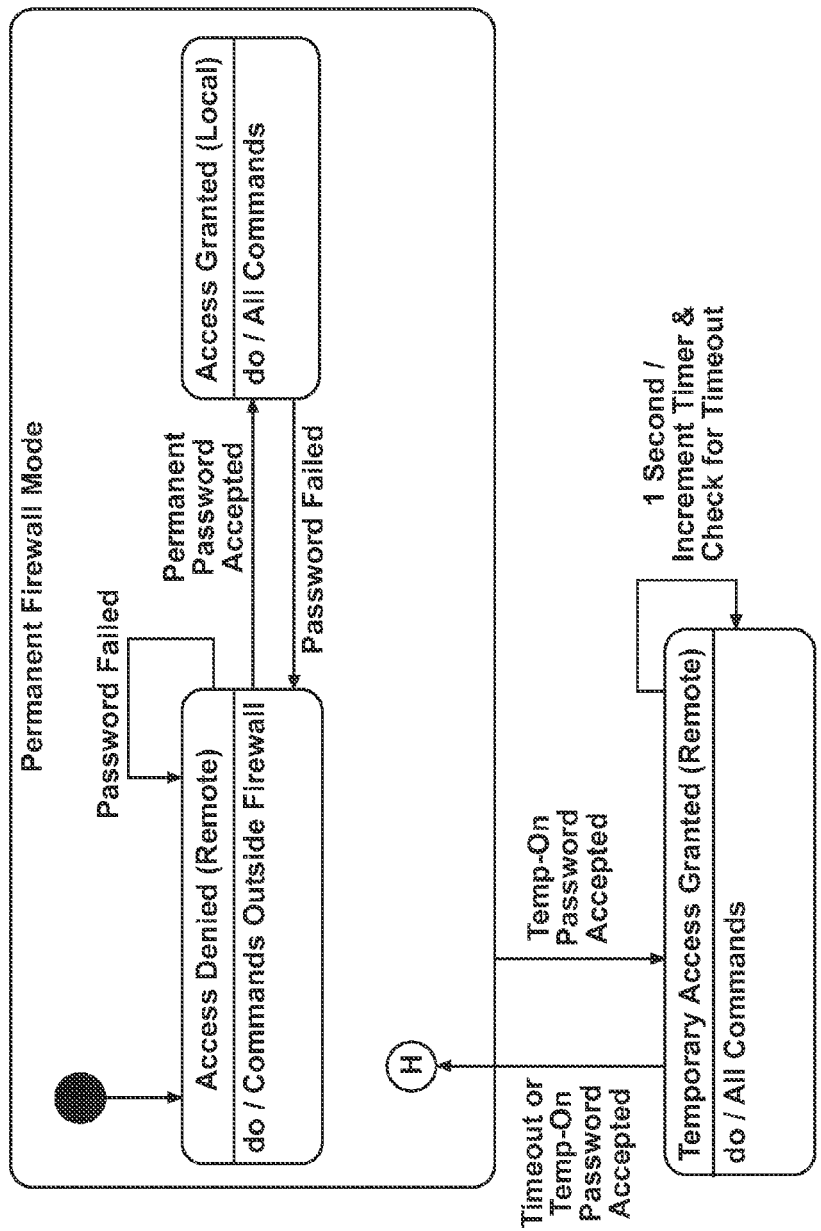
FIG. 30 is a UML state diagram of a standard format illustrating the security modes and firewall provided by this invention.

FIG. 30 illustrates the security features provided within this invention. Because the execution of critical functions by external nodes is possible through the previously described protocols, this invention provides a firewall mechanism to restrict access to command execution. Commands that are deemed safety critical can be listed in a table, preferably in the file SAVariableMap.h, before compilation. Commands can be listed specifically (with an API and Op Code) or as entire APIs (with an specific API and an Op Code=0xFF). The commands listed in this table are claimed to be behind the firewall. As shown in FIG. 30, invention provides three levels of security access: Access Denied, Access Granted, and Temporary Access Granted.

Preferably, all nodes start with an access level of Access Denied by default. In this access level, the node is only allowed to execute the commands in front of the firewall. Thus commands behind the firewall (or listed in the firewall table) are not allowed to be executed. Upon successful submission of a permanent password (within the payload of the Publish Node feedback message), a node is promoted to the Access Granted security level. In this access level, the node is allowed to execute all commands, in front of and behind the firewall. For temporary access behind the firewall, a node can successfully submit a temporary access password (within the payload of the Publish Node feedback message). In this access level, the node is given access to all commands, in front of and behind the firewall, for a configurable amount of time. After this time has expired, the node's access level is reverted to its previous state.

Specifically, FIG. 30 contemplates two passwords each representing a security level recognized by the logic of the command firewall. A password will be transmitted by a component or client when the message of the DAQ API, publish SA Node is broadcast. (see bytes 3 and 4 or Op Code 2). One of the passwords represents permanent access to all special commands that are considered to be behind the firewall. The second password will grant temporary access to all special commands that are considered to be behind the firewall. Without a password, clients will have access to all commands which are considered to be in front of the firewall. The engineer responsible for the installation of the software architecture 10 onto a component 16 of the household appliance 12 will determine which commands are in front of and which commands are behind the firewall of FIG. 30.

Figure 31:
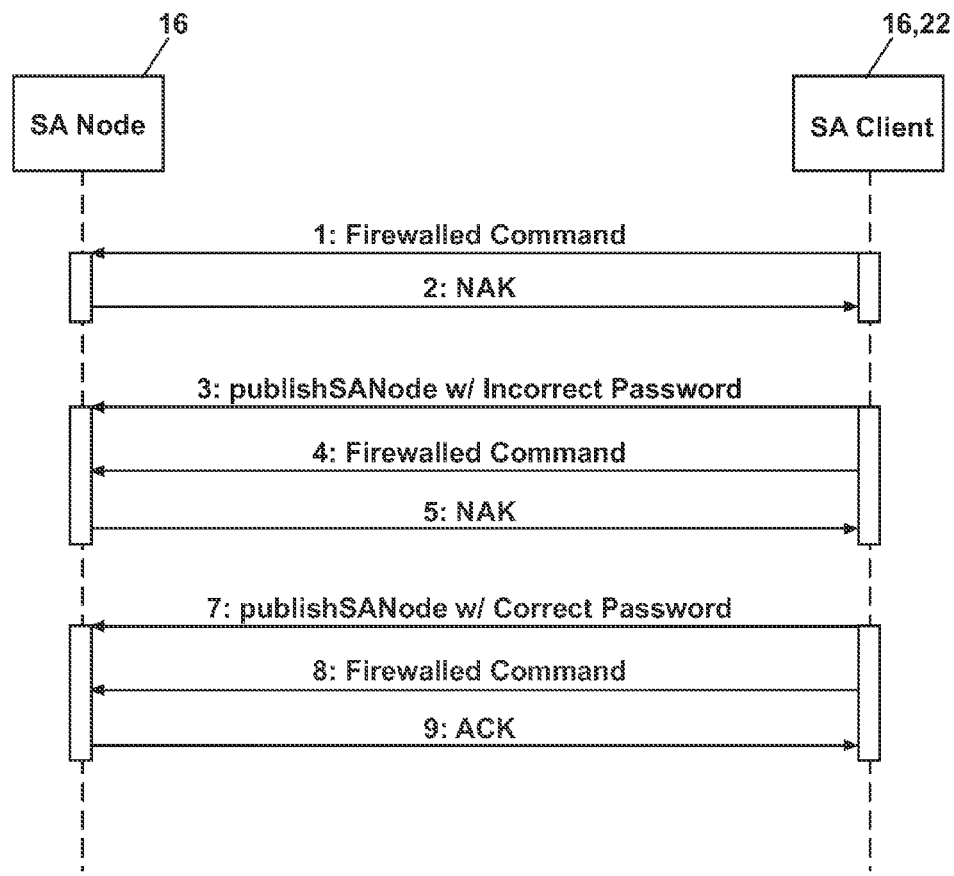
FIG. 31 is a UML sequence diagram illustrating the methods of interaction between a client which must negotiate with the firewall of FIG. 30 before application messaging can be fully processed.

FIG. 31 illustrates an example of operation of the firewall security provided by this invention and shown in FIG. 30. By default, a node does not have access to commands behind the firewall. Thus, as shown, if a node without access attempts to execute a firewalled command, it will be rejected. After an incorrect password submission, the firewalled command will still be rejected. Only after a successful password submission is the node allowed to execute the firewalled command.

Figure 32:
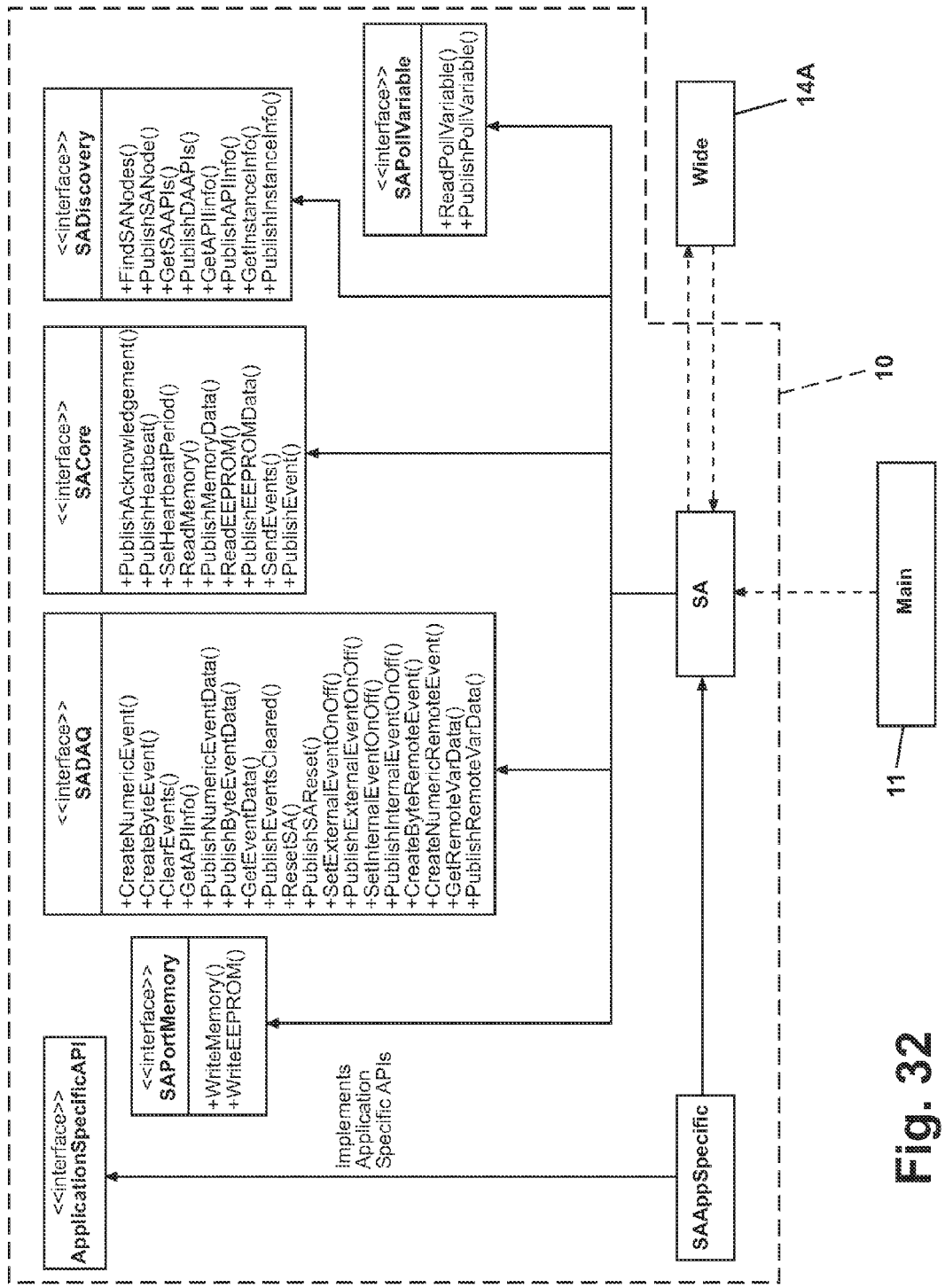
FIG. 32 is a UML class diagram illustrating the standard public interfaces which the SA is able to implement.

FIG. 32 illustrates the standard public interfaces which the software architecture 10 is able to implement. Shown is the ApplicationSpecificAPI which is further populated with useful functionality by the designer according to the needs of the application. Also shown is an example of associations with other software components of the software operating environment with which the software architecture 10 would interact.

FIG. 33 illustrates the preferred implementation of the software architecture 10. Shown are the internal functions and memory allocations needed to perform and support the functionality implied by FIG. 32. Also shown are helper classes (Command Handler, Dynamic Memory Heap, Update Handler, NVOEvent, TimeHandler, WIDECommHandler, MessageParser, and AppSpecificCommandHandler) which show the functional grouping of the internal functions and memory allocations needed. Also shown are the associations between the helper classes.

FIG. 34 shows the preferred organization of source code files of the software architecture 10.

Figure 35:
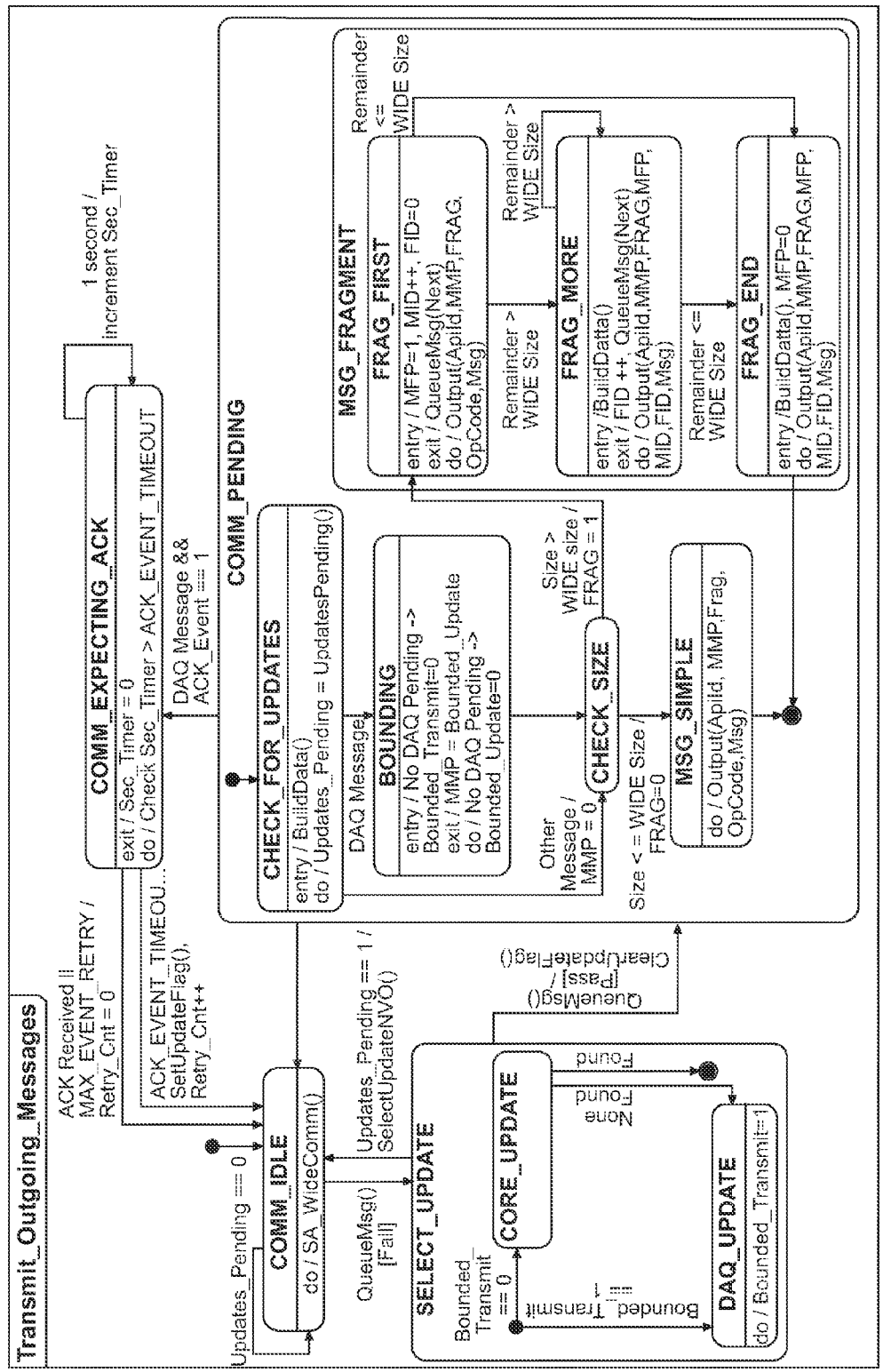
FIG. 35 shows a collection of inter-related UML state diagrams illustrating 3 primary states (COMM_IDLE, COMM_EXPECTING_ACK, and COMM_PENDING), each of which possibly having a plurality of sub-states.

FIG. 35 shows a collection of inter-related state diagrams for three primary states (COMM_IDLE, COMM_EXPECTING_ACK, and COMM_PENDING), with each state possibly having a plurality of sub-states, and so on. The functionality represented here is related to the collaboration associations shown in FIG. 33. Its invocation is also referenced in FIG. 11 as one of the standard interface functions invoked from the MAIN execution loop of the software operating system onto the software architecture 10.

The MAIN function of the software operating environment a6A (shown in FIG. 33 and in FIG. 11) invokes on SA_WideComm( ) shown in the SA class definition (where SA and its aggregate functionality is the Software Architecture 10). The result of the function invocation, is shown in FIG. 35. As shown in FIG. 11, MAIN invokes on SA_WideComm( ) periodically within the software operating systems execution.

FIG. 35 shows a $2^{nd}$ indirect interaction with MAIN which is a result of MAIN invoking on the WIDE function WIDE_EXEC ( ). This collaboration is shown in FIG. 11 and in FIG. 35. In this case, WIDE software operating layer 14A within the WIDE_EXEC( ) function invocation calls WIDE.BuildData( ) which in turn calls SA.WideCommHandler.SA_BuildData( ) within 52. In FIG. 35, this invocation is shown within the COMM_PENDING state. This path of execution occurs when, in the previous state of COMM_IDLE, the logic within the sub-states of COMM_IDLE result in a pending outbound message for the WIDE network 14. As shown in FIG. 33, this state transition is realized by the invocation of the function WIDE.QueueMessage( ). This invocation, results in the invocation of the logic contained within the COMM_PENDING state of FIG. 35.

The COMM_EXPECTING_ACK state of FIG. 35 is a result of an outbound event having been initially created with a special indicator denoting acknowledgment required. If the event (also referred to as update) which is being operated on within the COMM_PENDING state requires acknowledgment, the state transition from COMM_PENDING will be to COMM_EXPECTING_ACK. In this case, the event will be re-sent, by re-entering the COMM_PENDING state if a time out has expired without receipt of the expected Acknowledgment message. This process will be repeated until either an Acknowledgement is received or until the configurable retry parameter (MAX_EVENT_RETRY which is incremented each time the event is re-transmitted) is exceeded.

FIG. 36 shows a collection of inter-related UML state diagrams. Shown are four primary states (READY, TRANSMIT SNAPSHOT, UPDATES_BLOCKED, and PROCESS_DAQ_EVENTS). The functionality represented here, is related to the collaboration associations shown in FIG. 33. Its invocation is also referenced in FIG. 11 as one of the standard interface functions invoked from the MAIN execution loop 11 of the software operating environment onto the software architecture 10.

The purpose of the functionality represented by FIG. 36 is to evaluate the structures (NVOEvent) 31 of FIG. 33 determining if the conditions for event transmission have occurred, collecting those, and setting the appropriate flags (Updates_Pending & Bounded Update) so that when the State Machines of 35 are executing, events conditions detected by the DAQ 30 are realized as WIDE Packets 24 onto the WIDE bus 14.

Figure 37:
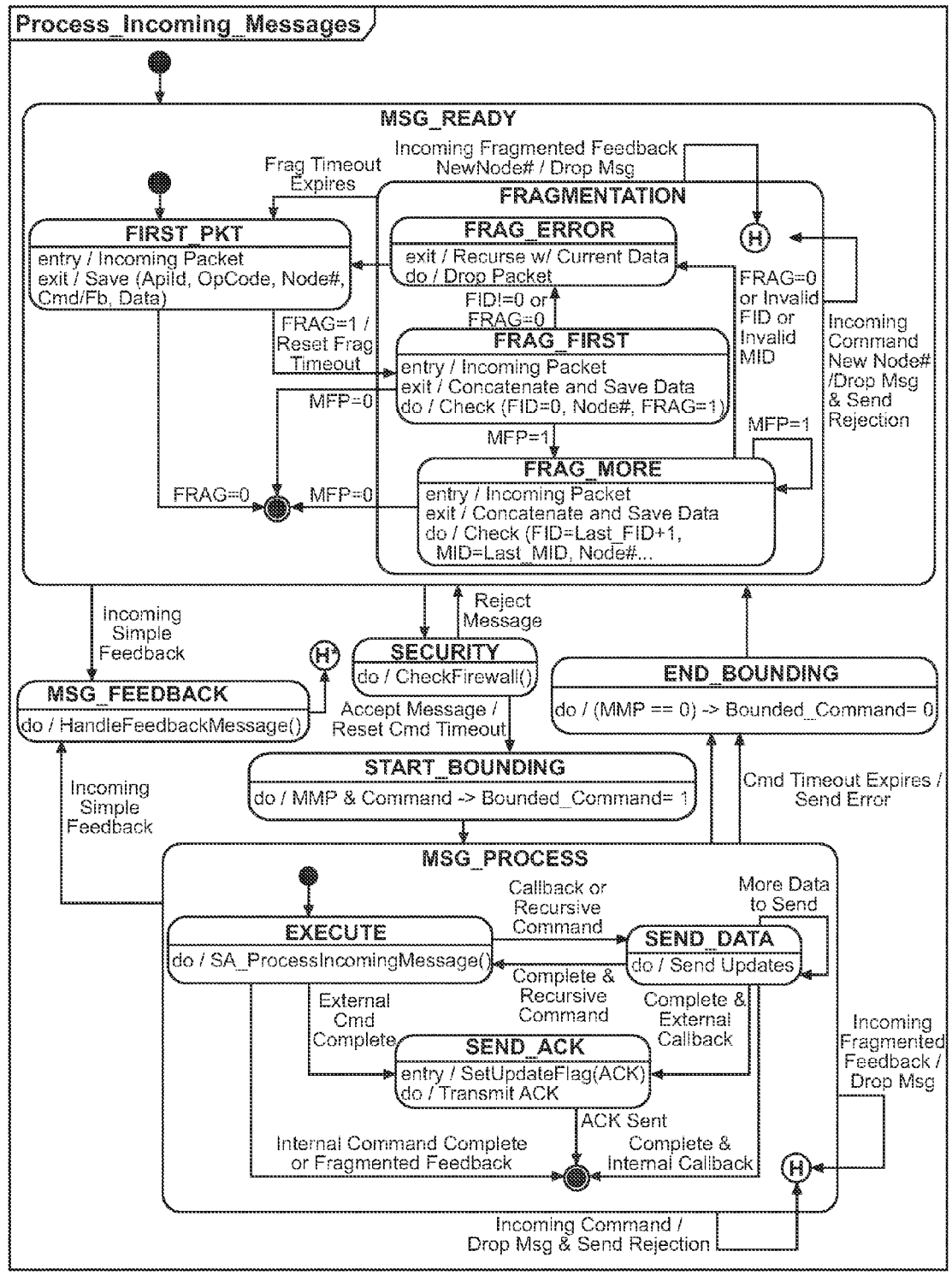
FIG. 37 shows a collection of inter-related UML state diagrams illustrating 2 primary states (MSG_READY and MSG_PROCESS).

FIG. 37 shows two primary states (MSG_READY and MSG_PROCESS). The functionality represented here is related to the collaboration associations shown in FIG. 33 where WIDE calls SA.WideCommHandler.SA.AcceptData ( ). Invocation into these state machines are also referenced in FIG. 11 as functions invoked from the MAIN execution loop 11 of the software operating system onto the software architecture 10 where MAIN calls SA.SA_ProcessIncomingEvents( ). These inter-related state machines govern the execution of incoming commands, responses to requests, and the handling of events.

Figure 38:
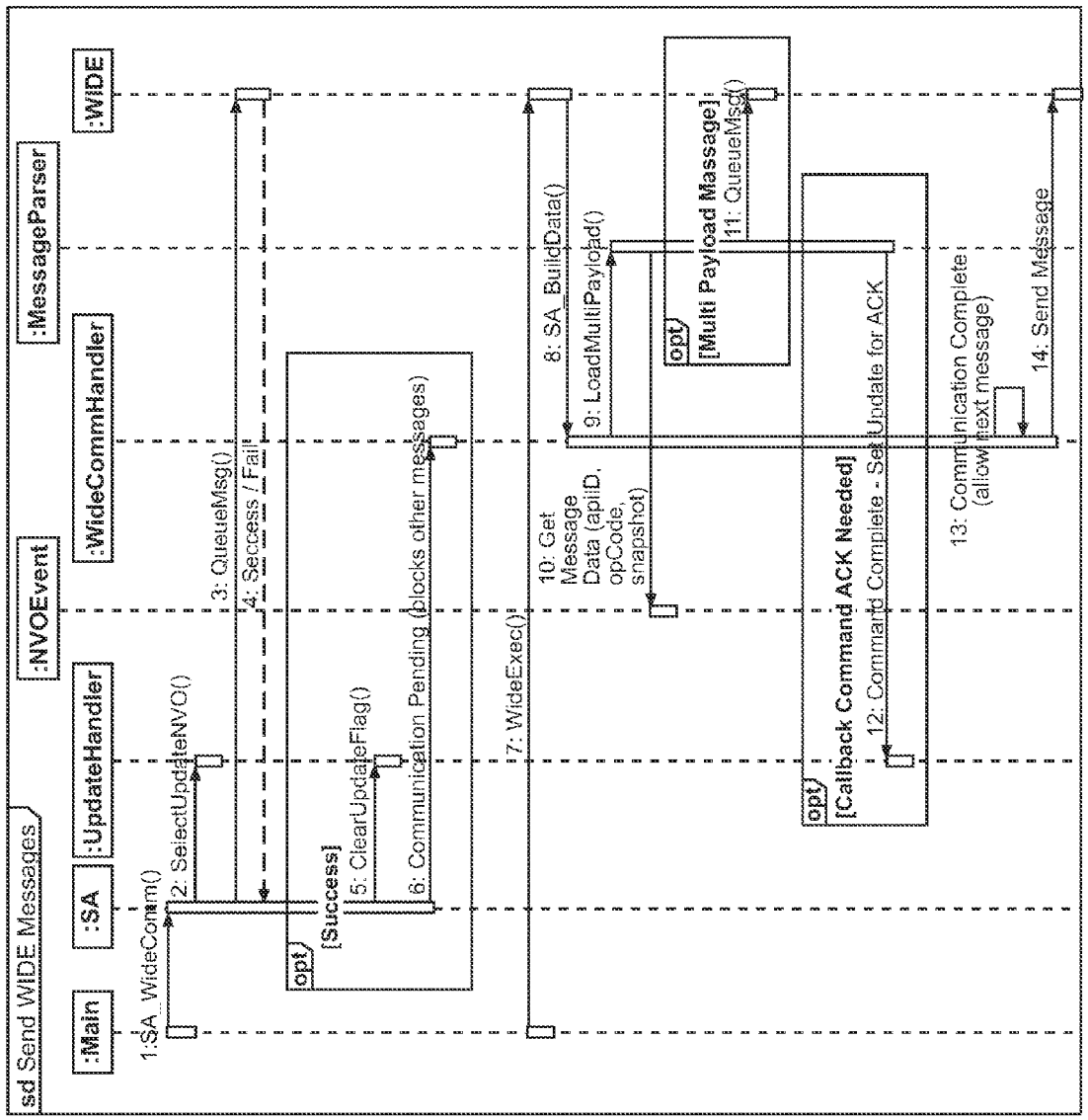
FIG. 38 is a UML sequence diagram illustrating the execution of an ordered collection of internal messages between components for the purpose of producing a network message on the internal network from the SA.

FIG. 38 shows the execution of an ordered collection of messages of the classes in FIG. 33 of the software operating environment. These messages represent the execution path for a common set of logic referenced as 'Send WIDE Message' in FIGS. 39, 40, 41, and 42. The invocation from MAIN and WIDE (via WIDE_EXEC( )) are shown in FIG. 11.

Figure 39:
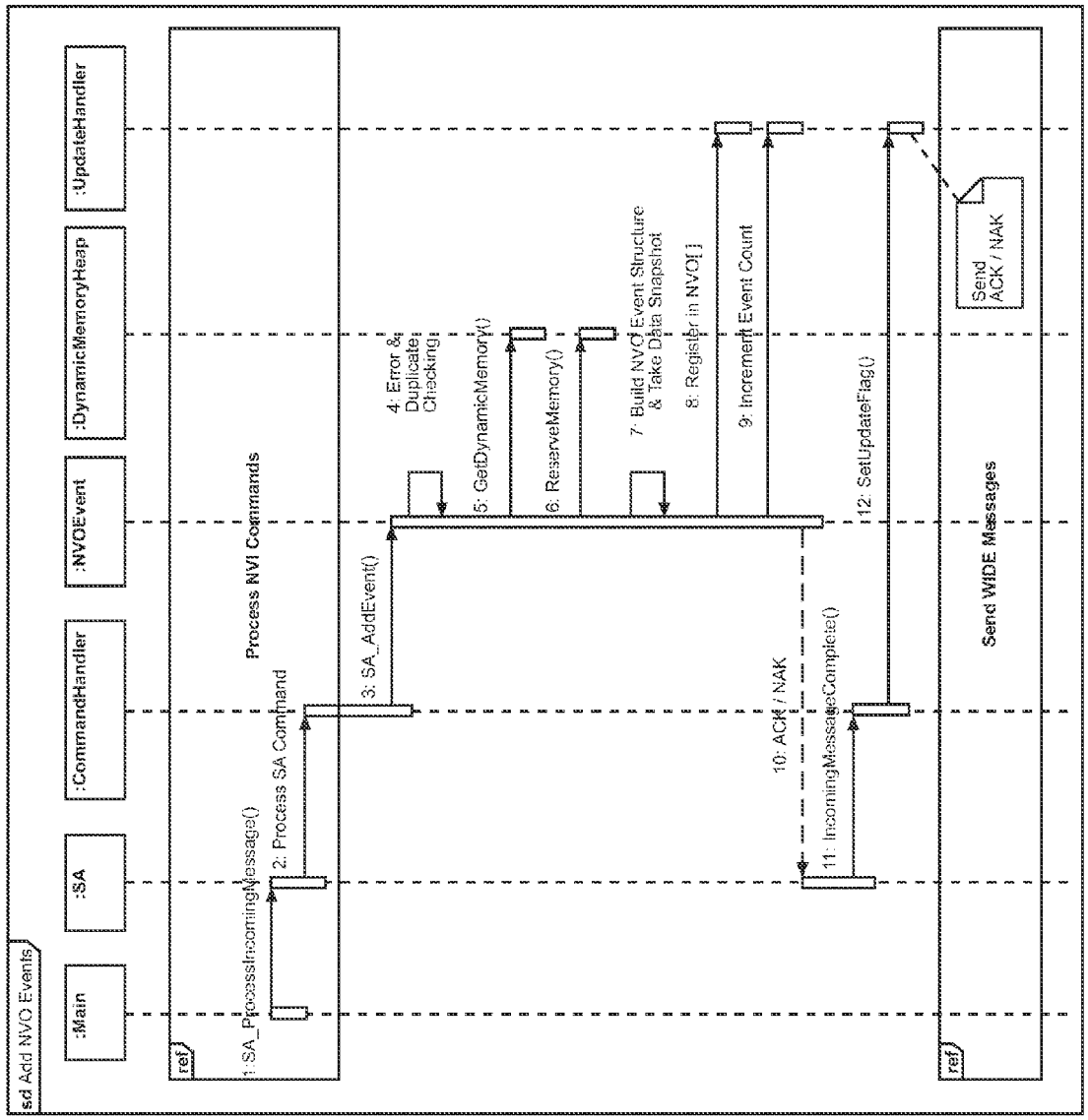
FIG. 39 is a UML sequence diagram illustrating the execution of an ordered collection of messages of the classes in FIG. 33 of the software operating environment.

FIG. 39 shows the execution of an ordered collection of messages of the classes in FIG. 33 of the software operating environment. These messages represent an interaction within a software operating environment containing the software architecture 10. The invocation from MAIN is shown in FIG. 11. The diagram illustrates the messaging required to add a well formed NVOEvent memory structure to the DynamicMemoryHeap.

Figure 40:
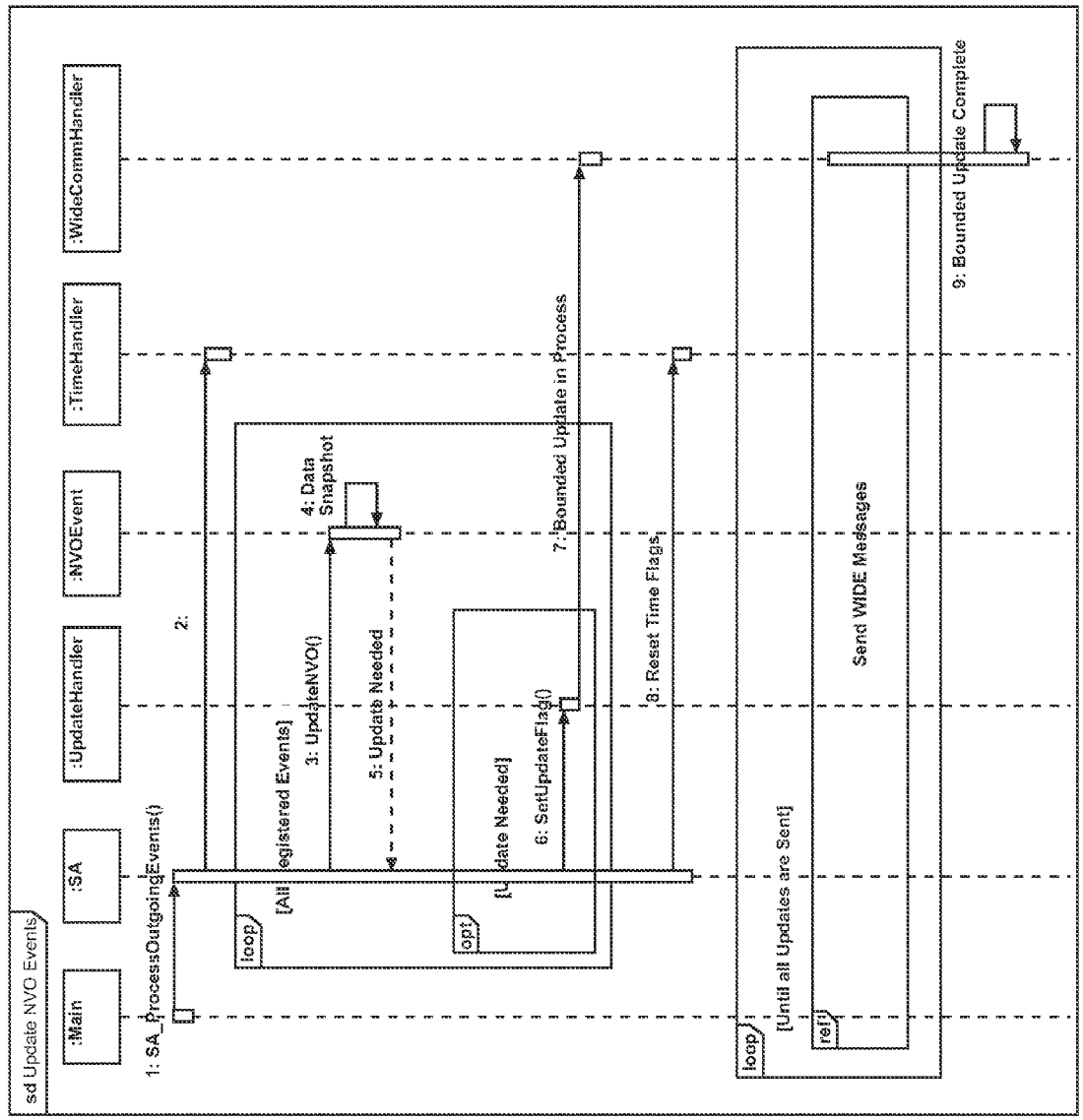
FIG. 40 is a UML sequence diagram showing an ordered collection of messages of the classes in FIG. 33 of the software operating environment.

FIG. 40 shows an ordered collection of messages of the classes in FIG. 33 of the software operating environment. These messages represent an interaction within a software operating environment containing the software architecture 10. The diagram illustrates the message execution of FIG. 37. And the invocation from MAIN is shown in FIG. 11. The purpose of the functionality represented by the diagram is to evaluate the NVOEvent memory structures contained within the DynamicMemoryHeap, collect those and their appropriate data values whose event triggering criteria have been met, and to insure a realization of packets 24 onto the internal communication network 14 for the purposes of notifying other clients 16/22 of the NVOEvents which have met there trigger criteria and the associated data values.

Figure 41:
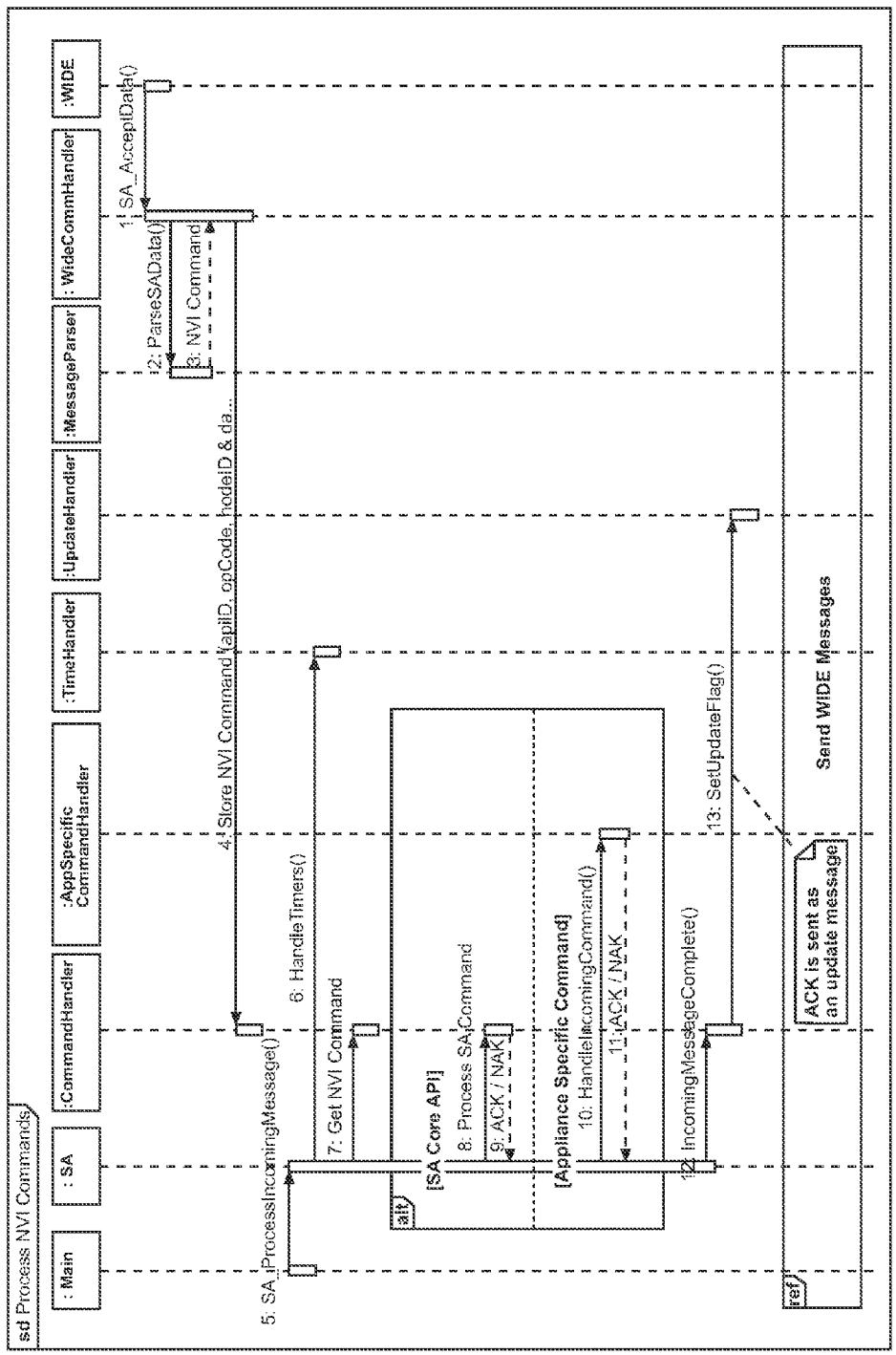
FIG. 41 is a UML sequence diagram illustrating the messaging required to process incoming messages from the WIDE bus 14 from clients 22/16 which do not require a response containing meaningful data other than a response transmitting the success or the reason for failure of the incoming message (the ACK or NAK of API ID=1, Op Code=1).
Figure 42:
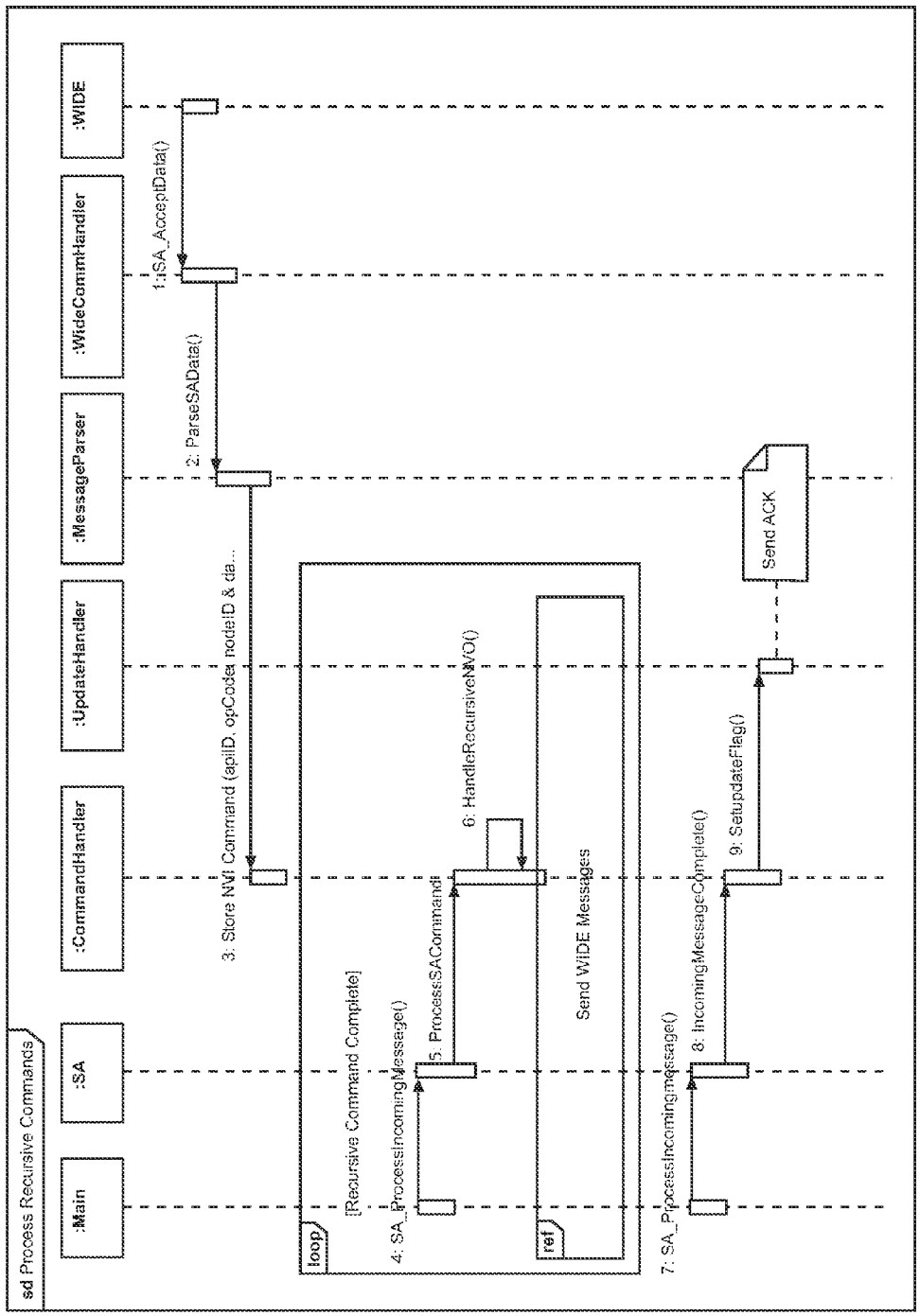
FIG. 42 is a UML sequence diagram illustrating the messaging required to process incoming messages from the WIDE bus 14 from clients 22/16 which require a plurality of response messages containing meaningful data in addition to a response which transmits the success or the reason for failure of the incoming message (the ACK or NAK of API ID=1, Op Code=1).
Figure 43:
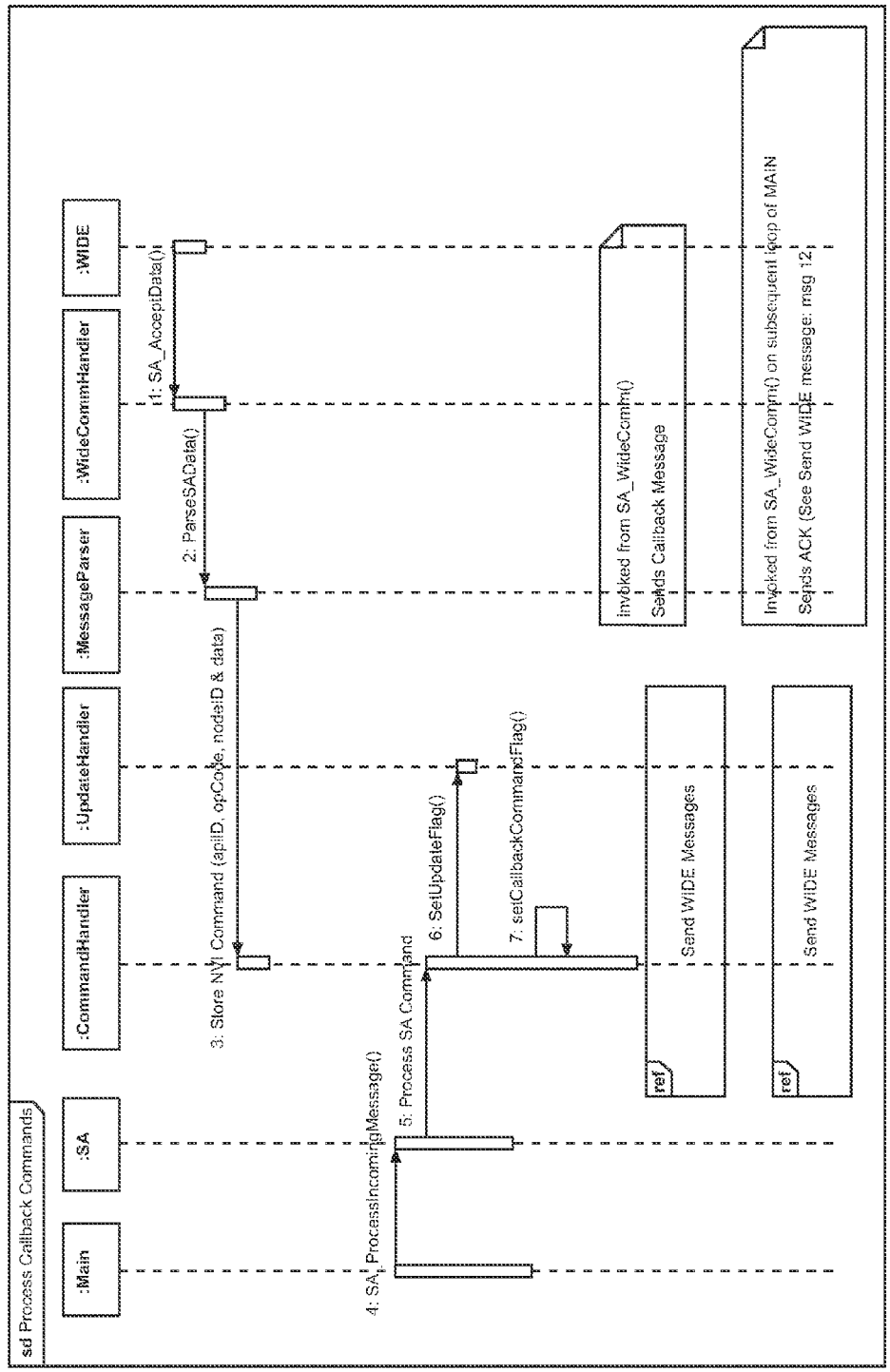
FIG. 43 is a UML sequence diagram illustrating the messaging required to process incoming messages from the WIDE bus 14 from clients 22/16 which require a single response messages containing meaningful data in addition to a response which transmits the success or the reason for failure of the incoming message (the ACK or NAK of API ID=1, Op Code=1).

FIGS. 41, 42, and 43 show an ordered collection of messages of the classes in FIG. 33 of the software operating environment for the purpose of processing incoming commands (NVOs) from the Network 14. These messages represent an interaction within a software operating environment containing the software architecture 10. The invocations from MAIN and WIDE (via WIDE_EXEC( )) are shown in FIG. 11. The figures, described individually in subsequent paragraphs, represent 3 cases of alternate paths for execution.

FIG. 41 illustrates the messaging required to process incoming messages from the internal communications network 14 from clients 22/16 which do not require a response [Command-NoReponse] containing meaningful data other than a response transmitting the success or the reason for failure of the incoming message (the ACK or NAK of API ID=1, Op Code=1).

FIG. 42 illustrates the messaging required to process incoming messages from the WIDE bus 14 from clients 22/16 which require a plurality of response messages [Command-MultipleResponseRequired] containing meaningful data in addition to a response which transmits the success or the reason for failure of the incoming message (the ACK or NAK of API ID=1, Op Code=1).

FIG. 43 illustrates the messaging required to process incoming messages from the internal communication network 14 from clients 22/16 which require a single response messages[Command-SingleResponseRequired] containing meaningful data in addition to a response which transmits the success or the reason for failure of the incoming message (the ACK or NAK of API ID=1, Op Code=1).

Taxonomy Control

A typical prior art approach to using a new controlling device to control an appliance is to have the software component of the new controlling device duplicate the logic of the appliance controller so that the new controlling device does not inadvertently request the software component of the appliance controller to perform an operation of which it is incapable. This prior art approach further requires communications between the appliance and the new controlling device regarding the current state of the appliance. This prior art approach is inefficient since it requires duplication of logic on the new controlling device and the appliance controller. Furthermore, this prior art approach requires that new software must be written each time appliance controller is introduced to the new controlling device.

The purpose of a control taxonomy is to avoid requiring this duplication of software logic (often called business logic) between two interacting software components in a controlling device and a controlled appliance. In particular this permits a command generator in a controlling device to readily control an appliance without any information about the appliance being controlled except the control taxonomy itself. This can enable the introduction of a "generic" controlling device to control new appliances, adapting control devices to newly available cycles or functionalities which have been added to an appliance, and switching appliances between modes of operation where different operating cycles or functionalities are available. It also makes control of appliances easier for users since they need only be presented with choices which are currently available from the appliance.

The present invention uses a structured taxonomy dataset to efficiently communicate to the controlling device just that information which the controlling device needs in order to generate a well formed command for the appliance. As used herein, a well formed command is a command which has meaning and is performable by the appliance. The information conveyed by the dataset includes a hierarchy of options and data inputs required to form the well formed command. In the preferred embodiment, it also includes semantic or contextual information to communicate in word or iconic form the available options so that a user can understand the available choices and enter the appropriate data. This is preferably accomplished by labels within the dataset that are associated with arbitrary or non-user friendly identification elements. This allows the logic of the software componentry which must interpret and process the Taxonomy to be decoupled from the presentation of the Taxonomy on a user interface. (ex. Foreign language, Labels, Units).

Figure 44:
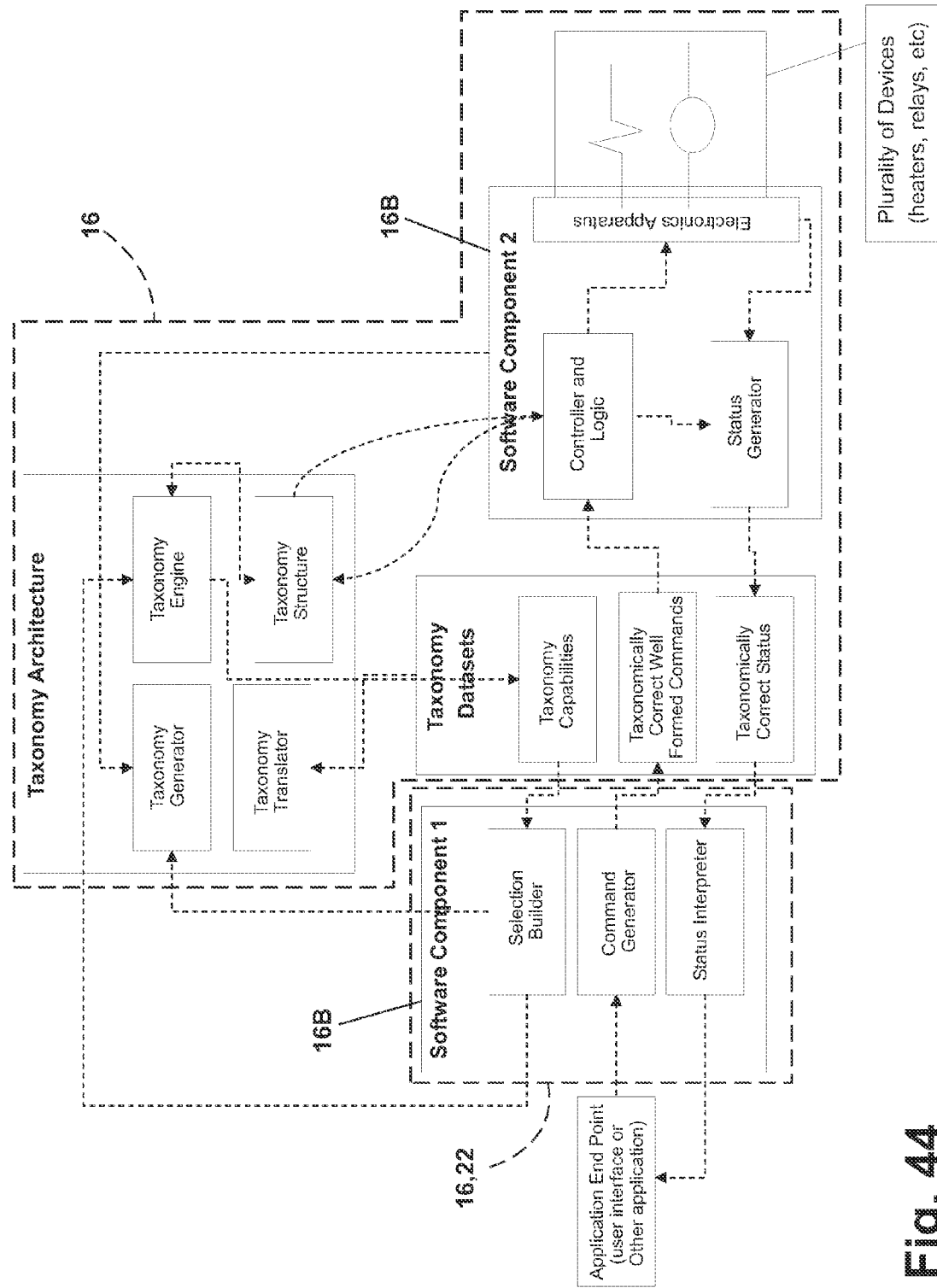
FIG. 44 schematically illustrates a taxonomy control using a taxonomy dataset to control the operation of one or more components within the appliance without direct knowledge of the functions for the component.

Referring to the FIG. 44, generally, illustrating the improved control structure and method of the present invention, the appliance 12 being controlled has a software component 216B having a appliance controller and status generator. The controlling device 16, 22 used to control the appliance has a software component 116B with a command generator, a selection builder and a status interpreter. The controlling device 16, 22 may be a programmable user interface such as a pda, web tablet, a cell phone, an LCD attached to the appliance or a client device.

The taxonomy architecture, shown disposed in the appliance controller 16 and logic, may alternatively be disposed in a remote location, such as in a controlling device or on the internet. The taxonomy architecture includes a taxonomy generator, a taxonomy engine, a taxonomy translator and a taxonomy structure. The taxonomy architecture generates a taxonomy dataset defining taxonomy capabilities facilitating: the creation, by the software component 1, of well formed commands that can be transformed by the taxonomy engine and optionally the taxonomy translator into other well formed commands to be executed by software component 2; the creation, by the software component 1, of the user interface content; and the validation of status information before presenting to the user interface. Each of these components and their interrelationships are described in greater detail below.

Creation of the Taxonomy Dataset

The taxonomy dataset is derived from the operational capabilities of the appliance controller 16 structured in a manner to allow the command generator in the software component 1 to interpret the dataset to accomplish several results. More particularly, from time to time the taxonomy engine uses the taxonomy structure and the state aware information to generate a taxonomy dataset reflective of the subset of the universe of options for commands that would be available from an appliance to those that are currently available from the appliance.

For example, the taxonomy dataset describes the available functions supported by a software component 16B, each functions argument, and the valid values of each argument in a data structure. In addition, taxonomy dataset defines the valid values of feedback variables. Since this in a data structure, it can be transmitted and re-transmitted to clients 16 or 22 as required. Changes to taxonomy dataset occur as the cycles of operation progress and the available commands or the valid values of their arguments change. Moreover, additional commands may become available or may become invalid as the cycle of operation progresses from Idle (see FIG. 7).

More particularly, the selection builder registers with the Taxonomy Manager to receive notifications for new Taxonomy Engines. In response, the Taxonomy Manager passes references to all known Taxonomy Engines back to the selection builder. The selection builder then requests from each Taxonomy Engine a Taxonomy Capabilities Data Set. The Taxonomy Engine evaluates a Taxonomy Structure comprised by the Controller Logic of Software Component 2 or alternatively a Document to generate a Taxonomy Capabilities Dataset. The selection builder then populates a set of psuedo command structures, which are a hierarchy of options, appropriate for an Application End Point (Examples of Application End Points are user interfaces for control or service or other intermediate application layers like an energy controller or home automation mode like vacation or goodnight.) and passes those structures to the Application End Point allowing the Application End Point to be configured. Alternatively, the selection builder may directly configure the application end point.

Communication and Use of the Dataset.

When a controlling device is networked with the appliance, the taxonomy manager establishes a relationship between the software component 1 and the taxonomy architecture allowing the command generator to query for the existence of taxonomy datasets, providing the software architecture 1 access to a taxonomy dataset, and allowing the command generator and status interpreter to subscribe to taxonomy dataset updates. The Taxonomy Translator is an optional component that translates the Taxonomy datasets between Software Components 1 and 2, if Software Components 1 and 2 are not designed to be interoperable with the same embodiment of the Taxonomy dataset.

The taxonomy dataset is communicated to the controller of software component 2 and to the selection builder of software component 1. Optionally, the taxonomy translator translates the taxonomy dataset to a different schematic definition of the command generator.

The command generator uses the taxonomy dataset to construct and populate a set commands structures available for selection by a user interface or other client applications comprising a set of valid commands, their valid arguments, and each arguments valid values. More particularly, the command generator uses the taxonomy dataset to construct one or more well formed commands which can then be transmitted to the controller. Since the taxonomy dataset can be reset and sent at different times by the taxonomy engine, or the dataset can be updated by revisions from the taxonomy engine, the Software Component 1 can have a current set of command structures then available for selection by a user interface or other client application.

Thus, in essence, through use of the Taxonomy architecture, the software component 2 or its proxy (the taxonomy engine) communicates to software component 1 a rule set that can be interpreted by software component 1 so that software component 1 does not request something of software component 2 which software component 2 cannot accommodate and does not operate on a state variable which is set to an invalid value.

Before the Application End Point is able to commence execution, it will request or register for status updates with a Status Interpreter. This will allow the Application End Point to be populated with valid state variables from the Status Generator before logic is executed and before user interface componentry is rendered. The Status Interpreter will process Taxonomically correct status datasets and validate those datasets against the Taxonomy Capabilities Data Set. The Status Interpreter request or register for status updates from the Status Generator of Software Component 2 via the Taxonomy Engine. Upon receipt of a Taxonomically correct status, the Status Interpreter will provide new status values to the Application end point.

The Application End Point executes resulting in a rendering of the current status of software component 2 and a rendering of selectable pseudo command structures. Each time a selection is made from the pseudo command structure, the selection builder populates a set of valid sub-commands found in the Taxonomy Capabilities dataset appropriate for the selection for further selection by the application end point. When a complete selection is made, a structure containing all pseudo commands are passed to the command generator.

The command generator will construct a Taxonomically correct well formed command and optionally via the Taxonomy Translator, invoke the command onto the Controller of Software Component 2 via the Taxonomy Engine.

Execution

The well formed command is delivered to the controller of the appliance and executed by the appliance.

Typically, the command will result in a state change to the associated memory of Software Component 2 which will trigger a status update created by the Status Generator and resulting in new renderings of state to the Application end point. This change in state will result in a new Capabilities Taxonomy or a partial Capabilities Taxonomy which can replace portions of the original Capabilities Taxonomy. The new Capabilities Taxonomy resulting in a different set of valid selections for controlling the cycles of operation of Software Component 2.

Validation

The status interpreter uses the taxonomy dataset to validate status updates sent by the Taxonomy Engine or Translator from the Status Generator. In addition, the Taxonomy Structure, which is the source of the Taxonomy dataset, allows the controller to fully validate incoming commands according the structure without additional logic outside of the dataset. For example, the Taxonomy Structure can be conceptually thought of as one or multiple decision trees, with each level of the taxonomy forming a different decision branch or set of decision branches, where each of the options and/or data inputs can form a different level. The cycles of operation of an appliance require the user to select the options and/or data inputs in forming the well formed command. These selections can be compared against the decision tree to confirm that each cycle, cycle attribute, or cycle option is found within the appropriate branch on the decision tree. If the expected cycle of operation, attribute and options are not found within the command, then it is an indication that the command contains an error. The taxonomy structure thus serves to populate the user interface with available options and data inputs for a given state of the appliance and also serve as the logic for validating the resulting command.

The taxonomy dataset is a data representation of the taxonomy structure which is an object or software structure. It contains all available commands, options and settings for an appliance at the current state and all valid status values at the current state. For example, the appliance comprises multiple components interconnected by the internal network. Each of the components can have one or more devices. Each of the devices has one or more functionalities, which has one or more settings. All of the functionalities for all of the devices will not necessarily be available during each state of the appliance. As such, the taxonomy dataset will comprise all options and data inputs for all devices that are currently available.

FIGS. 45-48 illustrate one example of the Taxonomy control in the context of a user interface 16, 22 for a microwave that is populated with a taxonomy dataset indicating the available functions of the appliance 12 for the current state. The user can select from the parameters of the dataset to form the well formed command that will be issued to control the operation of the appliance 12.

Figure 45:
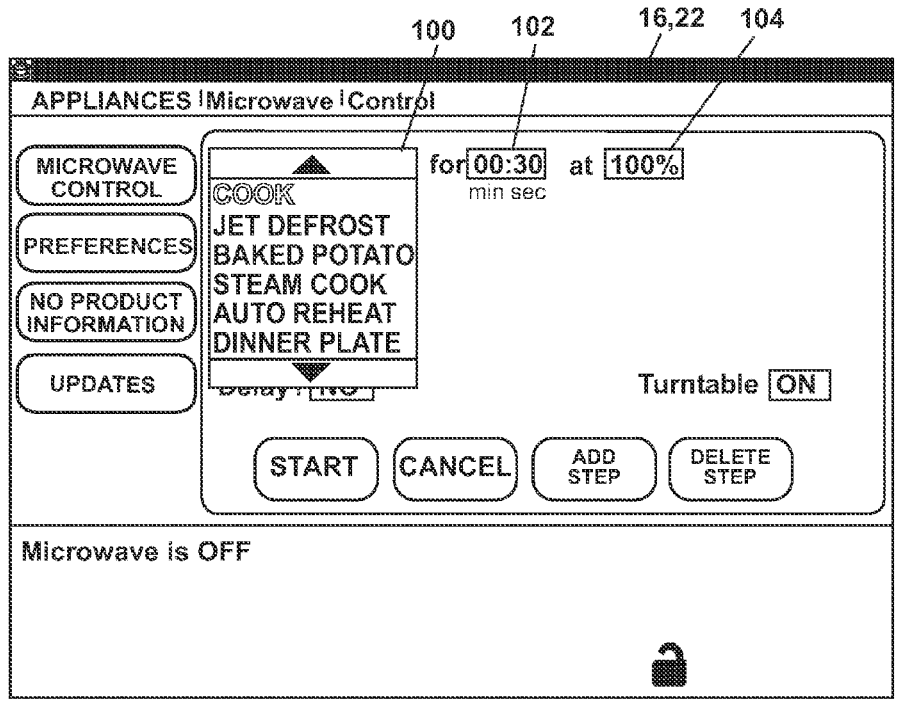
FIG. 45 schematically illustrates a user interface populated by a taxonomy dataset comprising a hierarchy of options and data inputs that will lead the user to selecting options and data inputs to generate a well formed command.

FIG. 45 illustrates the available hierarchy of options and data inputs. The top level of the hierarchy begins with the cycle 100, which is shown to have the options of COOK, JET DEFROST, BAKED POTATO, STEAM COOK, AUTO REHEAT, AND DINNER PLATE, as illustrative examples. The user must select one of the options from the top level.

Figure 46:
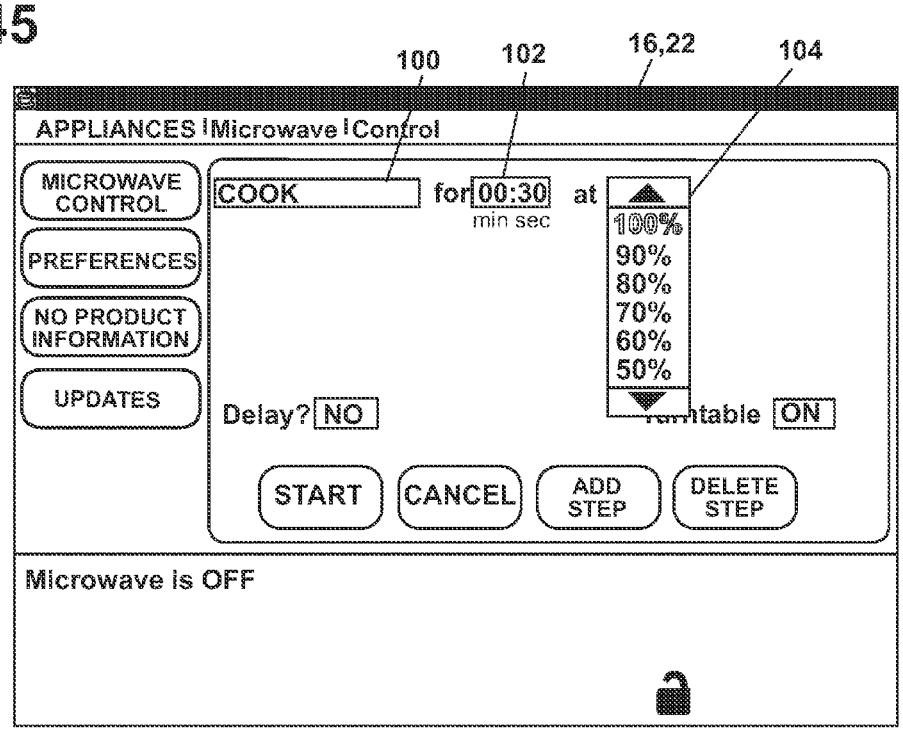
FIG. 46 schematically illustrates the associated data inputs available for a top level option.

Once the user selects an option from the top level, the next level of the hierarchy is exposed to the user based on the top level selection. In FIG. 46, the user has selected the COOK option and the user interface then displays data inputs, in the form of TIME 102 and POWER LEVEL 104, available for that option and necessary to form the well formed command.

Figure 47:
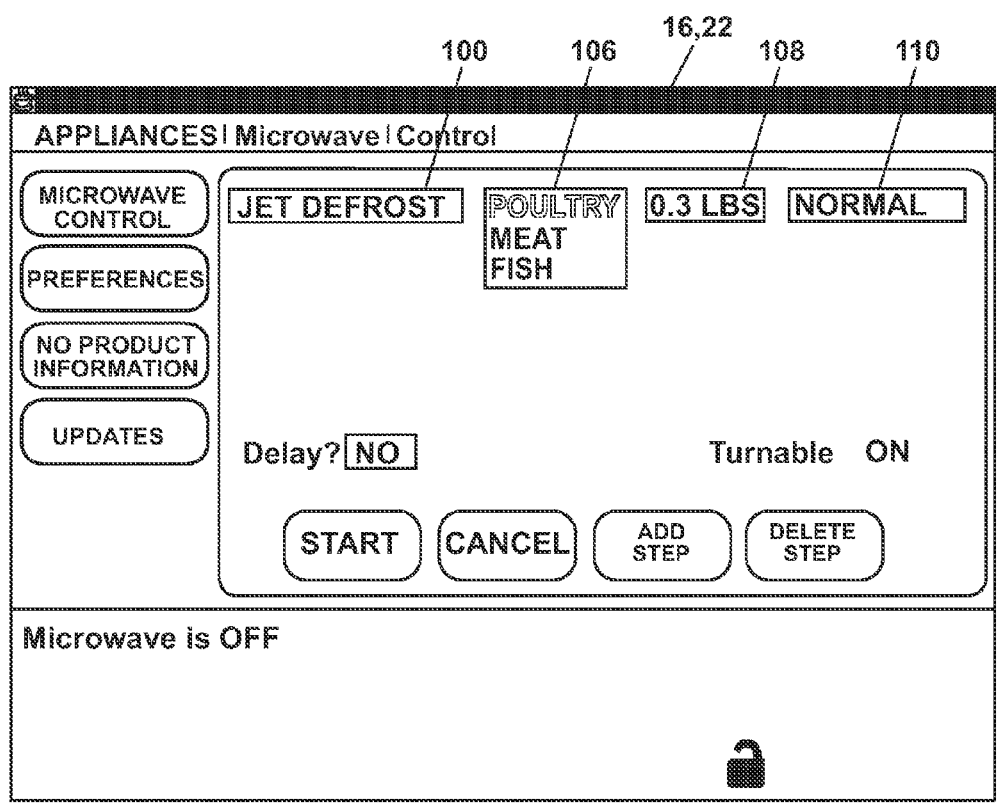
FIG. 47 schematically illustrates the associated data inputs available for a sub-level option selection with associated data inputs.

FIG. 47 illustrates the situation were the selection of a top level option exposes options at a sub-level. In FIG. 47, the JET DEFROST is selected, which exposes the sub-level of types of meat 106. The user must select the appropriate meat option in completing the well formed command. Data inputs in the form of weight 108 and defrost level 110 are exposed and must be selected to complete the well formed command.

Once the user has selected the options and data inputs from the taxonomy dataset accessed by the user interface, the command generator will form the well formed command and send it to Software Component 2 on component of the appliance for implementation. This is done only after the well formed command has passed through the validation process. The controller and logic of Software Component 2 then uses the well formed command to control the operation of the devices to effect the well formed command.

A detailed example of the creation of the taxonomy dataset and the well formed command should prove useful. The creation of the taxonomy dataset for the microwave of FIG. 45 that discloses multiple cooking cycles was constructed by the selection builder from the taxonomy capabilities dataset as is illustrated in XML as follows:

```
<device id="microwave" label="Microwave Oven">
    <device id="ovenCavity" label="Microwave Oven">
        <char name="cycle" label="Cycle" default="timedCook">
            <setting name="timedCook" label="COOK" />
                <char name="turntable" label="Turntable"
                default="on">
                    <setting name="on" label="ON" />
                <setting name="off" label="OFF" />
            </char>
                <range name="duration" label="Duration"
                default="30" units="seconds"
                max="6039" min="60" inc="1" />
                <range name="power" label="Power Level"
                default="100" units="%"
                max="100" min="50" inc="10" />
            </setting>
            <setting name="jetdefrost" label="Jet Defrost"/>
                <char name =foodType label ="Food Type"/>
                    <setting name="poultry" label="POULTRY" />
                    <setting name="meat" label="MEAT" />
                    <setting name="fish" label="FISH" />
                </char>
            </setting>
            |
            |
            |
            etc
        </char>
    </device>
</device>
```

If the user of the microwave of FIG. 45 chooses to Cook for 30 seconds at 90% power with the Turntable On, a well formed command of the Taxonomic schema would be transmitted optionally to the Taxonomy Translator and to the Taxonomy. The command of the form:

```
<command id=" microwave ">
    <device id="ovenCavity">
        <sequence>
            <step id="21">
                <char name="cycle" setting="bake"/>
                <char name="power" setting="90"/>
    <char name="duration" setting="30"/>
    <char name="turntable" setting="on"/>
            </step>
        </sequence>
    </device>
</command>
```

The Taxonomy Engine would then traverse the Taxonomy Structure to transform the well formed command of the Taxonomic schema to a well formed command of the Controller of Software Component 2 of the packet structure 28. The Taxonomy Structure is a superset of the Taxonomy Capabilities Dataset. For each specifiable command element above (ie. Cycle, Power, Duration, and Turntable) an additional collection of key words and values necessary to form Payload 28A would be associated within the Taxonomy Structure. These key words would include API Id, Op Code, and Position Index into the Payload 28A where Position Index could be a byte offset or a bit offset.

The Taxonomy Dataset could be constructed to directly represent the universe of possible commands of the APIs of software architecture 10 providing useful functionality for a service, factory, or laboratory engineer or technician.

While the invention has been specifically described in connection with certain specific embodiments thereof, it is to be understood that this is by way of illustration and not of limitation, and the scope of the appended claims should be construed as broadly as the prior art will permit.

What is claimed is:

1. A controller for controlling a plurality of devices in an appliance operable to perform a series of steps in a cycle of operation on a physical article, wherein the controller can communicate on a communications network, the controller comprising:
a first software operating layer configured to control operation of at least one of the devices in a first operational state in response to messages sent on the communications network, and
a second software operating layer configured to control operation of the at least one of the devices in a second operational state in response to messages sent on the communications network, where the second software operating layer provides a different level of intervention between the messages and the operation of the devices than the first software operating layer,
whereby the at least one of the devices can be controlled by the second software operating layer independently of the first software operating layer and independently of other devices within the plurality of devices.

2. The controller according to claim 1, wherein the first and second software operating layers permit different levels of control of the devices by the messages to provide the different level of intervention.

3. The controller according to claim 2, wherein the second software operating layer permits operation of at least one of the devices under circumstances where the first software operating layer prevents operation of that device.

4. The controller according to claim 3 wherein the first software operating layer does not permit direct control of at least one of the plurality of devices when the second software operating layer permits direct control of that device.

5. The controller according to claim 1, wherein the first software operating layer only permits the devices to operate in a manner to perform a predetermined cycle of operation.

6. The controller according to claim 5, wherein the second software operating layer permits the devices to operate in at least one additional cycle of operation.

7. The controller according to claim 1, and further comprising at least one of an internal and external client configured to generate a message for changing between the first and second operational states.

8. The controller according to claim 1, wherein at least one of the first and second software operating layers effect cooperative operation of the devices to accomplish a series of related steps in a predetermined operation.

9. The controller according to claim 8, wherein the devices are selected from a list comprising at least one of a sensor, a dispenser, a filter, a motor, a heater, and a chiller.

10. The controller according to claim 8, wherein at least a subset of the plurality devices are all found within an appliance.

11. The controller according to claim 8, wherein the plurality of devices comprise a plurality of networked appliances.

12. The controller according to claim 1, wherein the communications network comprises at least one of an internal network and an external network.

13. The controller according to claim 12, wherein the second operational state exposes the first software operating layer to an external network.

14. A control system for controlling a plurality of devices connected by a communications network to define an appliance operable to perform a series of steps in a cycle of operation on a physical article, the control system comprising:
a user interface configured to receive input from a user for selection of a cycle of operation from multiple cycles of operation;
a first software operating layer isolated from the communications network and configured to control the appliance to implement the selected cycle of operation to define a first control state; and
a second software operating layer exposed to the communications network and configured to control a machine over the network to implement the selected cycle of operation to define a second control state.

15. The control system according to claim 14, wherein the communications network comprises an internal network having a plurality of nodes, with at least one node having one or more functional units, and each functional unit representing a group of common functionality.

16. The control system according to claim 15, wherein at least one of the functional units effects control of at least one of low-level electrical inputs and outputs of at least one of the plurality of devices.

17. The control system according to claim 14, wherein the second software operating layer comprises a software engine residing on at least one of the devices and which exposes a network message sent over the communications network to effect the second control state.

18. The control system according to claim 17, wherein the software engine exposes commands encapsulated in a network message, with the commands used to effect the second control state.

19. The control system according to claim 14, wherein at least one of validation and security checks is bypassed to provide the second software operating layer with control of low-level functionality for at least some of the devices.

20. The control system according to claim 14, wherein the appliance can be removed from the second control state by the second software operating layer responding to a network message.

21. A control system for controlling a plurality of devices connected by a communications network to define a machine operable to perform a series of steps in a cycle of operation, the control system comprising:
a user interface configured to receive input from a user for selection of a cycle of operation from multiple cycles of operation;
a first software operating layer isolated from the communications network and configured to control the machine to implement the selected cycle of operation to define a first control state; and
a second software operating layer exposed to the communications network and configured to control the machine over the communications network to implement the selected cycle of operation to define a second control state,
wherein the communications network comprises an internal network having a plurality of nodes, with at least one node having one or more functional units, and each function unit representing a group of common functionality.

22. The control system according to claim 21, wherein a software engine exposes commands encapsulated in a network message, wherein the exposed commands are used to effect the second control state.

23. The control system according to claim 21, wherein at least one of validation and security checks is bypassed to provide the second software operating layer with control of low-level functionality for at least some of the devices.

24. The control system according to claim 23, wherein the machine can be removed from the second control state by the second software operating layer responding to a network message.

* * * * *